(12) United States Patent
Lai et al.

(10) Patent No.: US 11,895,402 B2
(45) Date of Patent: *Feb. 6, 2024

(54) ACTUATOR, IMAGE CAPTURING UNIT AND ELECTRONIC DEVICE

(71) Applicant: LARGAN DIGITAL CO., LTD., Taichung (TW)

(72) Inventors: Yu Chen Lai, Taichung (TW); Ming-Ta Chou, Taichung (TW); Liang Chieh Weng, Taichung (TW); Ming-Shun Chang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 421 days.

This patent is subject to a terminal disclaimer.

(21) Appl. No.: 17/177,640

(22) Filed: Feb. 17, 2021

(65) Prior Publication Data
US 2022/0159187 A1    May 19, 2022

(30) Foreign Application Priority Data
Nov. 13, 2020    (TW) ................................ 109139687

(51) Int. Cl.
*G02B 27/64* (2006.01)
*G03B 5/02* (2021.01)
(Continued)

(52) U.S. Cl.
CPC ............ *H04N 23/68* (2023.01); *G02B 27/64* (2013.01); *G03B 5/02* (2013.01); *G03B 2205/0038* (2013.01)

(58) Field of Classification Search
CPC . G03B 5/00; G03B 5/04; G03B 13/36; G03B 3/10; G03B 3/12; G03B 2205/0007; G03B 2205/0053; G03B 2205/0015; G03B 2205/0069; G03B 3/02; G03B 13/34; G03B 30/00; G02B 7/021; G02B 7/04; G02B 7/08; G02B 7/09; G02B 7/10; G02B 9/62; G02B 13/001; G02B 13/0065;
(Continued)

(56) References Cited

FOREIGN PATENT DOCUMENTS

| CN | 210015272 U | 2/2020 | |
| KR | 20220162547 A * | 12/2022 | ............... G03B 5/04 |

OTHER PUBLICATIONS

Machine translation (English) of KR-20220162547-A (Year: 2022).*

* cited by examiner

*Primary Examiner* — Marin Pichler
(74) *Attorney, Agent, or Firm* — Maschoff Brennan

(57) ABSTRACT

An actuator is configured to drive an imaging lens system. The actuator includes a frame portion configured to accommodate the imaging lens system, a supporting portion disposed on the frame portion, a driving portion configured to drive the imaging lens system to move, an optical mark structure disposed on part of the frame portion, the supporting portion or the driving portion and a liquid disposed on the optical mark structure. The supporting portion is configured to support the imaging lens system and give the imaging lens system a degree of freedom of movement with respect to the frame portion. The optical mark structure includes a plurality of optical mark units arranged side by side. The liquid is in physical contact with the imaging lens system, the frame portion, the supporting portion or the driving portion that is adjacent to the optical mark structure.

30 Claims, 35 Drawing Sheets

(51) Int. Cl.
*H04N 5/232* (2006.01)
*H04N 23/68* (2023.01)

(58) Field of Classification Search
CPC .. G02B 27/646; H04N 5/2253; H04N 5/2254; H04N 5/2257; H04N 5/23287; H02K 11/33; H02K 41/035
USPC ....... 359/911, 554, 555, 557, 811, 813, 814, 359/823, 824, 872, 877
See application file for complete search history.

ACTUATOR, IMAGE CAPTURING UNIT AND ELECTRONIC DEVICE

RELATED APPLICATIONS

This application claims priority to Taiwan Application 109139687, filed on Nov. 13, 2020, which is incorporated by reference herein in its entirety.

BACKGROUND

Technical Field

The present disclosure relates to an actuator, an image capturing unit and an electronic device, more particularly to an actuator and an image capturing unit applicable to an electronic device.

Description of Related Art

With the development of semiconductor manufacturing technology, the performance of image sensors for having more pixels has been improved. Therefore, featuring high image quality becomes one of the indispensable features of an optical system nowadays. Further, an actuator is required for driving the optical system so as to achieve the effects such as focusing and optical image stabilization of the optical system. Furthermore, due to the rapid changes in technology, electronic devices equipped with actuators and optical systems are trending towards multi-functionality for various applications, and therefore the functionality requirements for the actuators have been increasing.

However, the actuators are assembled by a plurality of components, most of the components are compactly arranged due to, for example, a limited space of the actuators, and an adhesive dispensing process is often used to fix adjacent components in the actuators. This may cause the tolerance of the adhesive dispensing process within a limit range, thereby increasing the difficulty of the adhesive dispensing process. Therefore, how to improve the structure of the actuators for an accurate adhesive dispensing process has become an important issue in the related field.

SUMMARY

According to one aspect of the present disclosure, an actuator is configured to drive an imaging lens system. The actuator includes a frame portion, a supporting portion, a driving portion, an optical mark structure and a liquid. The frame portion is configured to accommodate the imaging lens system. The supporting portion is disposed on the frame portion, and the supporting portion is configured to support the imaging lens system and give the imaging lens system at least one degree of freedom of movement with respect to the frame portion. The driving portion is configured to move the imaging lens system along a direction of the at least one degree of freedom. The optical mark structure is disposed on part of one of the frame portion, the supporting portion and the driving portion, and the optical mark structure includes a plurality of optical mark units arranged side by side. Each of the optical mark units includes a first optical mark surface. The liquid is disposed on the optical mark structure, and the liquid is in physical contact with one of the imaging lens system, the frame portion, the supporting portion and the driving portion that is adjacent to the optical mark structure. When an area of each of the first optical mark surfaces is A, and a distance between center points of adjacent two of the first optical mark surfaces is D, the following conditions are satisfied:

$$0.001[mm^2] \leq A \leq 0.5[mm^2]; \text{ and}$$

$$0.03[mm] \leq D \leq 1.0[mm].$$

According to another aspect of the present disclosure, an actuator is configured to drive an imaging lens system. The actuator includes a frame portion, a supporting portion, a driving portion, an optical mark structure and a liquid. The frame portion is configured to accommodate the imaging lens system. The supporting portion is disposed on the frame portion, and the supporting portion is configured to support the imaging lens system and give the imaging lens system at least one degree of freedom of movement with respect to the frame portion. The driving portion is configured to move the imaging lens system along a direction of the at least one degree of freedom. The optical mark structure is configured to be disposed on the imaging lens system, the optical mark structure faces part of at least one of the frame portion, the supporting portion and the driving portion, and the optical mark structure includes a plurality of optical mark units arranged side by side. Each of the plurality of optical mark units includes a first optical mark surface. The liquid is disposed on the optical mark structure, and the liquid is in physical contact with one of the frame portion, the supporting portion and the driving portion that is adjacent to the optical mark structure. When an area of each of the first optical mark surfaces is A, and a distance between center points of adjacent two of the first optical mark surfaces is D, the following conditions are satisfied:

$$0.001[mm^2] \leq A \leq 0.5[mm^2]; \text{ and}$$

$$0.03[mm] \leq D \leq 1.0[mm].$$

According to another aspect of the present disclosure, an image capturing unit includes one of the aforementioned actuators and one of the aforementioned imaging lens systems.

According to another aspect of the present disclosure, an electronic device includes the aforementioned image capturing unit and an image sensor, wherein the image sensor is disposed on an image surface of the imaging lens system.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
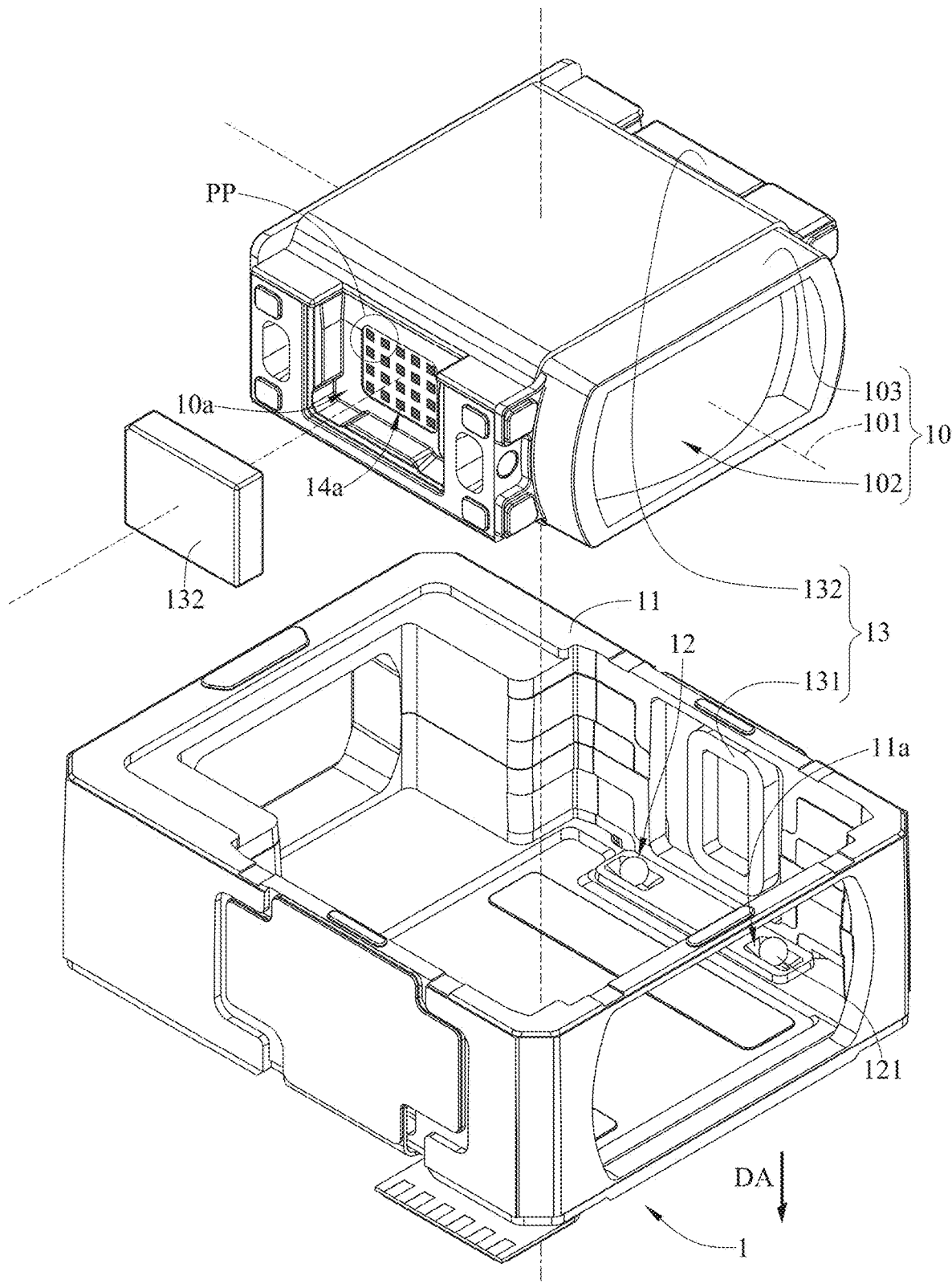
FIG. 1 is an exploded view of an actuator according to the 1st embodiment of the present disclosure coupled with an imaging lens system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an actuator configured to drive an imaging lens system. The actuator includes a frame portion, a supporting portion and a driving portion. The frame portion is configured to accommodate the imaging lens system. The supporting portion is disposed on the frame portion, and the supporting portion is configured to support the imaging lens system and give the imaging lens system at least one degree of freedom of movement with respect to the frame portion. The driving portion is configured to move the imaging lens system along a direction of the at least one degree of freedom.

Specifically, the supporting portion can include a flat spring, a suspension wire, a ball, a guider, a slider, etc., but the present disclosure is not limited thereto. Please refer to FIG. 1, which shows the supporting portion 12 of the actuator 1 including a supporting element 121 of a spherical ball. Please refer to FIG. 7, which shows the supporting portion 22 of the actuator 2 including an upper elastic element 222 and lower elastic elements 223 of flat springs. Please refer to FIG. 12, which shows the supporting portion 32 of the actuator 3 including supporting elements 321 of flat springs.

The imaging lens system can have an optical axis. The imaging lens system can include a plurality of optical elements and a lens barrel. The optical elements are arranged along the optical axis. The lens barrel surrounds the optical axis, and at least one of the optical elements is accommodated in the lens barrel. The optical elements can at least include a lens element, a mirror, a light-folding element, a light-blocking element, a spacer, a retainer, etc., but the present disclosure is not limited thereto.

The actuator further includes an optical mark structure. The optical mark structure includes a plurality of optical mark units arranged side by side. In one aspect of the present disclosure, the optical mark structure can be disposed on part of one of the frame portion, the supporting portion and the driving portion. Please refer to FIG. 8, which shows one of the optical mark structures 24a disposed on the step portion 224 of the supporting portion 22 of the actuator 2 according to the 2nd embodiment of the present disclosure, and the one of the optical mark structures 24a faces the upper elastic element 222 (shown in FIG. 7) of the supporting portion 22. Please refer to FIG. 13, which shows one of the optical mark structures 34a disposed on the lower frame 313 of the frame portion 31 of the actuator 3 according to the 3rd embodiment of the present disclosure, and the one of the optical mark structures 34a faces one of the supporting elements 321 (shown in FIG. 12) of the supporting portion 32. In another aspect of the present disclosure, the optical mark structure can be disposed on the imaging lens system, and the optical mark structure faces part of at least one of the frame portion, the supporting portion and the driving portion. Please refer to FIG. 1, which shows the optical mark structure 14a disposed on the lens barrel 103 of the imaging lens system 10 according to the 1st embodiment of the present disclosure, and the optical mark structure 14a faces the magnet 132 of one of the driving portions 13.

The actuator further includes an intermediate layer (can also be considered as a liquid in a solid state or a non-solid state at normal condition). The liquid is disposed on the optical mark structure, and the liquid can face another adjacent component. The liquid can be in a solid state or a non-solid state at normal conditions. The liquid in the solid state can be adhesive. Therefore, it is favorable for providing a bonding force to fix adjacent components while being cured. Alternatively, the liquid in the solid state can be plastic dissolved by organic solvent. Therefore, by spreading organic solvent on adjacent surfaces of adjacent plastic components to dissolve part of the plastic components or at least affect their surfaces, the adjacent plastic components can be combined together in one piece while the dissolved plastic is cured. Moreover, the organic solvent can be, for example, acetone, methyl ethyl ketone or chloroform, but the present disclosure is not limited thereto. Alternatively, the liquid in the non-solid state can be lubricant and a damping agent. Therefore, it is favorable for increasing the life span of the actuator and absorbing the vibration generated during the movement of the imaging lens system, thereby improving the stability of the actuator.

In the aspect that the optical mark structure is disposed on the part of one of the frame portion, the supporting portion and the driving portion, the liquid is in physical contact with one of the imaging lens system, the frame portion, the supporting portion and the driving portion that is adjacent to the optical mark structure. Please refer to FIG. 11, which shows the liquid 25a disposed on one of the optical mark structures 24a on the step portion 224 of the supporting portion 22 according to the 2nd embodiment of the present disclosure, and the liquid 25a is in physical contact with the upper elastic element 222 so as to fix the upper elastic element 222 of the supporting portion 22 to the step portion 224. In the aspect that the optical mark structure is disposed on the imaging lens system, the liquid is in physical contact with one of the frame portion, the supporting portion and the driving portion that is adjacent to the optical mark structure. Please refer to FIG. 1 and FIG. 2, which show the liquid 15a disposed on the optical mark structure 14a on the lens barrel 103 of the imaging lens system 10 according to the 1st embodiment of the present disclosure, and the liquid 15a is in physical contact with one of the magnets 132 so as to fix the one of the magnets 132 of the driving portions 13 to the lens barrel 103 of the imaging lens system 10.

Each of the optical mark units of the optical mark structure includes a first optical mark surface. In each optical mark unit, the first optical mark surface can have a gloss value in a direction different from that of the other part of the optical mark unit. Therefore, it is favorable for highlighting the position to be dispensed and timely presenting the current dispensing situation. In detail, the above-mentioned liquid can be used for adhesive dispensing, and the gloss value of the first optical mark surface would change when the first optical mark surface is in contact with the liquid. Therefore, in an adhesive dispensing process, any information, such as the actual position, the dispensing amount and the flow direction of the liquid, on the surface of the optical mark structure can be obtained by optical mark recognition, such that the current dispensing situation can be timely compared with and corrected towards the target dispensing result during the adhesive dispensing process. Accordingly, it is favorable for preventing defect such as insufficient adhesive and spilled adhesive, thereby increasing the yield rate and accuracy of the adhesive dispensing process so as to increase the speed of the subsequent assembly process and prevent the liquid from affecting the other position not for adhesive dispensing. Moreover, the gloss value of the first optical mark surface can be changes in a manner that the first optical mark surface is covered, corrode, dyed or the microstructure thereon is changed by the liquid, but the present disclosure is not limited thereto.

When an area of each of the first optical mark surfaces is A, the following condition is satisfied: $0.001\ [\text{mm}^2] \leq A \leq 0.5\ [\text{mm}^2]$. Therefore, it is favorable for having a sufficient area of the first optical mark surface so as to be easily detected by an optical mark system. Moreover, the following condition can also be satisfied: $0.0015\ [\text{mm}^2] \leq A \leq 0.1\ [\text{mm}^2]$. Moreover, the following condition can also be satisfied: $0.002\ [\text{mm}^2] \leq A \leq 0.042\ [\text{mm}^2]$. Please refer to FIG. 2, which shows a schematic view of A according to the 1st embodiment of the present disclosure.

When a distance between center points of adjacent two of the first optical mark surfaces is D, the following condition is satisfied: $0.03\ [\text{mm}] \leq D \leq 1.0\ [\text{mm}]$. Therefore, it is favorable for having a sufficient distance between the two adjacent first optical mark surfaces so as to be easily detected by the optical mark system. Note that the center point of the first optical mark surface refers to the geometric center point of the range of the first optical mark surface. Please refer to FIG. 2, which shows a schematic view of D according to the 1st embodiment of the present disclosure.

When the area of each of the first optical mark surfaces is A, and the distance between center points of adjacent two of the first optical mark surfaces is D, the following condition can be satisfied: $0.05 \leq \sqrt{(A)}/D \leq 1.5$. Therefore, it is favorable for defining a dimensionless condition of the projection area of the first optical mark surface and the distance between center points of adjacent two first optical mark surfaces as an identification factor so as to obtain information of the dispensing amount, the distribution state and the flow direction of the liquid while the first optical mark surfaces, as above-mentioned, have the sufficient area and distance. Moreover, the following condition can also be satisfied: $0.1 \leq \sqrt{(A)}/D \leq 1.0$.

Each of the optical mark units can further include a second optical mark surface, and the first optical mark surface and the second optical mark surface of each of the plurality of optical mark units are arranged side by side. The first optical mark surface and the second optical mark surface can have different gloss values in a direction. Moreover, the different gloss values of the first optical mark surface and the second optical mark surface in a direction can be achieved by different surface roughness values, microstructures in different directions, different heights, different angles thereof, but the present disclosure is not limited thereto.

Figure 29:
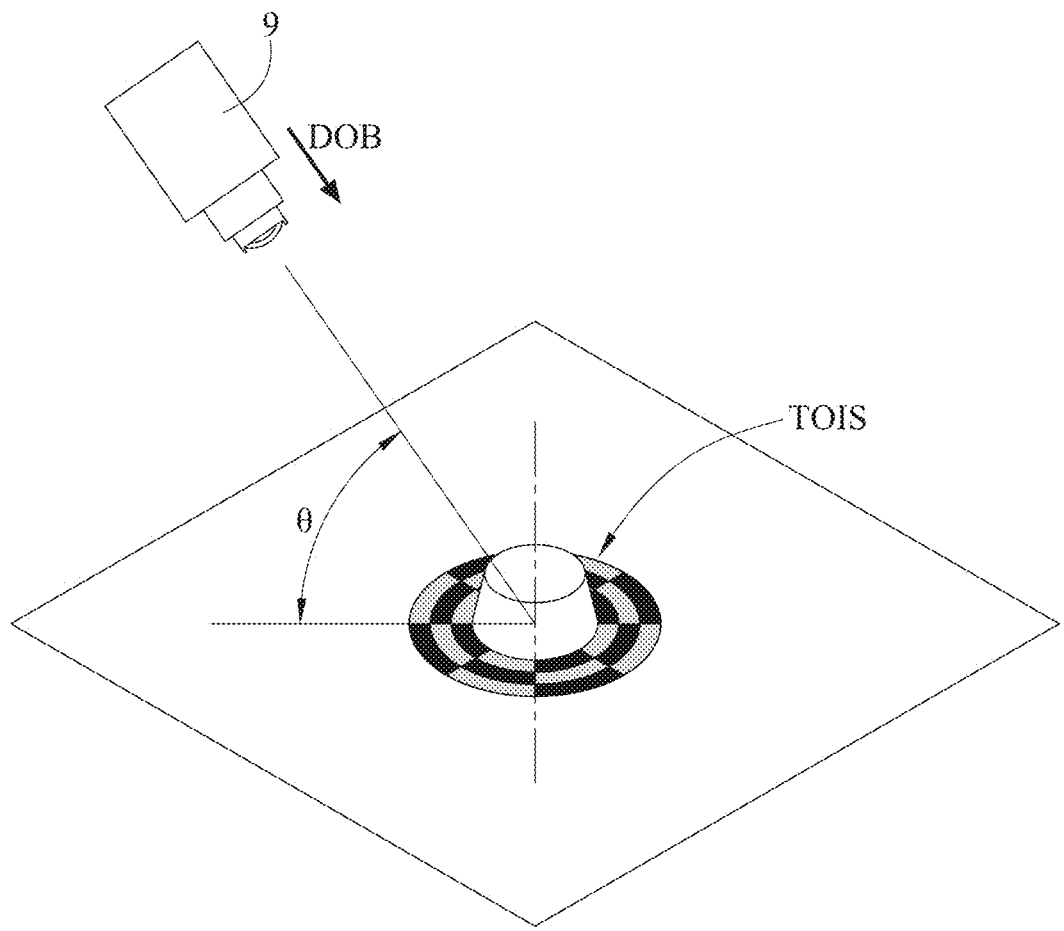
FIG. 29 shows a schematic view of θ according to one embodiment of the present disclosure.

The optical mark structure provided in the present disclosure can be observed in an observation direction. When an angle between the observation direction and the optical mark structure is θ, and a gloss value difference in the observation direction between the first optical mark surface and the second optical mark surface of each of the optical mark units is ΔG, the following conditions can be satisfied: $50\ [\text{deg.}] \leq \theta \leq 90\ [\text{deg.}]$; and $15\ [\text{GU}] \leq \Delta G \leq 50\ [\text{GU}]$. Therefore, it is favorable for the optical mark system to identify the first optical mark surface and the second optical mark surface by the gloss value different. The gloss value of a surface can be calculated from the reflectance thereof when being illuminated. The higher the gloss value of a surface, the easier the light reflected off the surface. When θ is 60 degrees (deg.), a corresponding measurement range is between 0 and 1000 gloss units (GU). For example, when the reflectance of the first optical mark surface and the reflectance of the second optical mark surface measured in an observation direction at an angle θ of 60 degrees with respect to the optical mark structure are respectively 0.5% and 3%, the gloss values of the first optical mark surface and the second optical mark surface can be correspondingly calculated to be respectively 5 gloss units and 30 gloss units. The difference between the two gloss values is 25 gloss units, which satisfies the above condition "15 [GU]≤ΔG≤50 [GU]". Moreover, when θ is 85 degrees, a corresponding measurement range is between 0 and 160 gloss units. Please refer to FIG. 29, which shows that an optical mark structure TO IS according to one embodiment of the present disclosure is observed by an optical mark system 9 in an observation direction DOB at an angle θ with respect to the optical mark structure TO IS.

The following table is provided for showing data of areas (e.g., the above-mentioned A), distances (e.g., the above-mentioned D) and identification factors (e.g., the above-mentioned √(A)/D) of optical mark surfaces that have the same surface structure thereon and can be identified by the optical mark system in an identification environment of satisfying the conditions "50 [deg.]≤θ≤90 [deg.]" and "15 [GU]≤ΔG≤50 [GU]". Further, the dispensed optical mark surfaces can also be detected by the optical mark system.

| Sample # | A | D | √(A)/D |
|---|---|---|---|
| 1 | 2.20E−03 | 0.075 | 0.628 |
| 2 | 4.00E−03 | 0.130 | 0.488 |
| 3 | 5.20E−03 | 0.153 | 0.471 |
| 4 | 5.30E−03 | 0.153 | 0.476 |
| 5 | 5.40E−03 | 0.060 | 1.224 |
| 6 | 5.60E−03 | 0.177 | 0.423 |
| 7 | 6.20E−03 | 0.207 | 0.380 |
| 8 | 6.60E−03 | 0.221 | 0.367 |
| 9 | 6.90E−03 | 0.162 | 0.513 |
| 10 | 7.30E−03 | 0.242 | 0.353 |
| 11 | 8.70E−03 | 0.291 | 0.320 |
| 12 | 8.70E−03 | 0.291 | 0.320 |
| 13 | 9.70E−03 | 0.354 | 0.278 |
| 14 | 1.07E−02 | 0.357 | 0.289 |
| 15 | 1.08E−02 | 0.361 | 0.288 |
| 16 | 1.08E−02 | 0.361 | 0.288 |
| 17 | 1.08E−02 | 0.360 | 0.289 |
| 18 | 1.15E−02 | 0.353 | 0.303 |
| 19 | 1.16E−02 | 0.385 | 0.279 |
| 20 | 1.21E−02 | 0.403 | 0.273 |
| 21 | 1.22E−02 | 0.348 | 0.317 |
| 22 | 1.26E−02 | 0.421 | 0.267 |
| 23 | 1.41E−02 | 0.385 | 0.309 |
| 24 | 1.46E−02 | 0.487 | 0.248 |
| 25 | 1.50E−02 | 0.300 | 0.408 |
| 26 | 1.58E−02 | 0.395 | 0.318 |
| 27 | 1.68E−02 | 0.395 | 0.328 |
| 28 | 2.58E−02 | 0.383 | 0.420 |
| 29 | 2.84E−02 | 0.392 | 0.430 |
| — | — | — | — |

When a roughness value difference in a direction between the first optical mark surface and the second optical mark surface of each of the plurality of optical mark units is ΔR, the following condition can be satisfied: 0.01 [μm]≤ΔR≤3.5 [μm]. Therefore, it is favorable for providing different gloss values between the first optical mark surface and the second optical mark surface due to different roughness values thereof, such that the first optical mark surface and the second optical mark surface can be easily identified by the optical mark system. Since a surface may have different roughness in different directions by a cutting process performed thereon, roughness values of the surface measured in different directions would be different. Thus, different roughness values of the first optical mark surface and the second optical mark surface can be measured in the same direction by cutting processes in different directions performed thereon, which providing different gloss values in the same direction. In the specification, the roughness value refers to the parameter "Ra" (arithmetical mean deviation of the assessed profile), unless it is particularly defined.

When a height difference in a direction perpendicular to the first optical mark surface between the first optical mark surface and the second optical mark surface of each of the plurality of optical mark units is ΔH, the following condition can be satisfied: 0.001 [mm]≤ΔH≤0.1 [mm]. Therefore, it is favorable for further guiding the flow of the liquid to the lower level optical mark surface so as to increase an identification effect; and it is also favorable for estimating the current dispensing amount of the liquid through the proportion of the optical mark units covered by the liquid. Please refer to FIG. 3, which shows a schematic view of ΔH according to the 1st embodiment of the present disclosure.

When an angle between the first optical mark surface and the second optical mark surface of each of the plurality of optical mark units is ϕ, the following condition can be satisfied: 3 [deg.]≤ϕ≤75 [deg.]. Therefore, it is favorable for providing different gloss values by different light reflection directions. Please refer to FIG. 5, which shows a schematic view of ϕ according to the 1st embodiment of the present disclosure.

The frame portion can have a mounting section, and the optical mark structure and the liquid are disposed on the mounting section. Part of one of the imaging lens system, the frame portion, the supporting portion and the driving portion that is adjacent to the optical mark structure is disposed on the mounting section and faces the optical mark structure. Therefore, it is favorable for ensuring the part of the one of the imaging lens system, the frame portion, the supporting portion and the driving portion that is disposed on the mounting section can be firmly fixed to the optical mark structure, thereby improving assembly quality. Please refer to FIG. 12 and FIG. 13, which show the supporting portion mounting sections 31a located at an object side of the lower frame 313 of the frame portion 31 according to the 3rd embodiment of the present disclosure, and the supporting elements 321 of the supporting portions 32 are disposed on the supporting portion mounting sections 31a and face the optical mark structures 34a.

In the aspect that the frame portion has the mounting section, the frame portion can include a positioning protrusion located on the mounting section. One of the imaging lens system, the frame portion, the supporting portion and the driving portion that is adjacent to the optical mark structure has a positioning hole corresponding to the positioning protrusion. Therefore, it is favorable for covering at least part of the optical mark structure when the one of the imaging lens system, the frame portion, the supporting portion and the driving portion is fixed via the engagement of the positioning hole and the positioning protrusion, thereby improving assembly quality. Moreover, the optical mark structure can surround the positioning protrusion. Please refer to FIG. 12 and FIG. 13, which show the positioning protrusions PR disposed on the supporting portion mounting sections 31a according to the 3rd embodiment of the present disclosure, and the supporting elements 321 have positioning holes PH corresponding to the positioning protrusions PR of the frame portion 31.

The imaging lens system can have a mounting section, and the optical mark structure and the liquid are disposed on the mounting section. Part of one of the frame portion, the supporting portion and the driving portion that is adjacent to the optical mark structure is disposed on the mounting section and faces the optical mark structure. Therefore, it is favorable for ensuring the part of the one of the frame portion, the supporting portion and the driving portion that is disposed on the mounting section can be firmly fixed to the optical mark structure, thereby improving assembly quality. Please refer to FIG. 12, which shows one of the driving portion mounting sections 30c located at the lens barrel 303 of the imaging lens system 30 according to the 3rd embodiment of the present disclosure in a direction perpendicular to the optical axis 301, and the coils 331 of the driving portions 33 are disposed on the driving portion mounting sections 30c and face the optical mark structures 34c.

In the aspect that the imaging lens system has the mounting section, the imaging lens system can include a positioning protrusion located on the mounting section. One of the frame portion, the supporting portion and the driving portion that is adjacent to the optical mark structure has a positioning hole corresponding to the positioning protrusion. Therefore, it is favorable for covering at least part of the optical mark structure when the one of the frame portion, the supporting portion and the driving portion is fixed via the engagement of the positioning hole and the positioning protrusion, thereby further improving assembly quality. Moreover, the optical mark structure can surround the positioning protrusion. Please refer to FIG. 12, which show one of the positioning protrusions PR disposed on one of the driving portion mounting sections 30c according to the 3rd embodiment of the present disclosure, and the coils 331 have positioning holes PH corresponding to the positioning protrusions PR of the imaging lens system 30.

The driving portion can further include a coil and a magnet spatially disposed opposite to each other. In the aspect that the frame portion has the mounting section, one of the coil and the magnet can be disposed on the mounting section and is fixed to the frame portion via the liquid, and the other of the coil and the magnet can be disposed on the imaging lens system. In the aspect that the imaging lens system has the mounting section, one of the coil and the magnet can be disposed on the mounting section and is fixed to the imaging lens system via the liquid, and the other of the coil and the magnet can be disposed on the frame portion. In the present disclosure, when a current flows into the coil, a force would be generated due to a magnetic field between the coil and the magnet. Therefore, it is favorable for driving the imaging lens system to move. In addition, the driving portion can include shape memory alloy (SMA), piezoelectric material, micro electro-mechanical system (MEMS) actuator, etc., which can drive the imaging lens system to move through reversible deformation thereof, but the present disclosure is not limited thereto. Please refer to FIG. 4, which shows the magnet 132 disposed on the driving portion mounting section 10b of the imaging lens system 10 according to the 1st embodiment of the present disclosure, and the magnet 132 is fixed to the lens barrel 103 of the imaging lens system 10 via the liquid 15b.

The supporting portion can include a supporting element in physical contact with the frame portion and the imaging lens system. In the aspect that the frame portion has the mounting section, part of the supporting element can be disposed on the mounting section and is fixed to the frame portion via the liquid. In the imaging lens system having the mounting section, part of the supporting element can be disposed on the mounting section and is fixed to the imaging lens system via the liquid. Therefore, it is favorable for ensuring the connection relationship between the frame portion and the imaging lens system. Please refer to FIG. 12 to FIG. 15, which show the supporting elements 321 disposed on the supporting portion mounting sections 31a of the frame portion 31 and the supporting portion mounting sections 30b of the imaging lens system 30, the supporting elements 321 are fixed to the lower frame 313 of the frame portion 31 via the liquid 35a, and the supporting elements 321 are fixed to the lens barrel 303 of the imaging lens system 30 via the liquid 35b.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
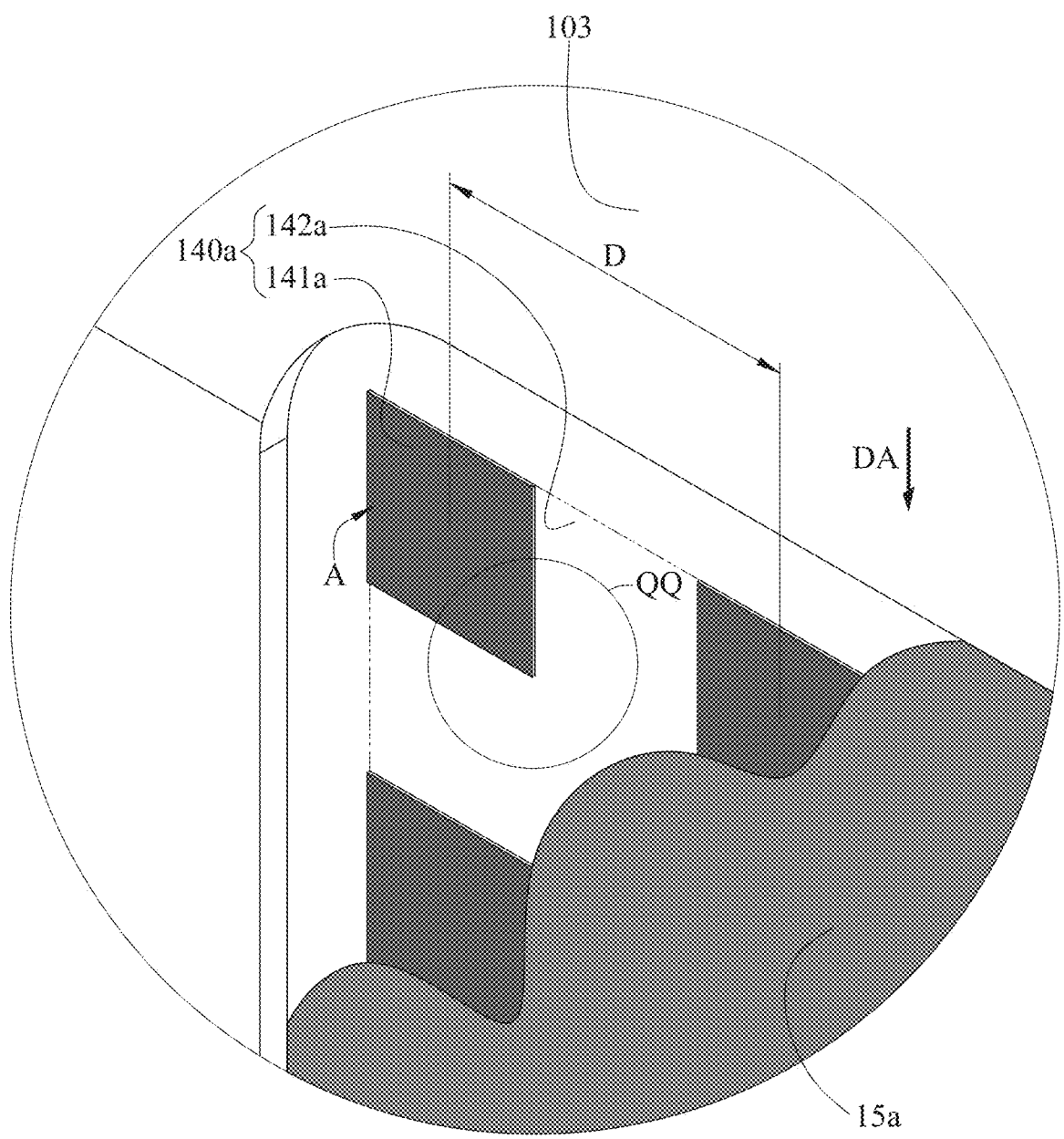
FIG. 2 is an enlarged view showing a liquid is disposed on an optical mark structure of the PP region of the imaging lens system of FIG. 1.
Figure 3:
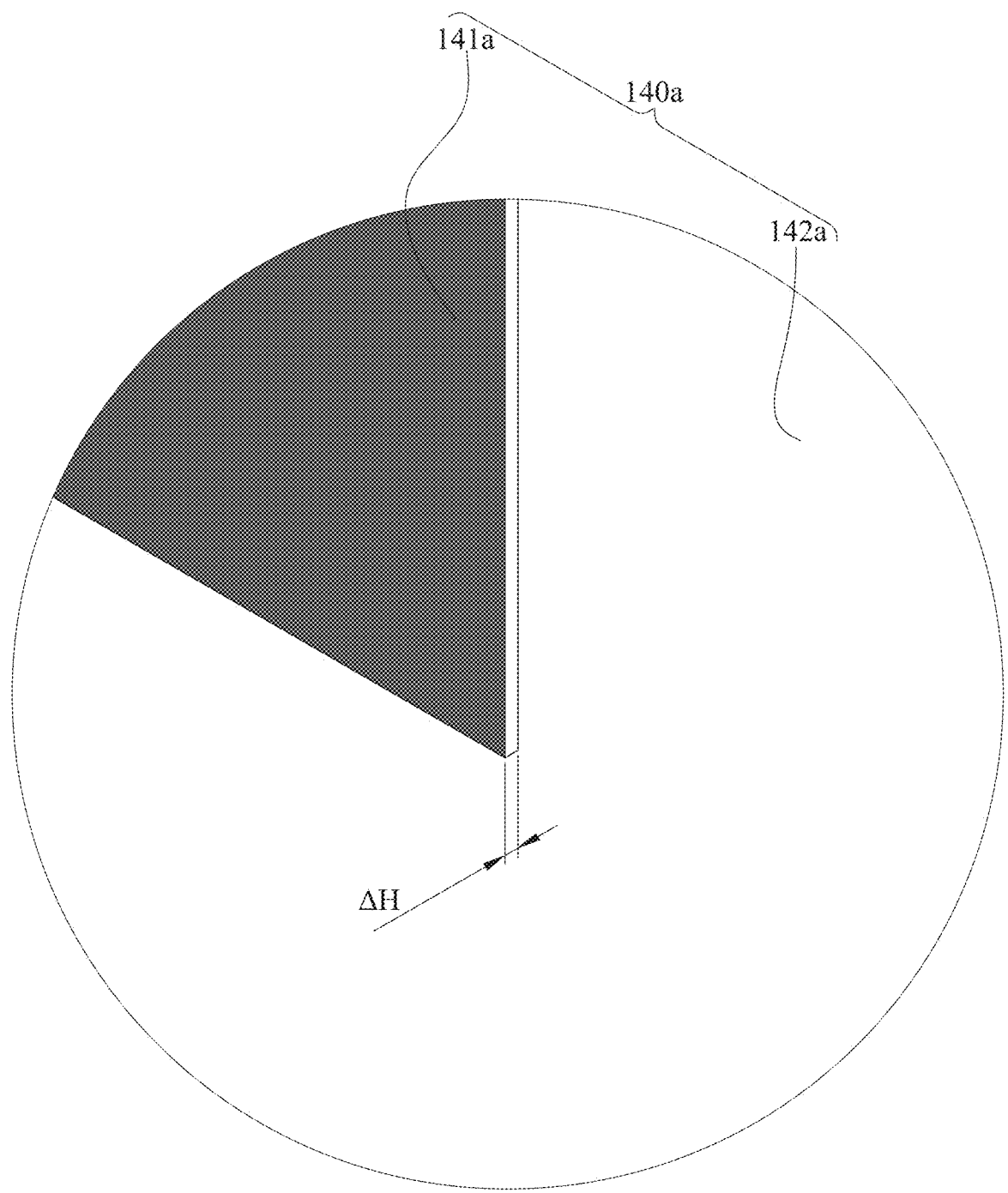
FIG. 3 is an enlarged view showing the QQ region of the optical mark structure of the imaging lens system of FIG. 2.
Figure 4:
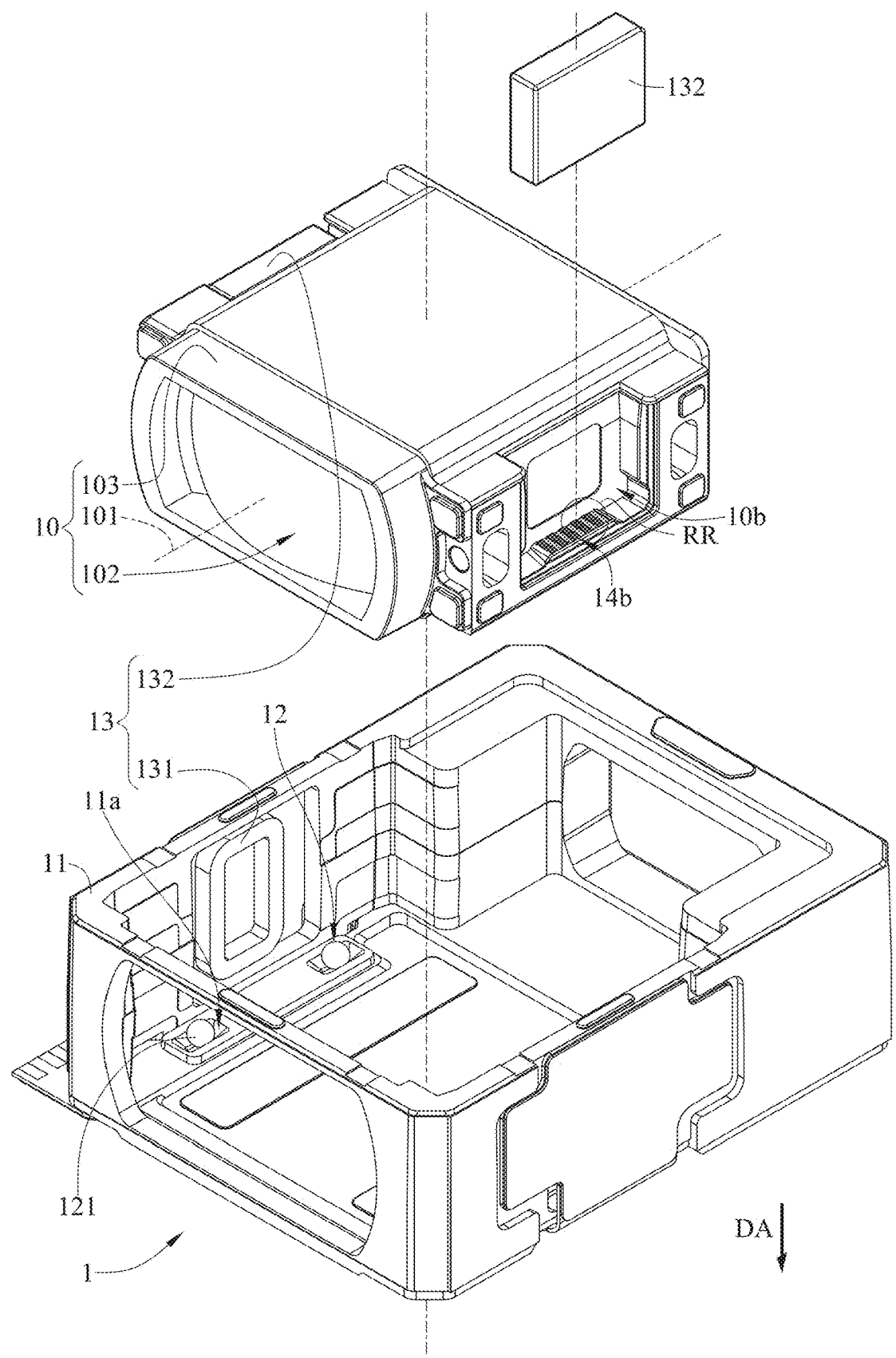
FIG. 4 is another exploded view of the actuator of FIG. 1 coupled with the imaging lens system.
Figure 5:
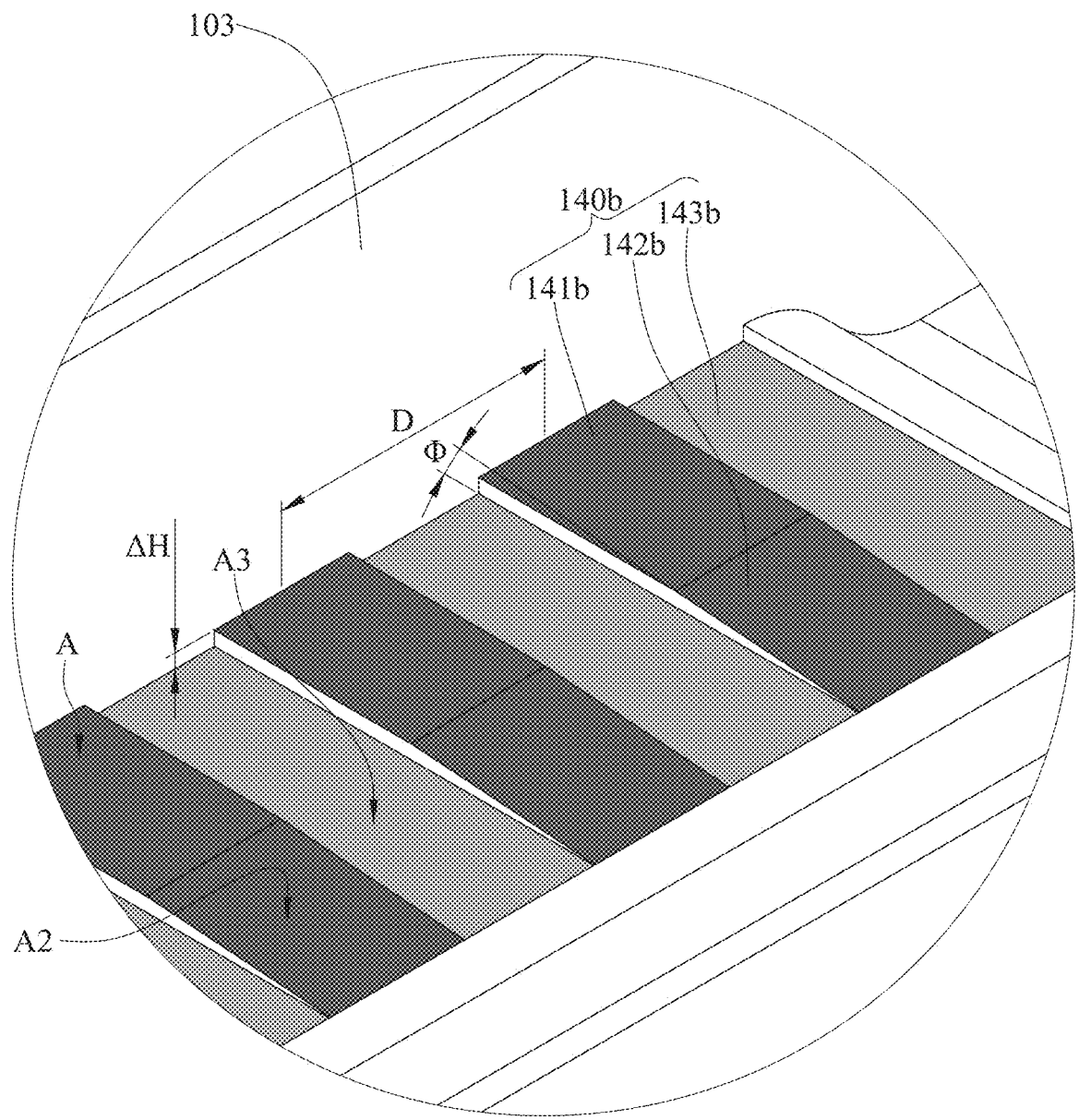
FIG. 5 is an enlarged view showing the RR region of the imaging lens system of FIG. 4.
Figure 6:
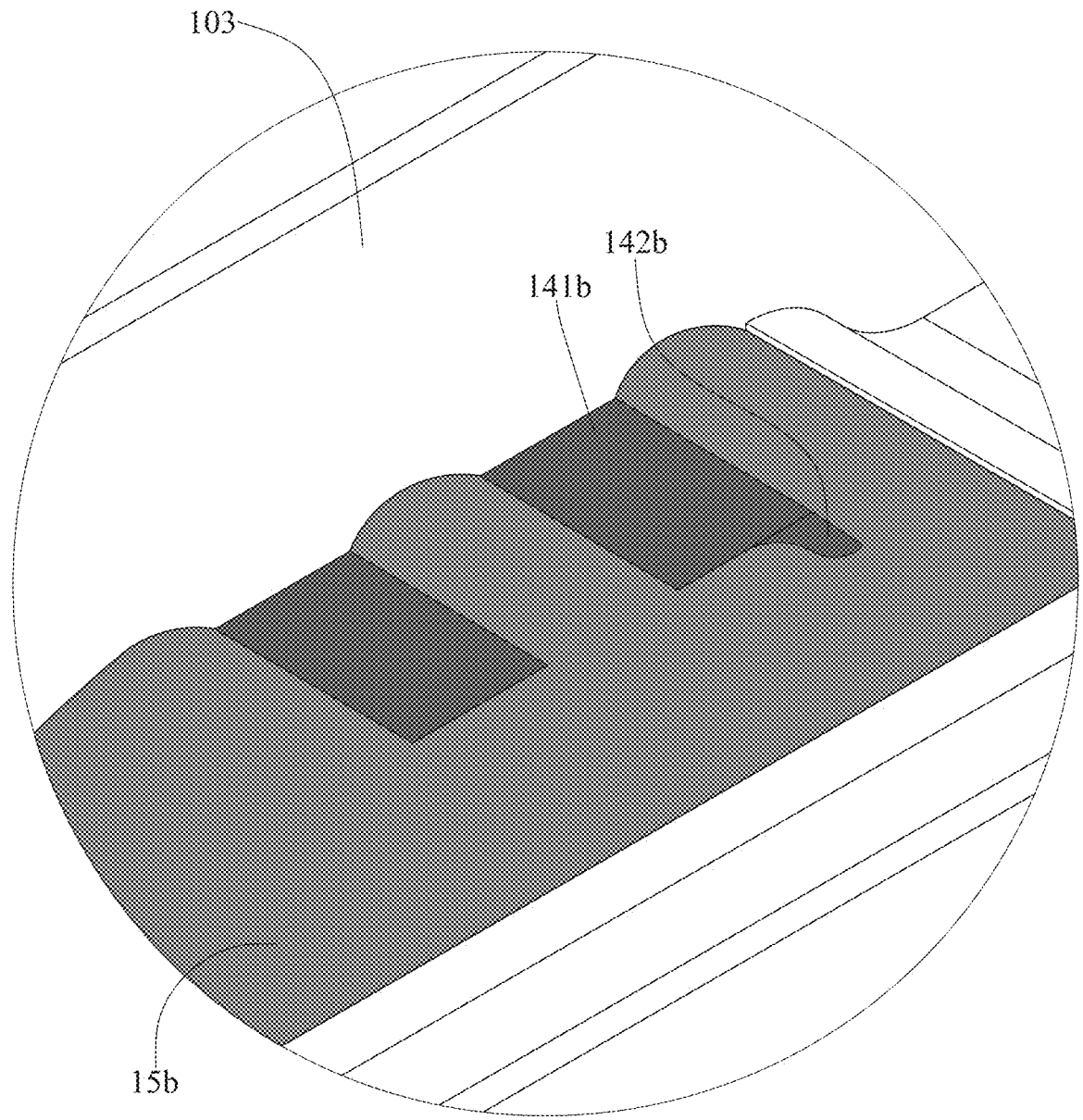
FIG. 6 is a perspective view showing a liquid is disposed on the optical mark structure of the imaging lens system of FIG. 5.

Please refer to FIG. 1 to FIG. 6, wherein FIG. 1 is an exploded view of an actuator according to the 1st embodiment of the present disclosure coupled with an imaging lens system, FIG. 2 is an enlarged view showing a liquid is disposed on an optical mark structure of the PP region of the imaging lens system of FIG. 1, FIG. 3 is an enlarged view showing the QQ region of the optical mark structure of the imaging lens system of FIG. 2, FIG. 4 is another exploded view of the actuator of FIG. 1 coupled with the imaging lens system, FIG. 5 is an enlarged view showing the RR region of the imaging lens system of FIG. 4, and FIG. 6 is a perspective view showing a liquid is disposed on the optical mark structure of the imaging lens system of FIG. 5.

In this embodiment, an actuator 1 is provided. The actuator 1 is configured to drive an imaging lens system 10. The actuator 1 includes a frame portion 11, a supporting portion 12 and two driving portions 13. The imaging lens system 10 has an optical axis 101. The imaging lens system 10 includes a plurality of optical elements 102 and a lens barrel 103. The optical elements 102 are arranged along the optical axis 101. The lens barrel 103 surrounds the optical axis 101, and the optical elements 102 are accommodated in the lens barrel 103.

The frame portion 11 has an accommodating space (not numbered) for the lens barrel 103 of the imaging lens system 10 accommodated therein along an assembly direction DA. The supporting portion 12 is disposed on the frame portion 11. Specifically, the supporting portion 12 includes four supporting elements 121 of spherical balls. The frame portion 11 has four supporting portion mounting sections 11a corresponding to the shapes of the spherical balls. One end of each of the supporting elements 121 of the supporting portion 12 is configured to support the imaging lens system 10, and the other end of each of the supporting elements 121 of the supporting portion 12 is disposed on the supporting portion mounting sections 11a, such that the supporting elements 121 are in physical contact with the frame portion 11 and the imaging lens system 10 and are configured to give the imaging lens system 10 a degree of freedom of movement with respect to the frame portion 11 along a direction parallel to the optical axis 101.

The driving portions 13 are disposed at two opposite sides of the lens barrel 103 of the imaging lens system 10 along a direction perpendicular to the optical axis 101 and the assembly direction DA. Each of the driving portions 13 includes a coil 131 and a magnet 132 spatially disposed opposite to each other.

Specifically, the imaging lens system 10 has two driving portion mounting sections 10a and 10b. The driving portion mounting section 10a and the driving portion mounting section 10b are disposed at two opposite sides of the lens barrel 103 of the imaging lens system 10 in a direction perpendicular to the optical axis 101 and the assembly direction DA. The magnets 132 are respectively disposed on the driving portion mounting section 10a and the driving portion mounting section 10b of the imaging lens system 10, and the coils 131 are disposed at positions of the frame portion 11 respectively corresponding to the magnets 132. When a current flows into the coils 131, a force would be generated due to a magnetic field between the coils 131 and the magnets 132, by which the driving portions 13 can move the imaging lens system 10 along the direction parallel to the optical axis 101 by the degree of freedom of movement.

The actuator 1 further includes two optical mark structures 14a and 14b respectively disposed on the driving portion mounting section 10a and the driving portion mounting section 10b. The optical mark structure 14a faces one of the magnets 132 of the driving portions 13 in a direction perpendicular to the optical axis 101 and the assembly direction DA, and the optical mark structure 14b faces the other of the magnets 132 of the driving portions 13 in the assembly direction DA.

The optical mark structure 14a is a three-dimensional optical mark structure and includes a plurality of optical mark units 140a. The optical mark structure 14b is a three-dimensional optical mark structure and includes a plurality of optical mark units 140b.

Each of the optical mark units 140a includes a first optical mark surface 141a and a second optical mark surface 142a. The first optical mark surface 141a and the second optical mark surface 142a of each of the optical mark units 140a are arranged side by side in a direction parallel to the optical axis 101 and the assembly direction DA. The optical mark units 140a are arranged side by side along a direction parallel to the optical axis 101 and the assembly direction DA, such that the optical mark structure 14a forms a mesh pattern.

When an area of each of the first optical mark surfaces 141a is A, the following condition is satisfied: $A=9.0\times10E-2$ [mm$^2$].

When a distance between center points of adjacent two of the first optical mark surfaces 141a is D, the following condition is satisfied: $D=0.6$ [mm].

When the area of each of the first optical mark surfaces 141a is A, and the distance between center points of adjacent two of the first optical mark surfaces 141a is D, the following condition is satisfied: $\sqrt{(A)}/D=0.5$.

The first optical mark surfaces 141a and the second optical mark surfaces 142a have different gloss values in a direction.

When an angle between an observation direction and the optical mark structure 14a is $\theta$, the following condition is satisfied: $50$ [deg.]$\leq\theta\leq90$ [deg.]. When a gloss value difference in the observation direction between the first optical mark surface 141a and the second optical mark surface 142a of each of the plurality of optical mark units 140a is $\Delta G$, the following condition is satisfied: $15$ [GU]$\leq\Delta G\leq50$ [GU].

When a height difference in a direction perpendicular to the first optical mark surface 141a between the first optical mark surface 141a and the second optical mark surface 142a of each of the plurality of optical mark units 140a is $\Delta H$, the following condition is satisfied: $\Delta H=0.005$ [mm].

The actuator 1 further includes a liquid 15a disposed on the optical mark structure 14a. The liquid 15a faces one of the magnets 132 of the driving portions 13. The liquid 15a is in physical contact with the one of the magnets 132 so as to fix the one of the magnets 132 to the lens barrel 103 of the imaging lens system 10.

Each of the plurality of optical mark units 140b includes a first optical mark surface 141b, a second optical mark surface 142b and a third optical mark surface 143b. The first optical mark surface 141b and the second optical mark surface 142b of each of the optical mark units 140b are arranged side by side in a direction from one driving portion 13 to the other driving portion 13, and the third optical mark surface 143b is arranged side by side with the first optical mark surface 141b and the second optical mark surface 142b of each of the optical mark units 140b. The optical mark units 140b are arranged side by side along a direction parallel to the optical axis 101.

When an area of each of the first optical mark surfaces 141b is A, the following condition is satisfied: $A=8.4\times10E-2$ [mm$^2$].

When an area of each of the second optical mark surfaces 142b is A2, the following condition is satisfied: $A2=8.4\times10E-2$ [mm$^2$].

When an area of each of the third optical mark surfaces 143b is A3, the following condition is satisfied: $A3=1.61\times10E-1$ [mm$^2$].

When a distance between center points of adjacent two of the first optical mark surfaces 141b is D, the following condition is satisfied: $D=0.47$ [mm].

When the area of each of the first optical mark surfaces 141b is A, and the distance between center points of adjacent two of the first optical mark surfaces 141b is D, the following condition is satisfied: $\sqrt{(A)}/D=0.617$.

The first optical mark surfaces 141b, the second optical mark surfaces 142b and the third optical mark surfaces 143b have different gloss values in a direction.

When an angle between an observation direction and the optical mark structure 14b is $\theta$, the following condition is satisfied: $50$ [deg.]$\leq\theta\leq90$ [deg.]. When a gloss value difference in the observation direction between two of the first optical mark surface 141b, the second optical mark surface 142b and the third optical mark surface 143b of each of the optical mark units 140b is $\Delta G$, the following condition is satisfied: $15$ [GU]$\leq\Delta G\leq50$ [GU].

When a height difference in a direction perpendicular to the first optical mark surface 141b between the first optical mark surface 141b and the third optical mark surface 143b of each of the optical mark units 140b is $\Delta H$, the following condition is satisfied: $\Delta H=0.025$ [mm].

When an angle between the first optical mark surface 141b and the second optical mark surface 142b of each of the optical mark units 140b is $\phi$, the following condition is satisfied: $\phi=5$ [deg.].

The actuator 1 further includes a liquid 15b disposed on the optical mark structure 14b. Please refer to FIG. 6, which shows the liquid 15b disposed on the optical mark structure 14b of the imaging lens system 10. When the liquid 15b covers all of the third optical mark surfaces 143b and part of the second optical mark surfaces 142b, it means the dispensing amount of the liquid 15b is appropriate. When the liquid 15b covers only part of the third optical mark surfaces 143b, it means the dispensing amount of the liquid 15b is insufficient. When the liquid 15b covers all of the first optical mark surfaces 141b, it means the dispensing amount of the liquid 15b is excessive. The liquid 15b faces the other of the magnets 132 of the driving portions 13. The liquid 15b is in physical contact with the other of the magnets 132 so as to fix the other of the magnets 132 to the lens barrel 103 of the imaging lens system 10.

2nd Embodiment

Figure 7:
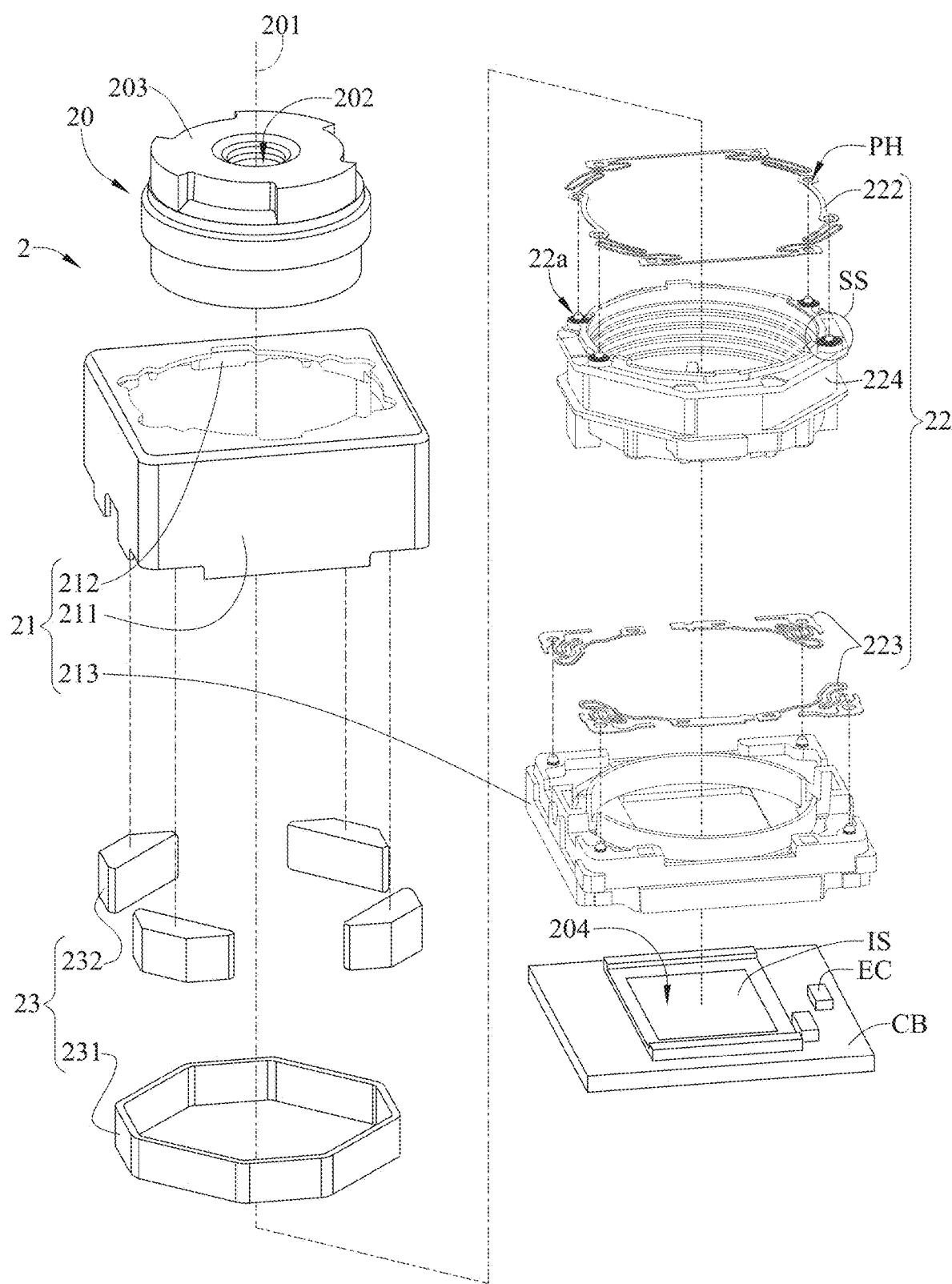
FIG. 7 is an exploded view of an actuator according to the 2nd embodiment of the present disclosure coupled with an imaging lens system.
Figure 8:
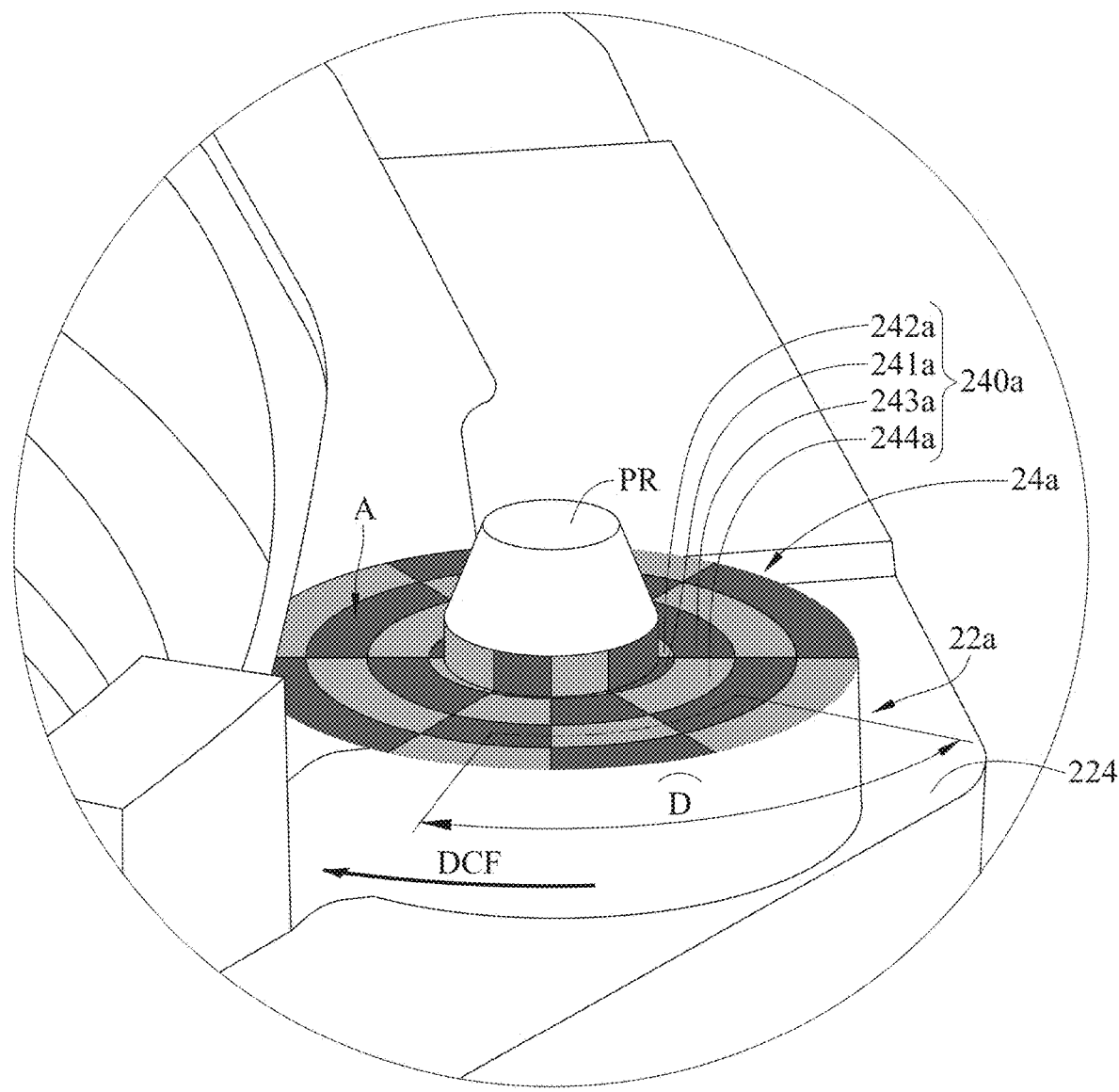
FIG. 8 is an enlarged view showing the SS region of part of the actuator of FIG. 7.
Figure 9:
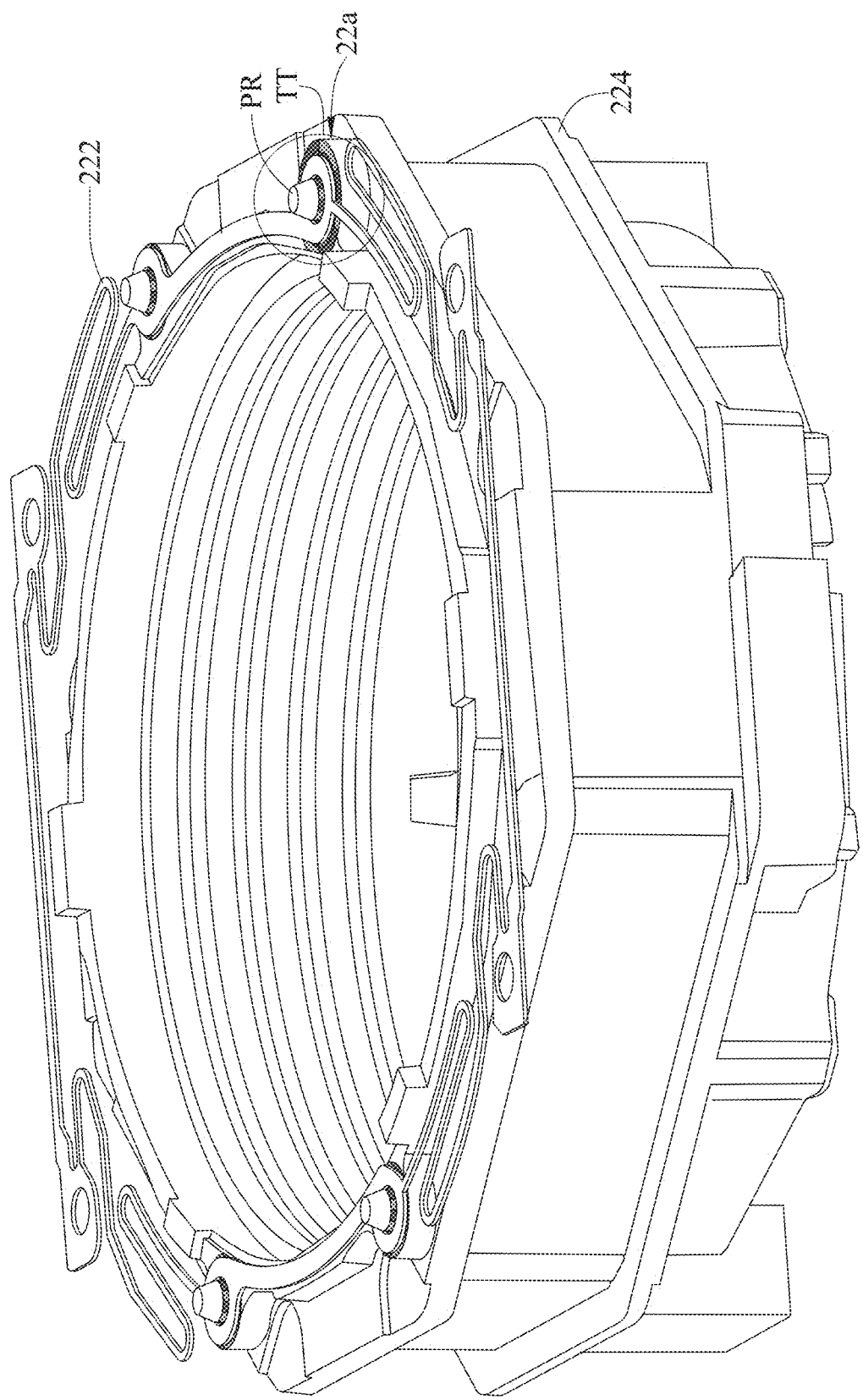
FIG. 9 is a perspective view of the part of the actuator of FIG. 7.
Figure 10:
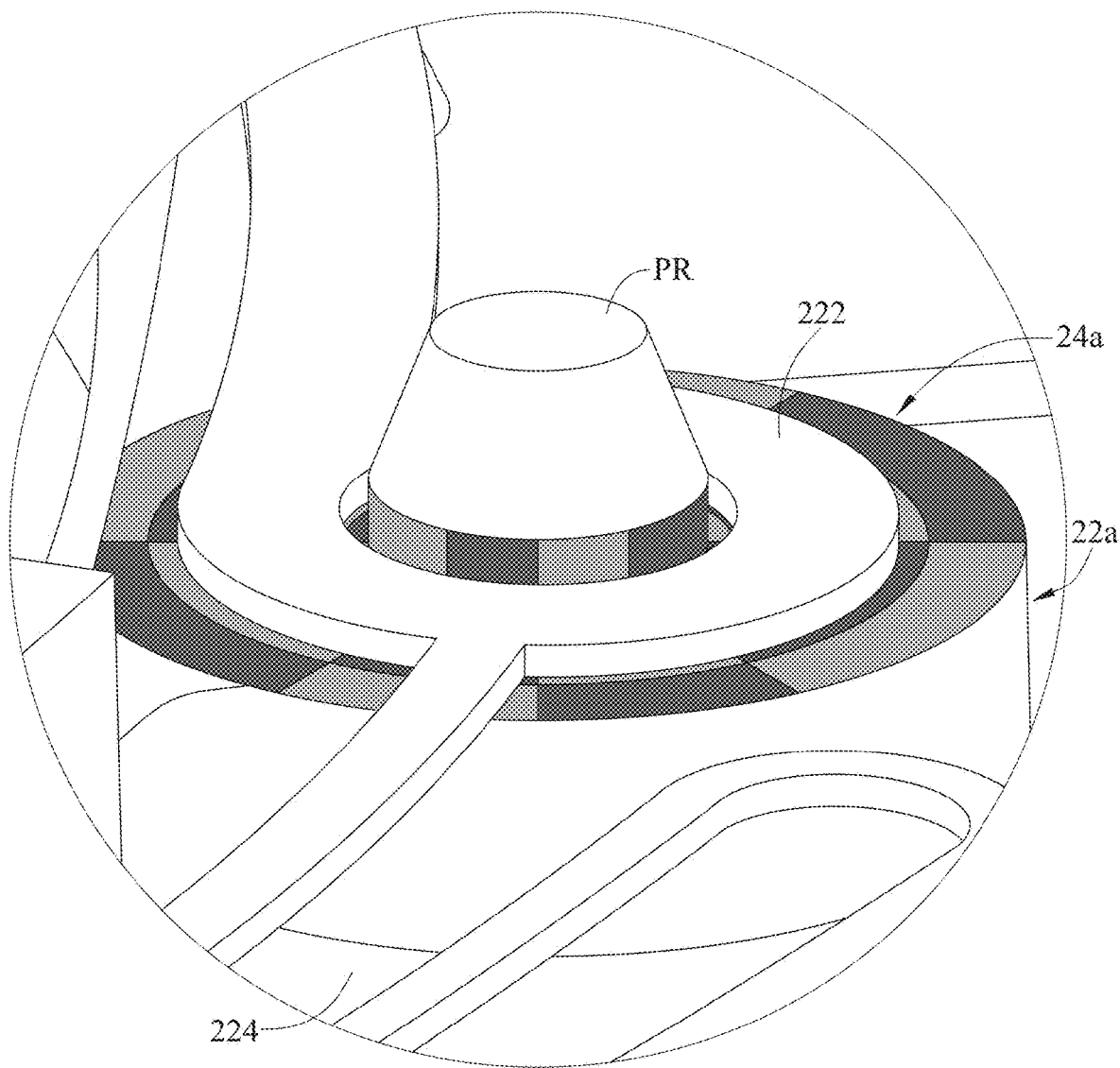
FIG. 10 is an enlarged view showing the TT region of the part of the actuator of FIG. 9.
Figure 11:
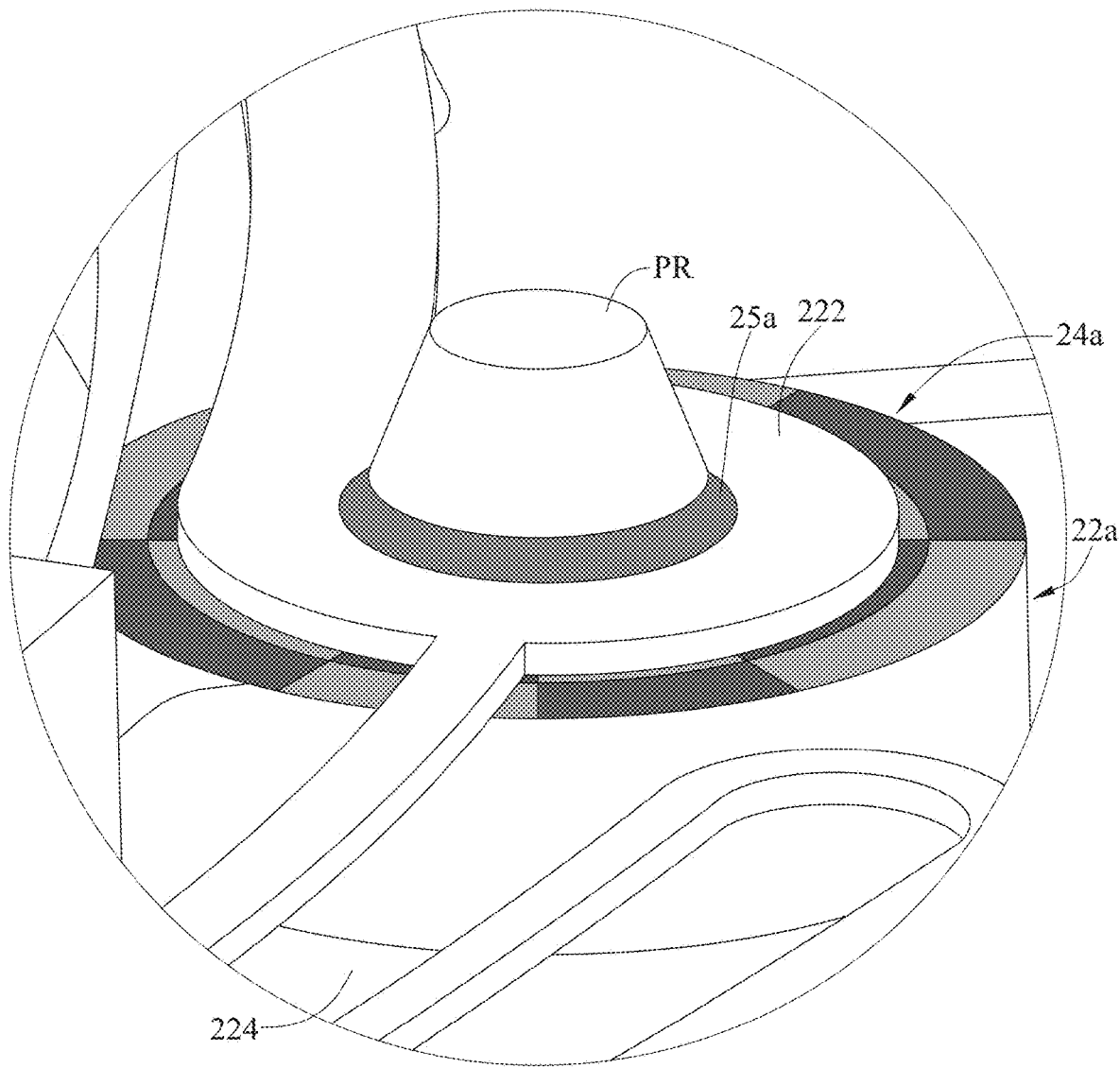
FIG. 11 is a perspective view showing a liquid is disposed on the optical mark structure of the part of the actuator of FIG. 10.

Please refer to FIG. 7 to FIG. 11, wherein FIG. 7 is an exploded view of an actuator according to the 2nd embodiment of the present disclosure coupled with an imaging lens system, FIG. 8 is an enlarged view showing the SS region of part of the actuator of FIG. 7, FIG. 9 is a perspective view of the part of the actuator of FIG. 7, FIG. 10 is an enlarged view showing the TT region of the part of the actuator of FIG. 9, and FIG. 11 is a perspective view showing a liquid is disposed on the optical mark structure of the part of the actuator of FIG. 10.

In this embodiment, an actuator 2 is provided. The actuator 2 is configured to drive an imaging lens system 20. The actuator 2 includes a frame portion 21, a supporting portion 22 and a driving portion 23. The imaging lens system 20 has an optical axis 201. The imaging lens system 20 includes a plurality of optical elements 202 and a lens barrel 203. The optical elements 202 are arranged along the optical axis 201. The lens barrel 203 surrounds the optical axis 201, and the optical elements 202 are accommodated in the lens barrel 203.

The frame portion 21 includes an upper frame 211, a cushion 212 and a lower frame 213. The cushion 212 is disposed on the upper frame 211. The lower frame 213 and the upper frame 211 form an accommodating space (not numbered) therebetween for the lens barrel 203 of the imaging lens system 20 accommodated therein along a direction parallel to the optical axis 201. The supporting portion 22 includes an upper elastic element 222, two lower elastic elements 223 and a step portion 224. The upper elastic element 222 is disposed on the upper frame 211 of the frame portion 21 and located at a side of the step portion 224. The lower elastic element 223 is disposed on the lower frame 213 of the frame portion 21 and located at the other side of the step portion 224. The step portion 224 of the supporting portion 22 is configured to support and to be in physical contact with the imaging lens system 20. The upper elastic element 222 and the lower elastic element 223 are flat springs that can be elastically deformed along a direction parallel to the optical axis 201 and are configured to give the imaging lens system 20 a degree of freedom of movement with respect to the frame portion 21 along a direction parallel to the optical axis 201.

Specifically, the step portion 224 of the supporting portion 22 has four supporting portion mounting sections 22a at an object side thereof. The supporting portion 22 includes four positioning protrusions PR respectively located on the supporting portion mounting sections 22a of the step portion 224. The upper elastic element 222 has four positioning holes PH respectively corresponding to the positioning protrusions PR. The upper elastic element 222 cover at least part of the step portion 224 via the engagement of the positioning holes PH and the positioning protrusions PR disposed on the supporting portion mounting sections 22a.

The driving portion 23 is disposed around the step portion 224 along a direction perpendicular to the optical axis 201. The driving portion 23 includes a coil 231 and four magnets 232 spatially disposed opposite to each other. Specifically, the coil 231 is disposed surrounding the step portion 224. The magnets 232 are disposed on the upper frame 211 and are respectively located at four corners between the coil 231 and the upper frame 211. When a current flows into the coil 231, a force would be generated due to a magnetic field between the coil 231 and the magnets 232, by which the driving portion 23 can move the imaging lens system 20 along the direction parallel to the optical axis 201 by the degree of freedom of movement.

The actuator 2 and the imaging lens system 20 are coupled with an image sensor IS, a plurality of electronic components EC and a circuit board CB. The image sensor IS is disposed on an image surface 204 of the imaging lens system 20 and electrically connected to the electronic components EC and the circuit board CB so as to receive the imaging light information on the image surface 204 and then transmit the imaging light information to the electronic components EC and the circuit board CB.

The actuator 2 further includes four optical mark structures 24a respectively disposed on the supporting portion mounting sections 22a of the step portion 224. The optical mark structures 24a face the upper elastic element 222 of the supporting portion 22 along a direction parallel to the optical axis 201.

Each of the optical mark structures 24a is a two-dimensional optical mark structure and includes a plurality of optical mark units 240a.

Each of the plurality of optical mark units 240a of each of the optical mark structures 24a includes a first optical mark surface 241a, a second optical mark surface 242a, a third optical mark surface 243a and a fourth optical mark surface 244a. The first optical mark surface 241a and the second optical mark surface 242a are arranged side by side in a circumference direction DCF surrounding the positioning protrusion PR of each of the optical mark units 240a. The third optical mark surface 243a and the fourth optical mark surface 244a of each of the optical mark units 240a are arranged side by side in the circumference direction DCF and are located farther away from the positioning protrusion PR than the first optical mark surface 241a and the second optical mark surface 242a. That is, in each optical mark unit 240a, the first optical mark surface 241a, the second optical mark surface 242a, the third optical mark surface 243a and the fourth optical mark surface 244a can be regarded as a 2×2 matrix with an arc shape. The optical mark units 240a are arranged side by side along the circumference direction DCF and a direction away from the positioning protrusion PR, such that each of the optical mark structures 24a forms a mesh pattern. In addition, each of the optical mark structures 24a also extends along a direction parallel to the optical axis 201 so as to be disposed on part of the positioning protrusion PR.

When an area of one of the first optical mark surfaces 241a farthest away from the positioning protrusion PR is A, the following condition is satisfied: $A=1.77\times10E-2$ [mm$^2$].

When a distance along the circumference direction DCF between center points of adjacent two of the first optical mark surfaces 241a farthest away from the positioning protrusion PR is D, the following condition is satisfied: $D=0.50$ [mm]. In this embodiment, adjacent two of the first optical mark surfaces 241a farthest away from the positioning protrusion PR refer to two adjacent first optical mark surfaces 241a that are substantially equidistant from the geometric center point of the positioning protrusion PR.

When the area of one of the first optical mark surfaces 241a farthest away from the positioning protrusion PR is A, and the distance along the circumference direction DCF between center points of adjacent two of the first optical mark surfaces 241a farthest away from the positioning protrusion PR is D, the following condition is satisfied: $\sqrt{(A)}/D=0.266$.

The first optical mark surfaces 241a and the second optical mark surfaces 242a have different gloss values in a direction, the first optical mark surfaces 241a and the third optical mark surfaces 243a have the same gloss value in a direction, and the second optical mark surfaces 242a and the fourth optical mark surfaces 244a have the same gloss value in a direction.

When an angle between an observation direction and the optical mark structure 24a is θ, the following condition is satisfied: 50 [deg.]≤θ≤90 [deg.]. When a gloss value difference in the observation direction between the first optical mark surface 241a and the second optical mark surface 242a of each of the optical mark units 240a is ΔG, the following condition is satisfied: 15 [GU]≤ΔG≤50 [GU].

The actuator 2 further includes four liquids 25a respectively disposed on the optical mark structures 24a. The liquids 25a face the upper elastic element 222. The liquids 25a are in physical contact with the upper elastic element 222 so as to fix the upper elastic element 222 to the step portion 224 of the supporting portion 22. As shown in FIG. 10 and FIG. 11, when the upper elastic element 222 facing the optical mark structures 24a is fixed to the positioning protrusions PR via the positioning holes PH, only part of each of the optical mark structures 24a is covered by the upper elastic element 222. Therefore, the other part of each of the optical mark structures 24a not covered by the upper elastic element 222 can be identified by the optical mark system for the subsequent adhesive dispensing process so as to further increase the degree of identification of the partially covered optical mark structures 24a, thereby increasing the yield rate of the adhesive dispensing process.

3rd Embodiment

Figure 12:
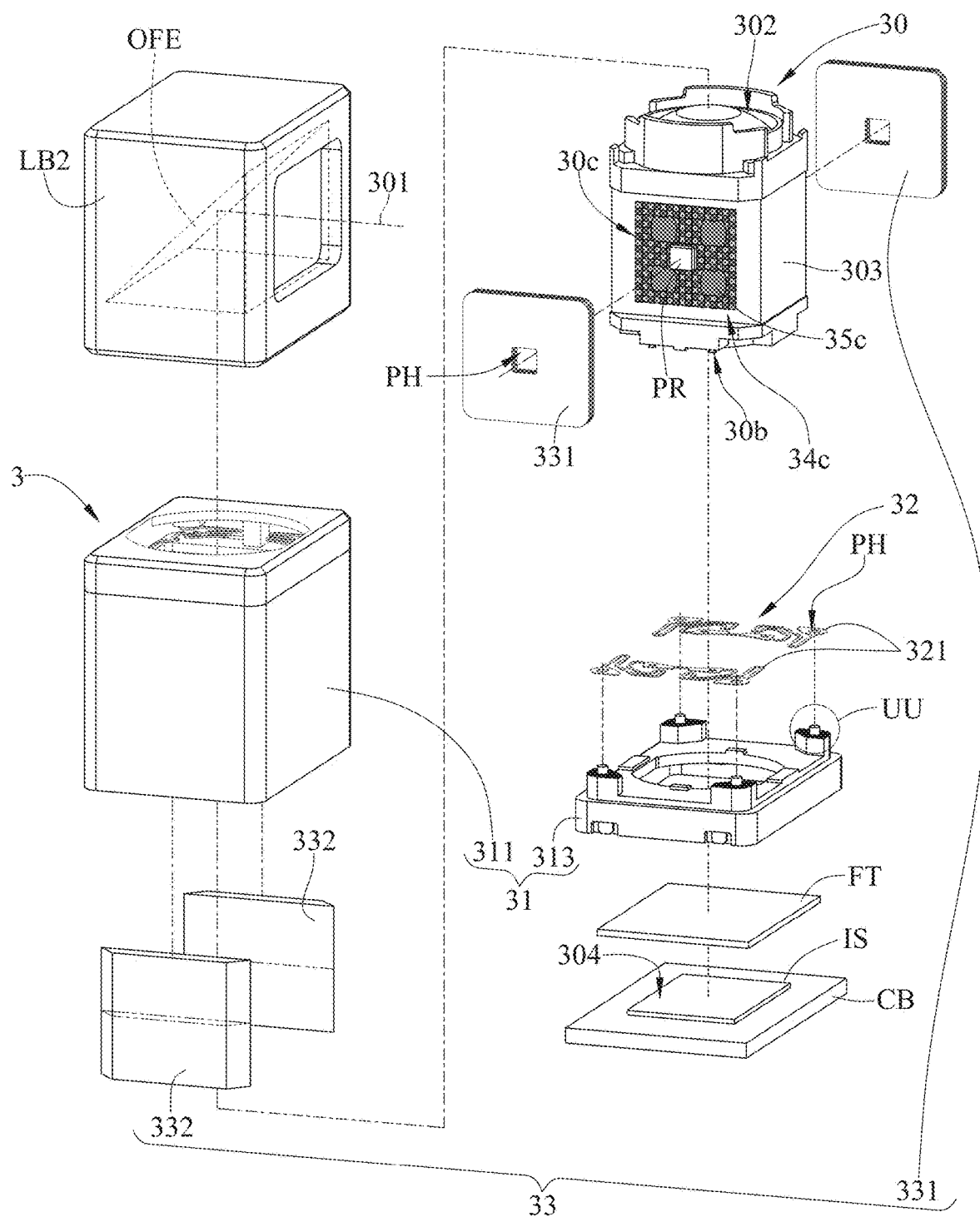
FIG. 12 is an exploded view of an actuator according to the 3rd embodiment of the present disclosure coupled with an imaging lens system.
Figure 13:
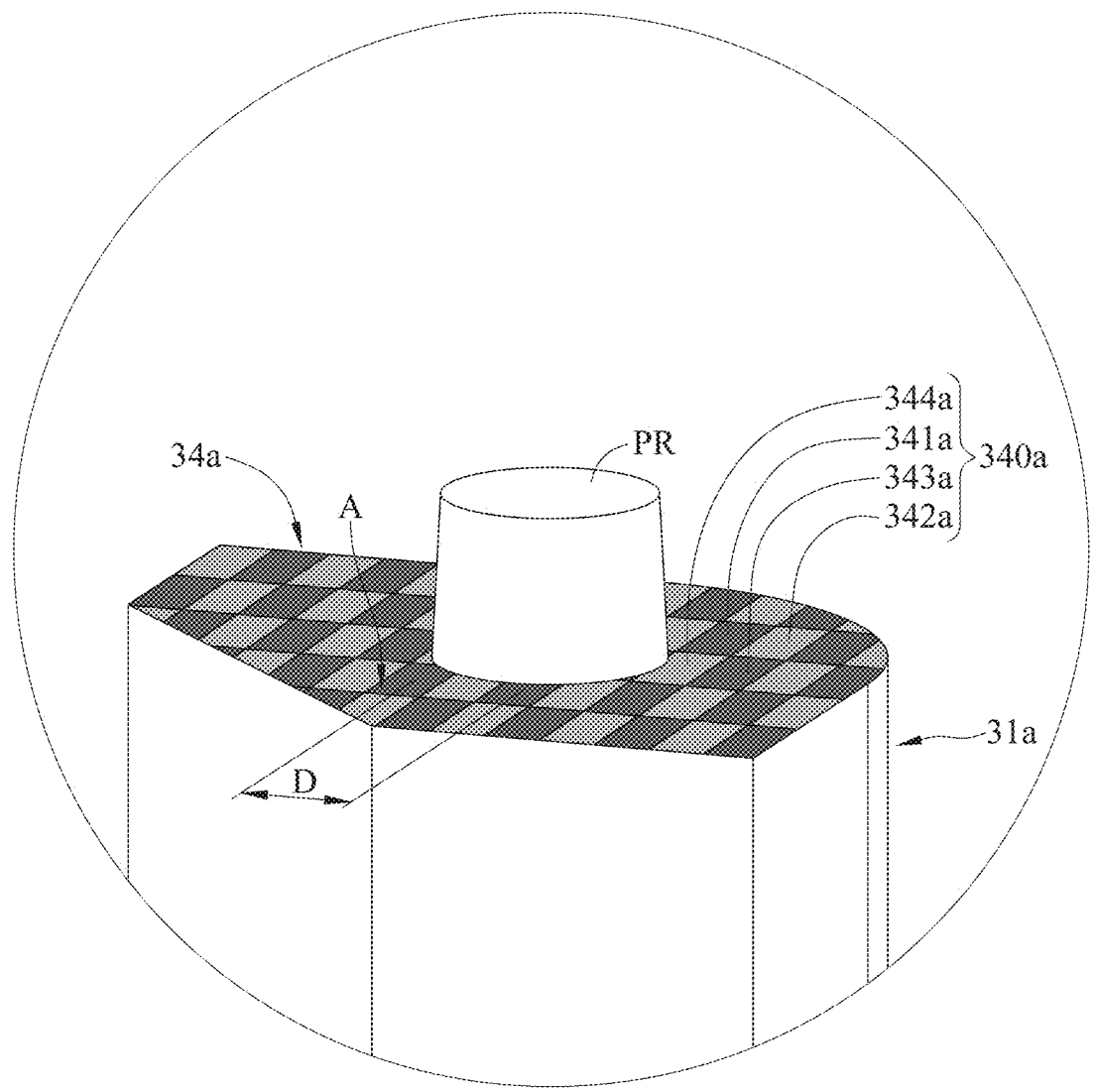
FIG. 13 is an enlarged view showing the UU region of part of the actuator of FIG. 12.
Figure 14:
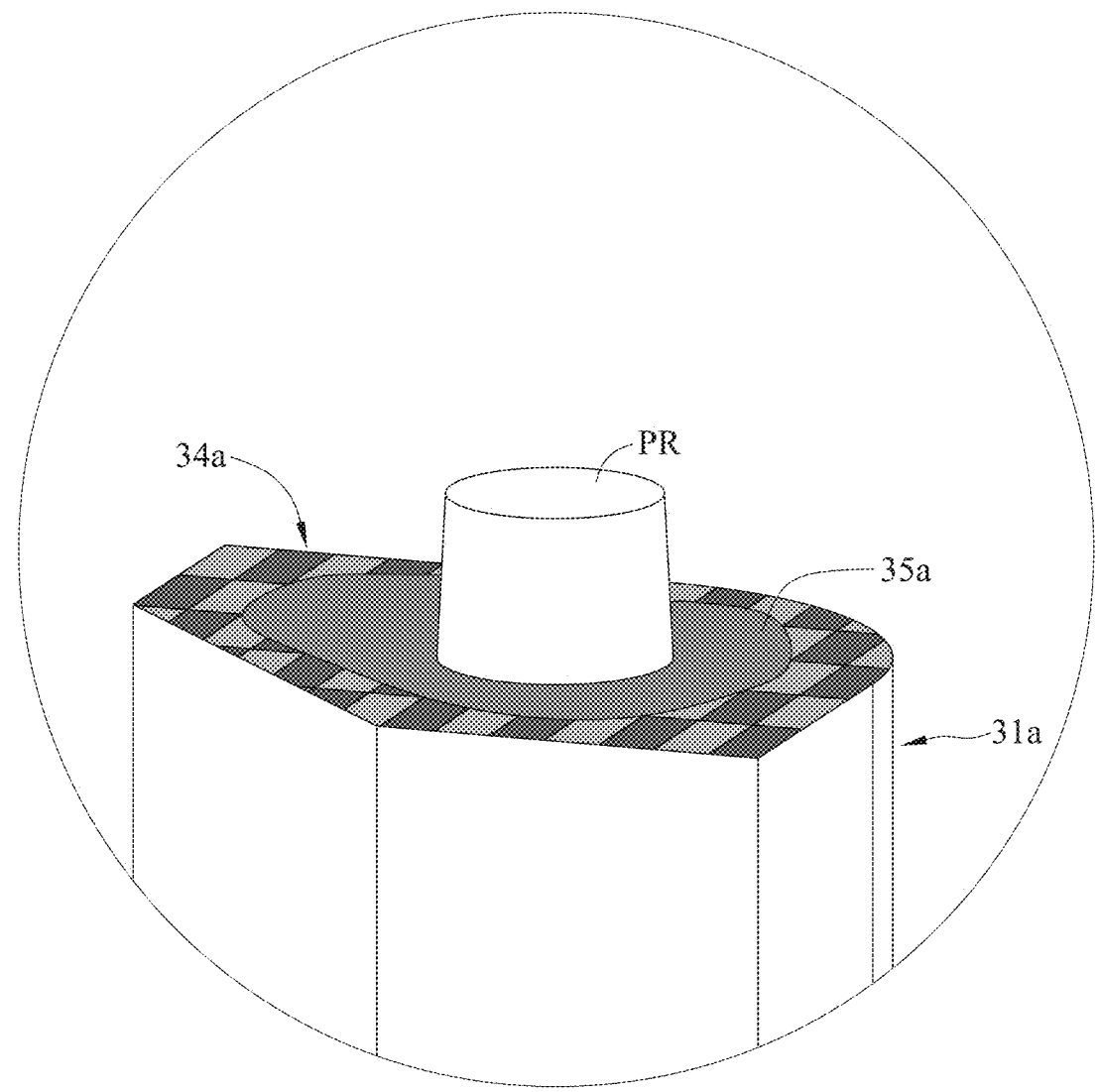
FIG. 14 is a perspective view showing a liquid is disposed on the optical mark structure of the part of the actuator of FIG. 13.
Figure 15:
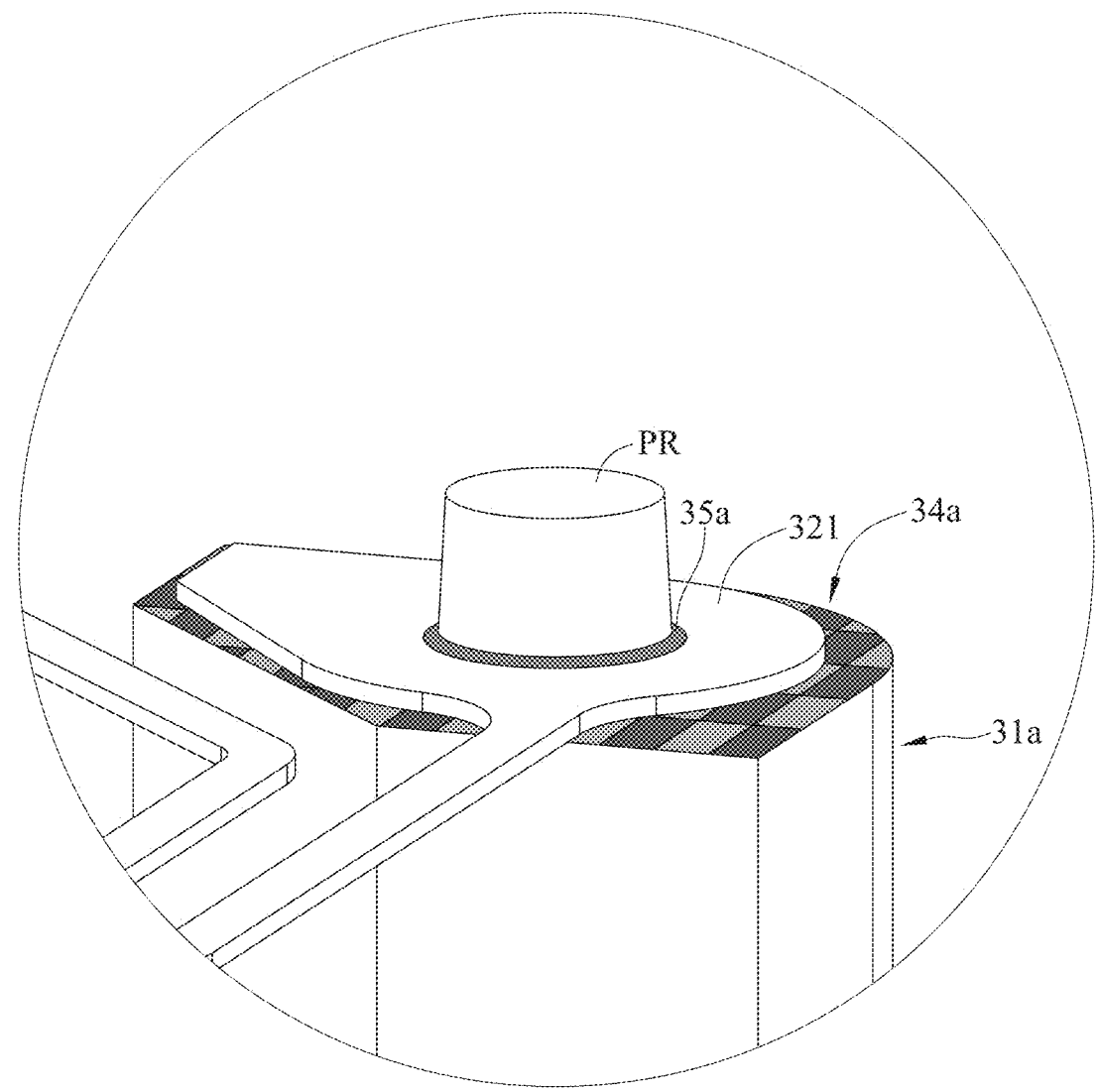
FIG. 15 is a perspective view showing the optical mark structure of the part of the actuator of FIG. 13 is fixed to another part of the actuator via the liquid.
Figure 16:
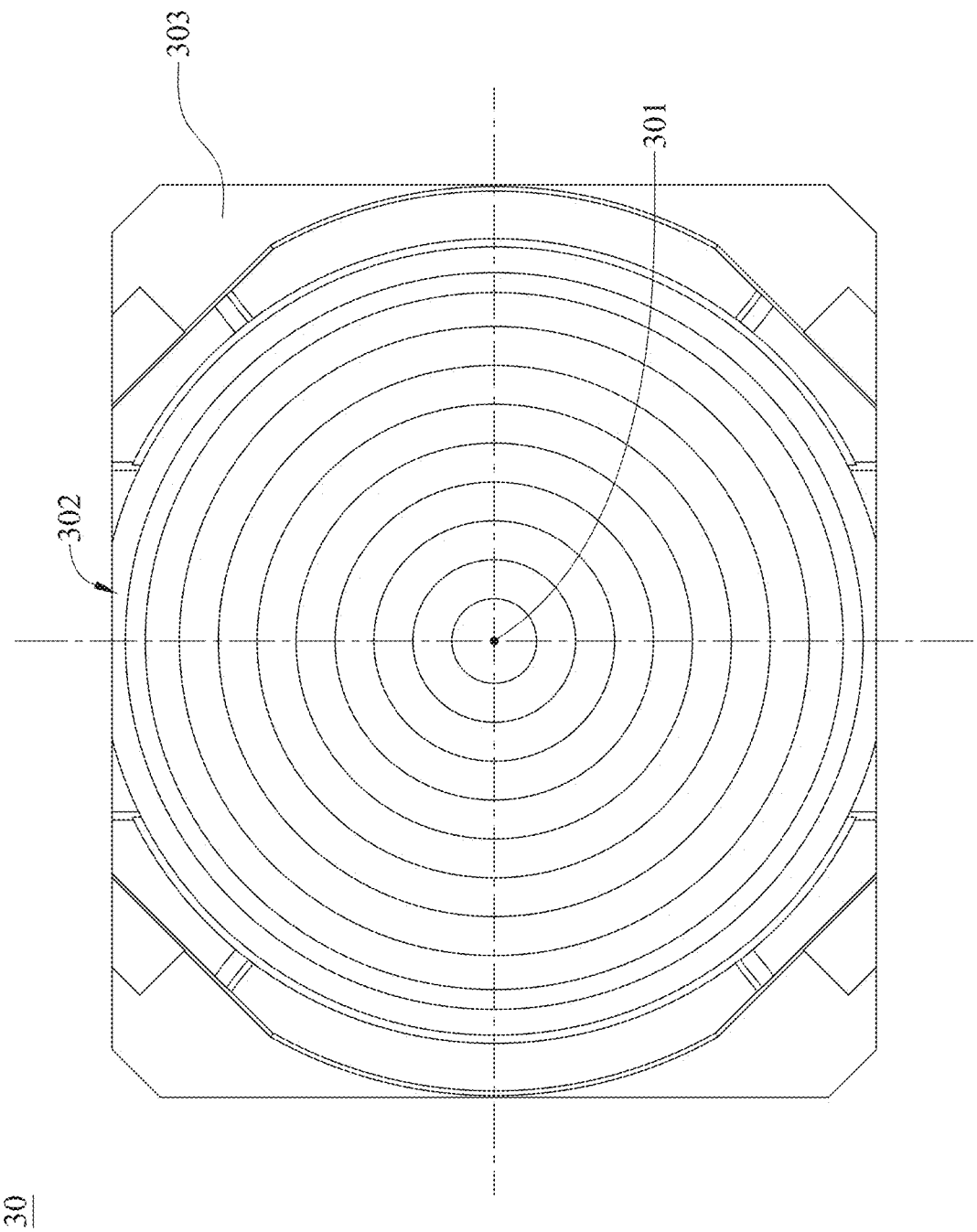
FIG. 16 is a front view of the imaging lens system of FIG. 12.
Figure 17:
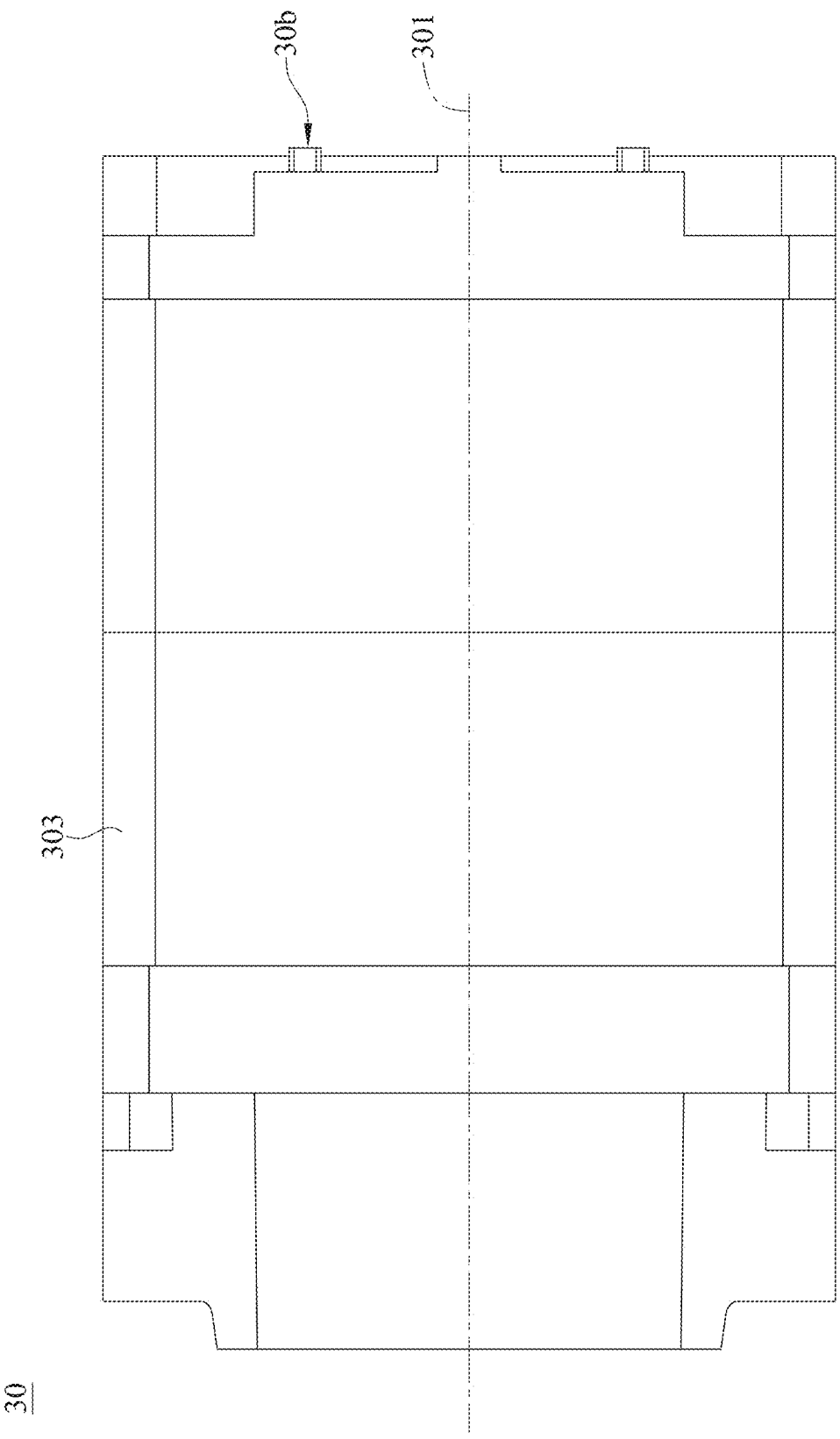
FIG. 17 is a side view of the imaging lens system of FIG. 12.
Figure 18:
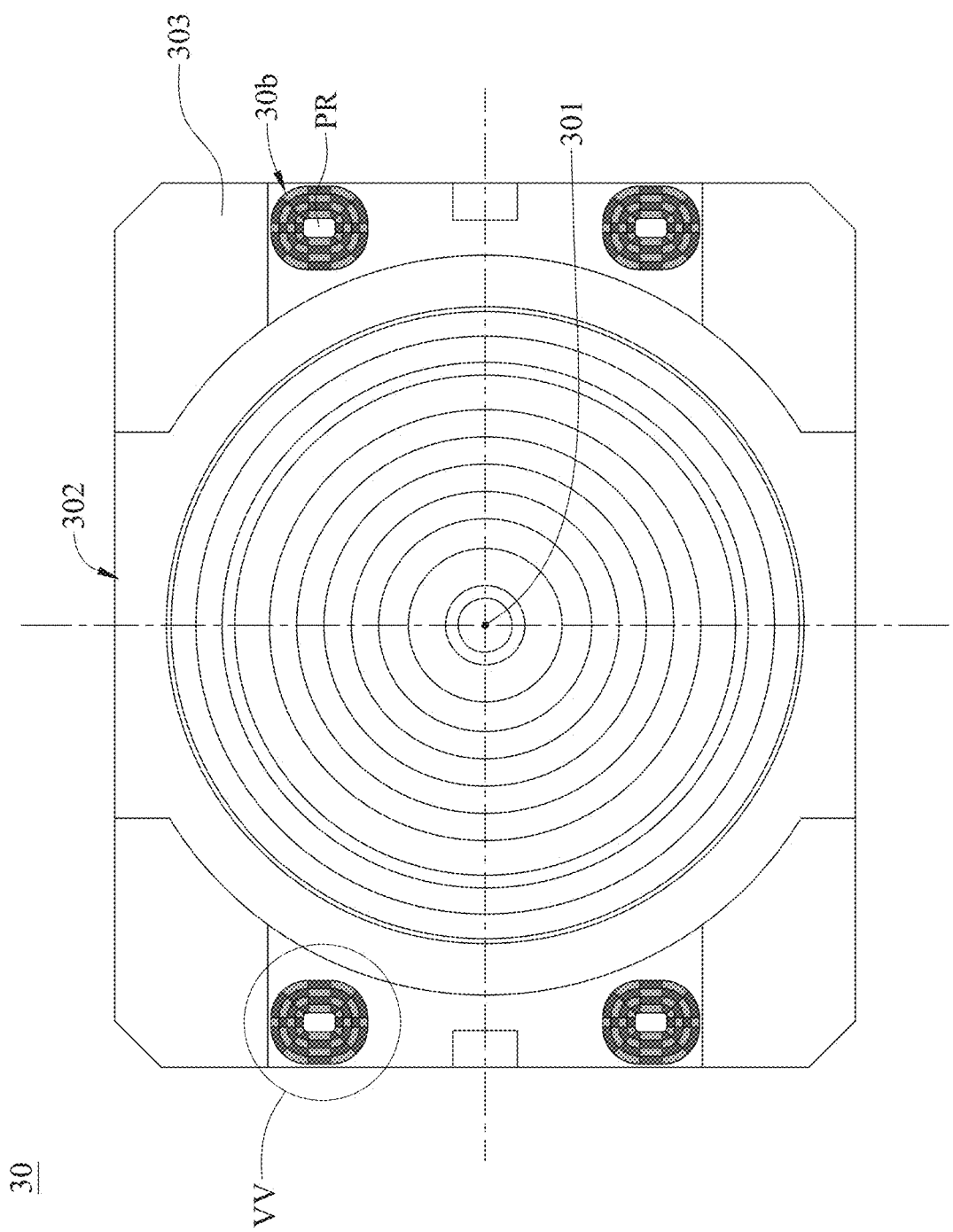
FIG. 18 is a rear view of the imaging lens system of FIG. 12.
Figure 19:
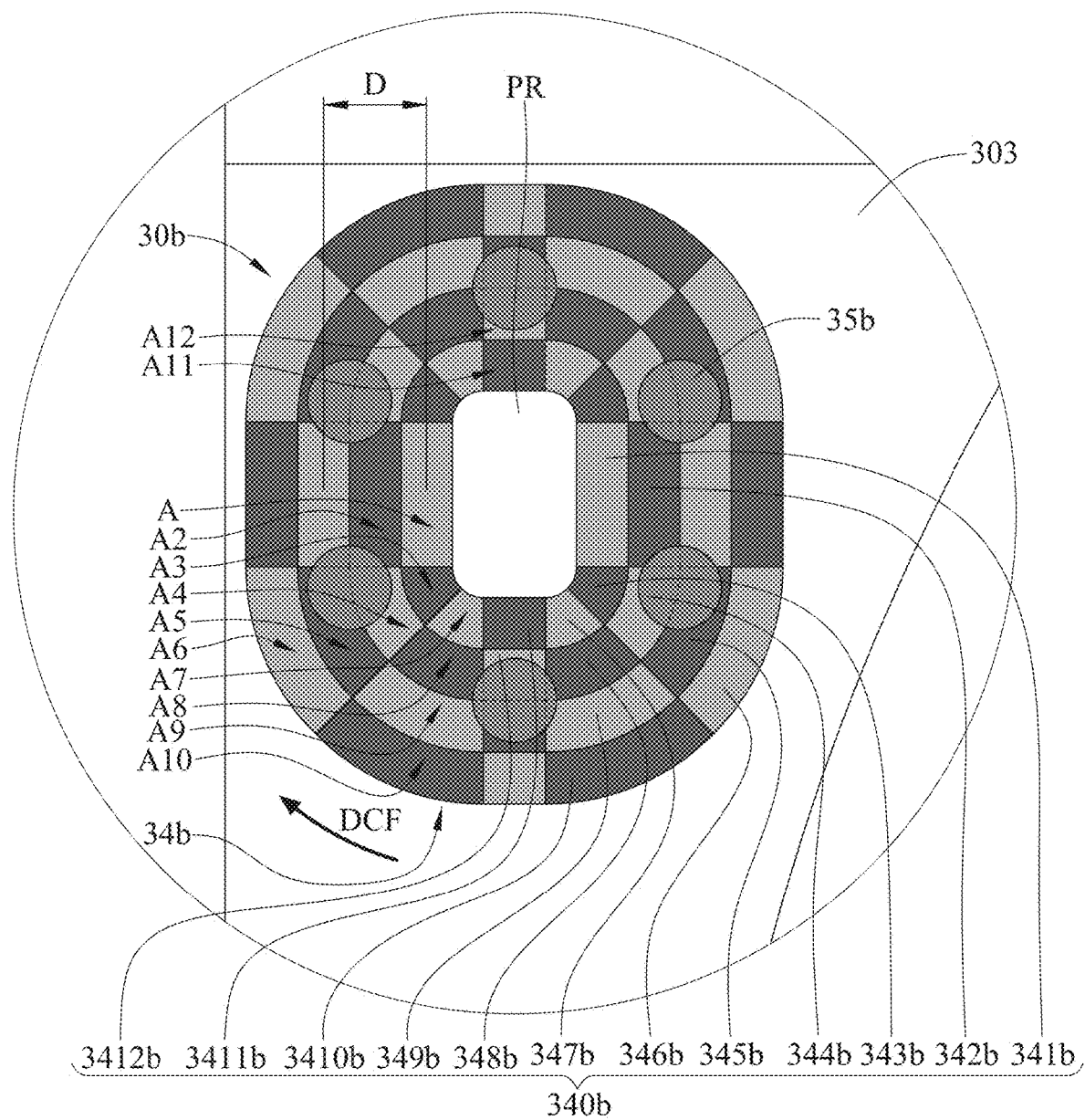
FIG. 19 is an enlarged view showing a liquid is disposed on the optical mark structure of the VV region of the imaging lens system of FIG. 18.
Figure 20:
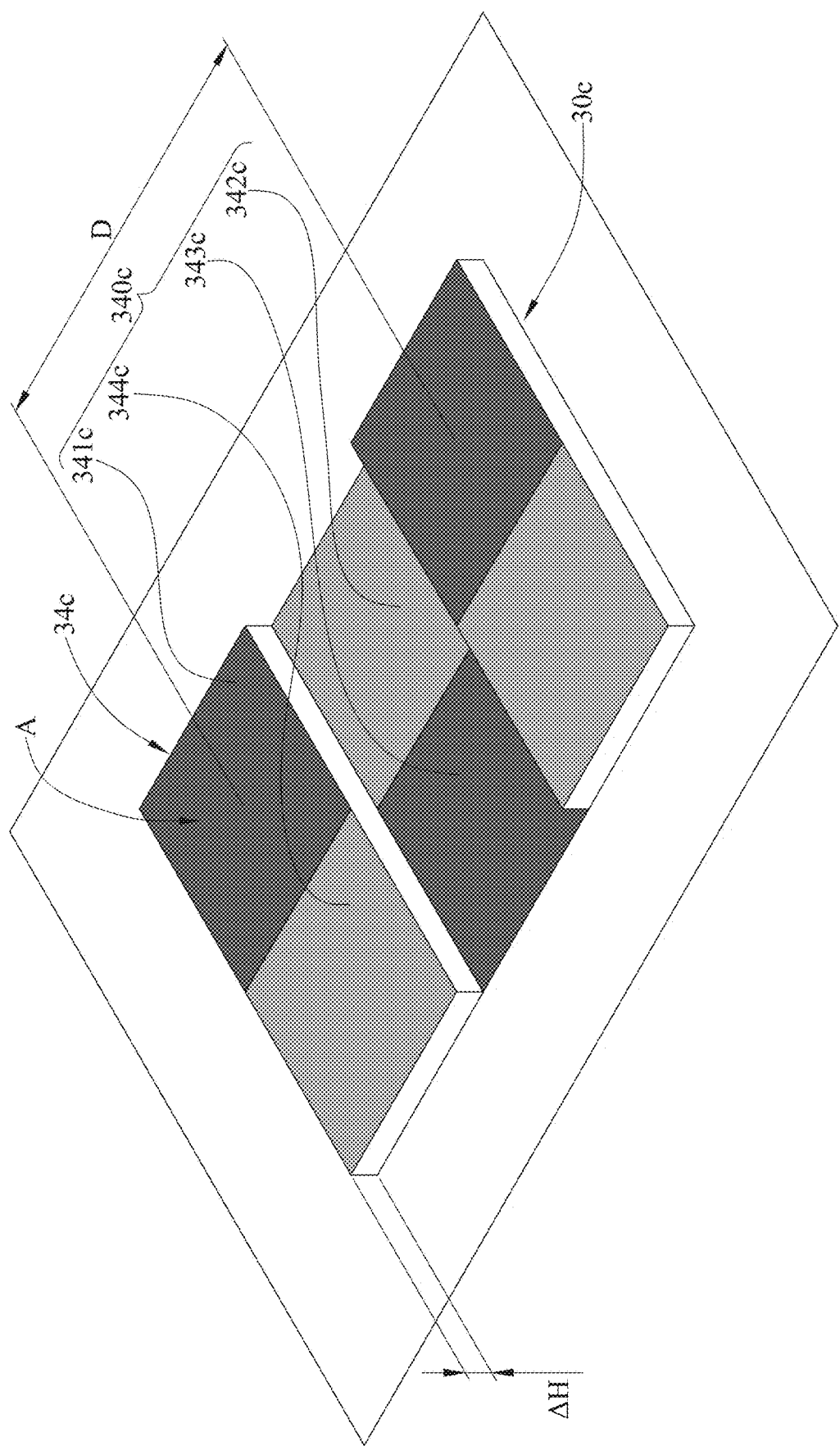
FIG. 20 is a perspective view of the optical mark structure of the imaging lens system of FIG. 12.

Please refer to FIG. 12 to FIG. 20, wherein FIG. 12 is an exploded view of an actuator according to the 3rd embodiment of the present disclosure coupled with an imaging lens system, FIG. 13 is an enlarged view showing the UU region of part of the actuator of FIG. 12, FIG. 14 is a perspective view showing a liquid is disposed on the optical mark structure of the part of the actuator of FIG. 13, FIG. 15 is a perspective view showing the optical mark structure of the part of the actuator of FIG. 13 is fixed to another part of the actuator via the liquid, FIG. 16 is a front view of the imaging lens system of FIG. 12, FIG. 17 is a side view of the imaging lens system of FIG. 12, FIG. 18 is a rear view of the imaging lens system of FIG. 12, FIG. 19 is an enlarged view showing a liquid is disposed on the optical mark structure of the VV region of the imaging lens system of FIG. 18, and FIG. 20 is a perspective view of the optical mark structure of the imaging lens system of FIG. 12.

In this embodiment, an actuator 3 is provided. The actuator 3 is configured to drive an imaging lens system 30. The actuator 3 includes a frame portion 31, a supporting portion 32 and two driving portions 33. The imaging lens system 30 has an optical axis 301. The imaging lens system 30 includes a plurality of optical elements 302, a lens barrel 303 and a secondary lens barrel LB2. The optical elements 302 are arranged along the optical axis 301 and include an optical-folding element OFE. The lens barrel 303 surrounds the optical axis 301, and several of the optical elements 302 are accommodated in the lens barrel 303. The secondary lens barrel LB2 is disposed at an object side of the lens barrel 303, and the optical-folding element OFE is accommodated in the secondary lens barrel LB2. As shown in FIG. 12, the optical-folding element OFE is, for example, a prism or a mirror, and the optical axis 301 extending from an object side of the imaging lens system 30 is folded by 90 degrees through the optical-folding element OFE so as to be more flexible in space arrangement.

The frame portion 31 includes an upper frame 311 and a lower frame 313. The lower frame 313 and the upper frame 311 form an accommodating space (not numbered) therebetween for the lens barrel 303 of the imaging lens system 30 accommodated therein along a direction parallel to the optical axis 301. The supporting portion 32 includes two supporting elements 321 disposed on the lower frame 313 of the frame portion 31. The supporting elements 321 of the supporting portion 32 are in physical contact with the lower frame 313 and the imaging lens system 30 and are configured to support the imaging lens system 30. The supporting elements 321 are flat springs that can be elastically deformed along a direction parallel to the optical axis 301 and are configured to give the imaging lens system 30 a degree of freedom of movement with respect to the frame portion 31 along a direction parallel to the optical axis 301.

Specifically, the lower frame 313 of the frame portion 31 has four supporting portion mounting sections 31a at an object side thereof. The frame portion 31 includes four positioning protrusions PR respectively located on the supporting portion mounting sections 31a of the lower frame 313. The supporting elements 321 have four positioning holes PH respectively corresponding to the positioning protrusions PR of the frame portion 31. The supporting elements 321 cover at least part of the lower frame 313 via the engagement of the positioning holes PH and the positioning protrusions PR disposed on the supporting portion mounting sections 31a. The imaging lens system 30 has four supporting portion mounting sections 30b at an image side thereof. The imaging lens system 30 includes four positioning protrusions PR that are non-cylindrical and are respectively located on the supporting portion mounting sections 30b. The supporting elements 321 are partially disposed on the supporting portion mounting sections 30b.

The driving portions 33 are disposed at two opposite sides of the lens barrel 303 of the imaging lens system 30 along a direction perpendicular to the optical axis 301. Each of the driving portions 33 includes a coil 331 and a magnet 332 spatially disposed opposite to each other.

Specifically, the imaging lens system 30 has two driving portion mounting sections 30c. The driving portion mounting sections 30c are disposed at two opposite sides of the lens barrel 303 of the imaging lens system 30 along a direction perpendicular to the optical axis 301. The imaging lens system 30 includes two positioning protrusions PR respectively located on the driving portion mounting sections 30c. The coils 331 have two positioning holes PH corresponding to the positioning protrusions PR of the imaging lens system 30. The coils 331 are disposed on the positioning protrusions PH on the driving portion mounting sections 30c via the positioning holes PH thereof, and the magnets 332 are disposed at positions of the upper frame 311 respectively corresponding to the coils 331. When a current flows into the coils 331, a force would be generated due to a magnetic field between the coils 331 and the magnets 332, by which the driving portions 33 can move the imaging lens system 30 along the direction parallel to the optical axis 301 by the degree of freedom of movement.

The actuator 3 and the imaging lens system 30 are coupled with a filter FT, an image sensor IS and a circuit board CB at an image side thereof. The filter FT is made of glass material and is disposed between the lower frame 313 and the image sensor IS, and will not affect the focal length of the imaging lens system 30. The image sensor IS is disposed on an image surface 304 of the imaging lens system 30 and electrically connected to the circuit board CB so as to receive the imaging light information on the image surface 304 and then transmit the imaging light information to the circuit board CB. For simplicity, only FIG. 12 is illustrated for showing the folded optical axis 301, while the optical axis 301 in the other drawings of this embodiment is illustrated in a straight line.

The actuator 3 further includes four optical mark structures 34a, four optical mark structures 34b and two optical mark structures 34c. The optical mark structures 34a are disposed on the supporting portion mounting sections 31a of the lower frame 313 and face the supporting elements 321 of the supporting portion 32 along a direction parallel to the optical axis 301. The optical mark structures 34b are disposed on the supporting portion mounting sections 30b of the imaging lens system 30 and face the supporting elements 321 of the supporting portion 32 along a direction parallel to the optical axis 301. The optical mark structures 34c are disposed on the driving portion mounting sections 30c of the imaging lens system 30 and face the coils 331 of the driving portion 33 along a direction perpendicular to the optical axis 301.

Each of the optical mark structures 34a is a two-dimensional optical mark structure and includes a plurality of optical mark units 340a. Each of the optical mark structures 34b is a two-dimensional optical mark structure and includes a plurality of optical mark units 340b. Each of the optical mark structures 34c is a three-dimensional optical mark structure and includes a plurality of optical mark units 340c.

Each of the optical mark units 340a of each of the optical mark structures 34a includes a first optical mark surface 341a, a second optical mark surface 342a, a third optical mark surface 343a and a fourth optical mark surface 344a. The first optical mark surface 341a and the second optical mark surface 342a of each of the optical mark units 340a are arranged side by side in a direction perpendicular to the optical axis 301. The third optical mark surface 343a and the fourth optical mark surface 344a of each of the optical mark units 340a are arranged side by side in the same direction and are located side by side with the first optical mark surface 341a and the second optical mark surface 342a in another direction perpendicular to the optical axis 301. That is, in each optical mark unit 340a, the first optical mark surface 341a, the second optical mark surface 342a, the third optical mark surface 343a and the fourth optical mark surface 344a can be regarded as a 2×2 matrix. The optical mark units 340a are arranged side by side along the two directions perpendicular to the optical axis 301, such that each of the optical mark structures 34a forms a mesh pattern.

When an area of one of the first optical mark surfaces 341a not located at an outer rim of the supporting portion mounting section 31a is A, the following condition is satisfied: $A = 5.8 \times 10E-3$ [mm$^2$].

When a distance between center points of adjacent two of the first optical mark surfaces 341a not located at the outer rim of the supporting portion mounting section 31a is D, the following condition is satisfied: $D = 0.15$ [mm].

When the area of one of the first optical mark surfaces 341a not located at the outer rim of the supporting portion mounting section 31a is A, and the distance between center points of adjacent two of the first optical mark surfaces 341a not located at the outer rim of the supporting portion mounting section 31a is D, the following condition is satisfied: $\sqrt{(A)}/D = 0.5$.

The first optical mark surfaces 341a and the second optical mark surfaces 342a have different gloss values in a direction, the first optical mark surfaces 341a and the third optical mark surfaces 343a have the same gloss value in a direction, and the second optical mark surfaces 342a and the fourth optical mark surfaces 344a have the same gloss value in a direction.

When an angle between an observation direction and the optical mark structure 34a is θ, the following condition is satisfied: $50 \, [\text{deg.}] \leq \theta \leq 90 \, [\text{deg.}]$. When a gloss value difference in the observation direction between the first optical mark surface 341a and the second optical mark surface 342a of each of the plurality of optical mark units 340a is ΔG, the following condition is satisfied: $15 \, [\text{GU}] \leq \Delta G \leq 50 \, [\text{GU}]$.

The actuator 3 further includes four liquids 35a respectively disposed on the optical mark structures 34a. The liquids 35a face the supporting elements 321. The liquids 35a are in physical contact with the supporting elements 321 so as to fix the supporting elements 321 of the supporting portion 32 to the lower frame 313 of the frame portion 31. As shown in FIG. 14, one of the liquids 35a covers part of one of the optical mark structures 34a so as to estimate the dispensing amount of the liquid 35a through detecting the area of the optical mark structure 34a not covered by the liquid 35a. Therefore, as shown in FIG. 15, when the supporting elements 321 facing the optical mark structures 34a is fixed to the positioning protrusions PR of the frame portion 31 via the positioning holes PH, the liquids 35a covered by the supporting elements 321 can be prevented from being spilled out, thereby improving fixing quality between the supporting elements 321 and the lower frame 313 of the frame portion 31 via the liquids 35a.

Each of the optical mark units 340b of each of the optical mark structures 34b includes two first optical mark surfaces 341b, two second optical mark surfaces 342b, a third optical mark surface 343b, a fourth optical mark surface 344b, a fifth optical mark surface 345b, a sixth optical mark surface 346b, a seventh optical mark surface 347b, an eighth optical mark surface 348b, a ninth optical mark surface 349b, a tenth optical mark surface 3410b, two eleventh optical mark surfaces 3411b and two twelfth optical mark surfaces 3412b. Each of the optical mark structures 34b is in an oval appearance. The first optical mark surfaces 341b and the second optical mark surfaces 342b of each of the optical mark units 340b are arranged side by side along a short axis of the oval. The third optical mark surface 343b, the fourth optical mark surface 344b, the fifth optical mark surface 345b and the sixth optical mark surface 346b of each of the optical mark units 340b are sequentially arranged along an oblique direction that is facing away from the positioning protrusion PR from the positioning protrusion PR on the supporting portion mounting section 30b and located between the short axis and a long axis of the oval. The seventh optical mark surface 347b, the eighth optical mark surface 348b, the ninth optical mark surface 349b and the tenth optical mark surface 3410b of each of the optical mark units 340b are sequentially arranged along another oblique direction that is facing away from the positioning protrusion PR from the positioning protrusion PR on the supporting portion mounting section 30b and located between the short axis and the long axis of the oval, and the seventh optical mark surface 347b, the eighth optical mark surface 348b, the ninth optical mark surface 349b and the tenth optical mark surface 3410b of each of the optical mark units 340b are respectively adjacent to the third optical mark surface 343b, the fourth optical mark surface 344b, the fifth optical mark surface 345b and the sixth optical mark surface 346b. The eleventh optical mark surfaces 3411b and the twelfth optical mark surfaces 3412b of each of the optical mark units 340b are arranged side by side along the long axis of the oval. In other words, each optical mark unit 340b can be regarded as a quarter oval. The optical mark units 340b are arranged side by side along a circumference direction DCF that surrounds the positioning protrusion PR, such that each of the optical mark structures 34b forms a mesh pattern with an oval appearance.

When an area of each of the first optical mark surfaces 341b is A, the following condition is satisfied: $A=7\times10E-3$ [mm$^2$].

When an area of each of the second optical mark surfaces 342b is A2, the following condition is satisfied: $A2=7\times10E-3$ [mm$^2$].

When an area of each of the third optical mark surfaces 343b is A3, the following condition is satisfied: $A3=2.2\times10E-3$ [mm$^2$].

When an area of each of the fourth optical mark surfaces 344b is A4, the following condition is satisfied: $A4=4.1\times10E-3$ [mm$^2$].

When an area of each of the fifth optical mark surfaces 345b is A5, the following condition is satisfied: $A5=6.1\times10E-3$ [mm$^2$].

When an area of each of the sixth optical mark surfaces 346b is A6, the following condition is satisfied: $A6=8.1\times10E-3$ [mm$^2$].

When an area of each of the seventh optical mark surfaces 347b is A7, the following condition is satisfied: $A7=2.2\times10E-3$ [mm$^2$].

When an area of each of the eighth optical mark surfaces 348b is A8, the following condition is satisfied: $A8=4.1\times10E-3$ [mm$^2$].

When an area of each of the ninth optical mark surfaces 349b is A9, the following condition is satisfied: $A9=6.1\times10E-3$ [mm$^2$].

When an area of each of the tenth optical mark surfaces 3410b is A10, the following condition is satisfied: $A10=8.1\times10E-3$ [mm$^2$].

When an area of each of the eleventh optical mark surfaces 3411b is A11, the following condition is satisfied: $A11=3\times10E-3$ [mm$^2$].

When an area of each of the twelfth optical mark surfaces 3412b is A12, the following condition is satisfied: $A12=3\times10E-3$ [mm$^2$].

When a distance between center points of adjacent two of the first optical mark surfaces 341b is D, the following condition is satisfied: D=0.1 [mm].

When the area of each of the first optical mark surfaces 341b is A, and the distance between center points of adjacent two of the first optical mark surfaces 341b is D, the following condition is satisfied: $\sqrt{(A)}/D=0.837$.

The first optical mark surfaces 341b and the second optical mark surfaces 342b have different gloss values in a direction, the first optical mark surfaces 341b, the fourth optical mark surfaces 344b, the sixth optical mark surfaces 346b, the seventh optical mark surfaces 347b, the ninth optical mark surfaces 349b and the twelfth optical mark surfaces 3412b have the same gloss value in a direction, and the second optical mark surfaces 342b, the third optical mark surfaces 343b, the fifth optical mark surfaces 345b, the eighth optical mark surfaces 348b, the tenth optical mark surfaces 3410b and the eleventh optical mark surfaces 3411b have the same gloss value in a direction.

When an angle between an observation direction and the optical mark structure 34b is θ, the following condition is satisfied: 50 [deg.]≤θ≤90 [deg.]. When a gloss value difference in the observation direction between the first optical mark surface 341b and the second optical mark surface 342b of each of the optical mark units 340b is ΔG, the following condition is satisfied: 15 [GU]≤ΔG≤50 [GU]. The actuator 3 further includes at least four liquids 35b respectively disposed on the optical mark structures 34b. The liquids 35b face the supporting elements 321. The liquids 35b are in physical contact with the supporting elements 321. The liquids 35b can be adhesives so as to fix the supporting elements 321 of the supporting portion 32 to the image side of the lens barrel 303 of the imaging lens system 30. The liquids 35b can also be lubricants or damping agents so as to increase the life span of the actuator and absorb the vibration generated during the movement of the imaging lens system, thereby improving the stability of the actuator.

Each of the optical mark units 340c of each of the optical mark structures 34c includes a first optical mark surface 341c, a second optical mark surface 342c, a third optical mark surface 343c and a fourth optical mark surface 344c. The first optical mark surface 341c and the second optical mark surface 342c of each of the optical mark units 340c are arranged side by side in a direction perpendicular to the optical axis 301. The third optical mark surface 343c and the fourth optical mark surface 344c of each of the optical mark units 340c are arranged side by side in the same direction and are located side by side with the first optical mark surface 341c and the second optical mark surface 342c in a direction parallel to the optical axis 301. That is, in each optical mark unit 340c, the first optical mark surface 341c, the second optical mark surface 342c, the third optical mark surface 343c and the fourth optical mark surface 344c can be regarded as a 2×2 matrix. The optical mark units 340c are arranged side by side along the direction perpendicular to the optical axis 301 and the direction parallel to the optical axis 301, such that each of the optical mark structures 34c forms a mesh pattern.

When an area of each of the first optical mark surfaces 341c is A, the following condition is satisfied: $A=4.0\times10E-2$ [mm$^2$].

When a distance between center points of adjacent two of the first optical mark surfaces 341c is D, the following condition is satisfied: D=0.4 [mm].

When the area of each of the first optical mark surfaces 341c is A, and the distance between center points of adjacent two of the first optical mark surfaces 341c is D, the following condition is satisfied: $\sqrt{(A)}/D=0.5$.

The first optical mark surfaces 341c and the second optical mark surfaces 342c have different gloss values in a direction, the first optical mark surfaces 341c and the third optical mark surfaces 343c have the same gloss value in a direction, and the second optical mark surfaces 342c and the fourth optical mark surfaces 344c have the same gloss value in a direction.

When an angle between an observation direction and the optical mark structure 34c is θ, the following condition is satisfied: 50 [deg.]≤θ≤90 [deg.]. When a gloss value difference in the observation direction between the first optical mark surface 341c and the second optical mark surface 342c of each of the plurality of optical mark units 340c is ΔG, the following condition is satisfied: 15 [GU]≤ΔG≤50 [GU].

When a height difference in a direction perpendicular to the first optical mark surface 341c between the first optical mark surface 341c and the second optical mark surface 342c of each of the optical mark units 340c is ΔH, the following condition is satisfied: ΔH=0.025 [mm]. in addition, the first optical mark surface 341c and the fourth optical mark surface 344c have the same height in the direction perpendicular to the first optical mark surface 341c, and the second optical mark surface 342c and the third optical mark surface 343c have the same height in the direction perpendicular to the first optical mark surface 341c.

The actuator 3 further includes at least two liquids 35c respectively disposed on the optical mark structures 34c. The liquids 35c face the coils 331 of the driving portions 33 so as to fix the coils 331 to the lens barrel 303 of the imaging lens system 30. The dispensing amount of the liquids 35c on the optical mark structures 34c can be estimated by identifying the area of the optical mark structures 34c not covered by the liquids 35c during the liquids 35c disposing process. In addition, since the first optical mark surface 341c and the fourth optical mark surface 344c have the same height in the direction perpendicular to the first optical mark surface 341c, the continuously disposed first and fourth optical mark surfaces 341c and 344c form bar-shaped steps protruding from the second and third optical mark surfaces 342c and 343c, which is favorable for guiding the flow of the liquids 35c to stay on the second and third optical mark surfaces 342c and 343c.

The present disclosure is not limited to the optical mark structures in the above-mentioned embodiments. Any one of the above-mentioned optical mark structures can be replaced with another one of the above-mentioned optical mark structures or one of the following two-dimensional or three-dimensional optical mark structures depending on actual requirement.

Figure 30:
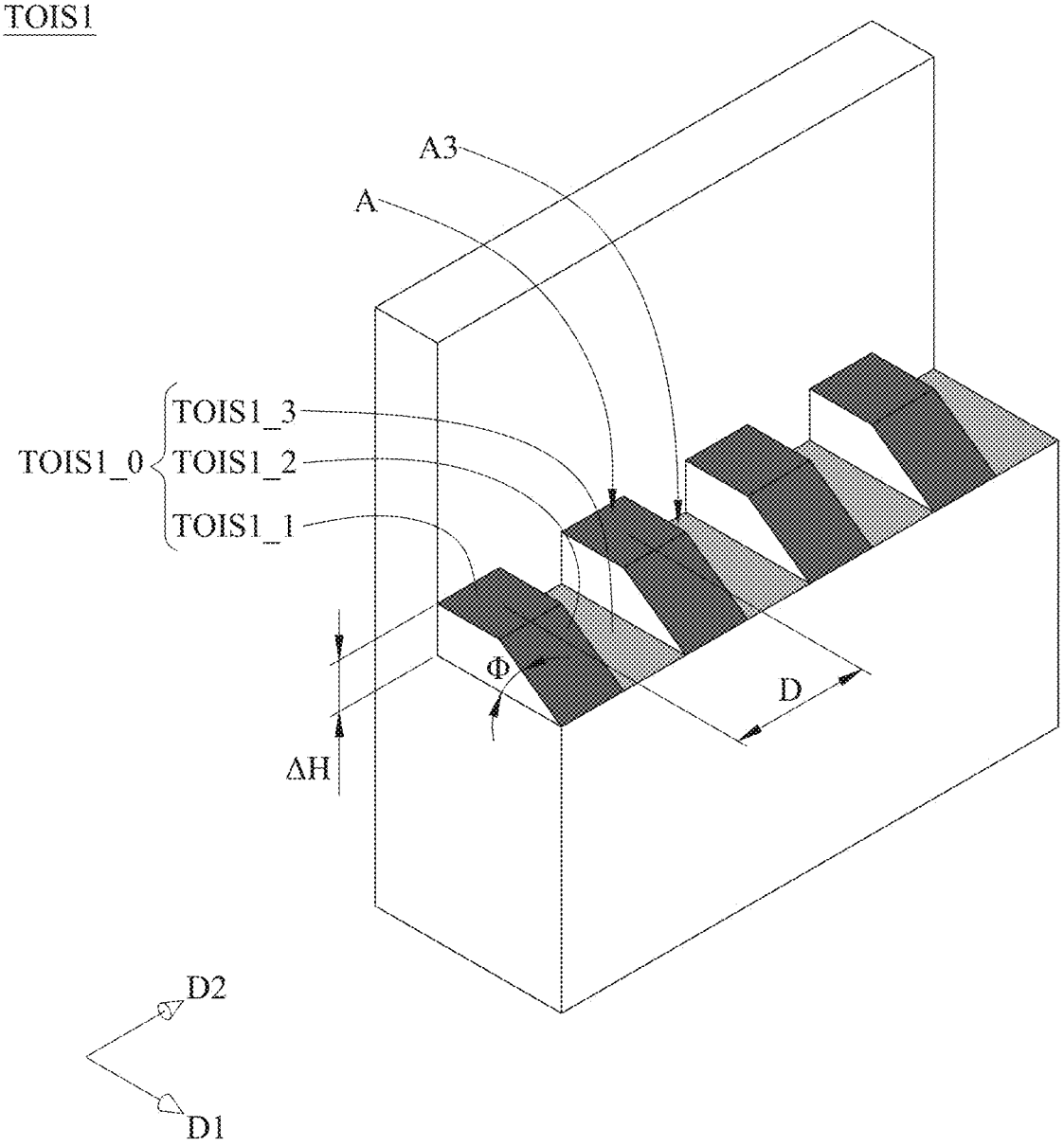
FIG. 30 is a perspective view of a three-dimensional optical mark structure according to another embodiment of the present disclosure.

Please refer to FIG. 30, which is a perspective view of a three-dimensional optical mark structure according to another embodiment of the present disclosure. As shown in FIG. 30, a three-dimensional optical mark structure TOIS1 includes a plurality of optical mark units TOIS1_0. Each of the optical mark units TOIS1_0 includes a first optical mark surface TOIS1_1, a second optical mark surface TOIS1_2 and a third optical mark surface TOIS1_3. The first optical mark surfaces TOIS1_1 and the second optical mark surfaces TOIS1_2 are arranged side by side along a first direction D1. The third optical mark surfaces are arranged side by side with the first optical mark surfaces TOIS1_1 and the second optical mark surfaces TOIS1_2 along a second direction D2 that is perpendicular to the first direction D1.

The first optical mark surfaces TOIS1_1 and the second optical mark surfaces TOIS1_2 can have the same gloss value and the same roughness value in a direction.

The second optical mark surfaces TOIS1_2 and the third optical mark surfaces TOIS1_3 can have different gloss values and the same roughness value in a direction.

When an area of each of the first optical mark surfaces TOIS1_1 is A, the following condition is satisfied: $A=1.0\times10E-2$ [mm$^2$].

When an area of each of the third optical mark surfaces TOIS1_3 is A3, the following condition is satisfied: $A3=2.0\times10E-2$ [mm$^2$].

When a distance between center points of adjacent two of the first optical mark surfaces TOIS1_1 is D, the following condition is satisfied: D=0.2 [mm].

When the area of each of the first optical mark surfaces TOIS1_1 is A, and the distance between center points of adjacent two of the first optical mark surfaces TOIS1_1 is D, the following condition is satisfied: $\sqrt{(A)}/D=0.5$.

When a height difference in a direction perpendicular to the first optical mark surface TOIS1_1 between the first optical mark surface TOIS1_1 and the third optical mark surface TOIS1_3 of each of the optical mark units TOIS1_0 is ΔH, the following condition is satisfied: ΔH=0.072 [mm]. In addition, the first optical mark surface TOIS1_1 is parallel to the third optical mark surface TOIS1_3.

When an angle between the first optical mark surface TOIS1_1 and the second optical mark surface TOIS1_2 of each of the optical mark units TOIS1_0 is φ, the following condition is satisfied: φ=36 [deg.].

Figure 31:
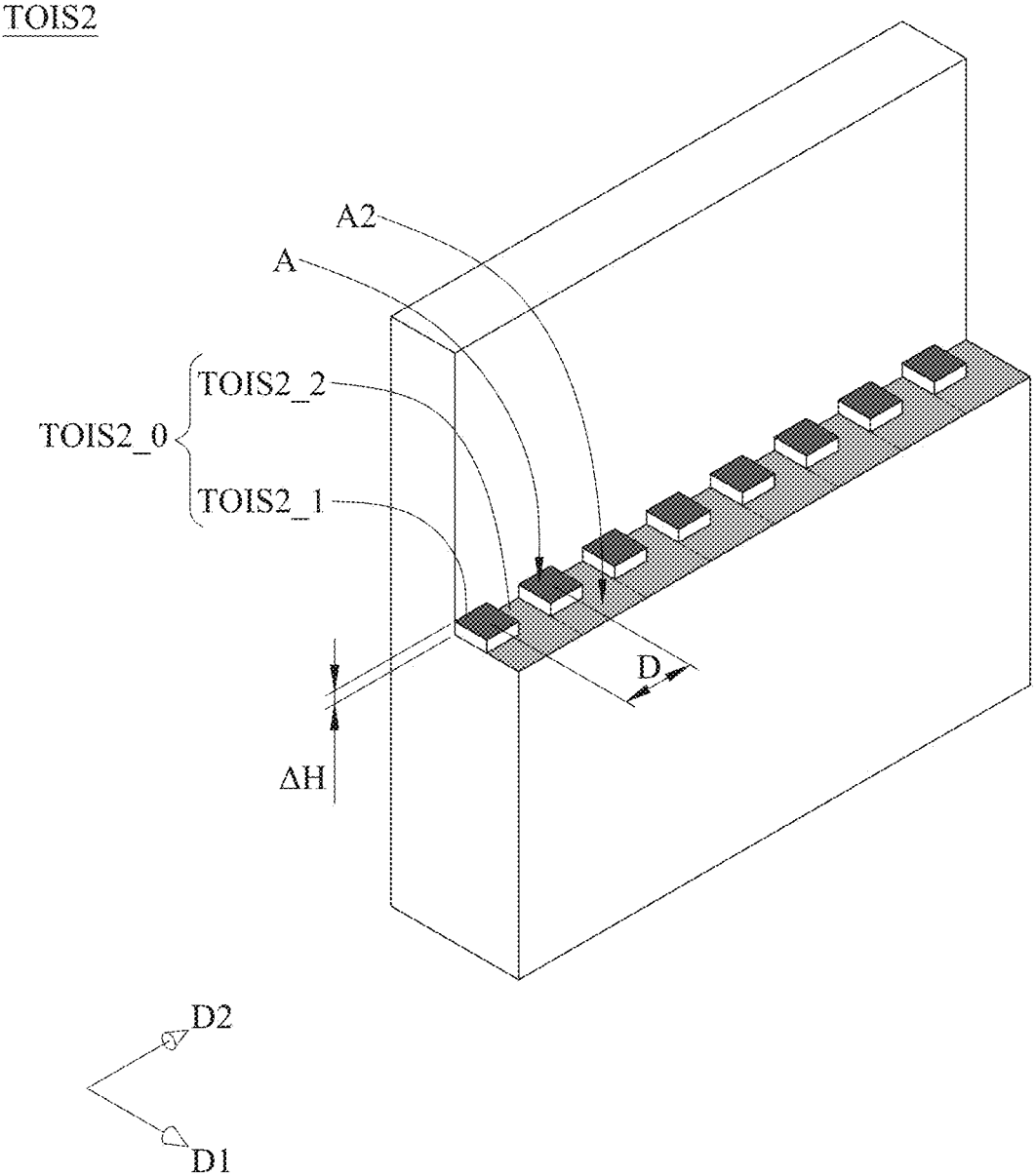
FIG. 31 is a perspective view of a three-dimensional optical mark structure according to another embodiment of the present disclosure.

Please refer to FIG. 31, which is a perspective view of a three-dimensional optical mark structure according to another embodiment of the present disclosure.

As shown in FIG. 31, a three-dimensional optical mark structure TOIS2 includes a plurality of optical mark units TOIS2_0. Each of the optical mark units TOIS2_0 includes a first optical mark surface TOIS2_1 and a second optical mark surface TOIS2_2. The first optical mark surfaces TOIS2_1 and the second optical mark surfaces TOIS2_2 are arranged side by side along a first direction D1 and a second direction D2 that is perpendicular to the first direction D1.

The first optical mark surfaces TOIS2_1 and the second optical mark surfaces TOIS2_2 have different gloss values in a direction.

When an area of each of the first optical mark surfaces TOIS2_1 is A, the following condition is satisfied: $A=2.5\times10E-3$ [mm$^2$].

When an area of each of the second optical mark surfaces TOIS2_2 is A2, the following condition is satisfied: $A2=7.5\times10E-3$ [mm$^2$].

When a distance between center points of adjacent two of the first optical mark surfaces TOIS2_1 is D, the following condition is satisfied: D=0.1 [mm].

When the area of each of the first optical mark surfaces TOIS2_1 is A, and the distance between center points of adjacent two of the first optical mark surfaces TOIS2_1 is D, the following condition is satisfied: $\sqrt{(A)}/D=0.5$.

When a height difference in a direction perpendicular to the first optical mark surface TOIS2_1 between the first optical mark surface TOIS2_1 and the second optical mark surface TOIS2_2 of each of the optical mark units TOIS2_0 is ΔH, the following condition is satisfied: ΔH=0.018 [mm]. In addition, the first optical mark surface TOIS2_1 is parallel to the second optical mark surface TOIS2_2, and adjacent two of the second optical mark surfaces TOIS2 are partially connected together in the second direction D2.

Figure 32:
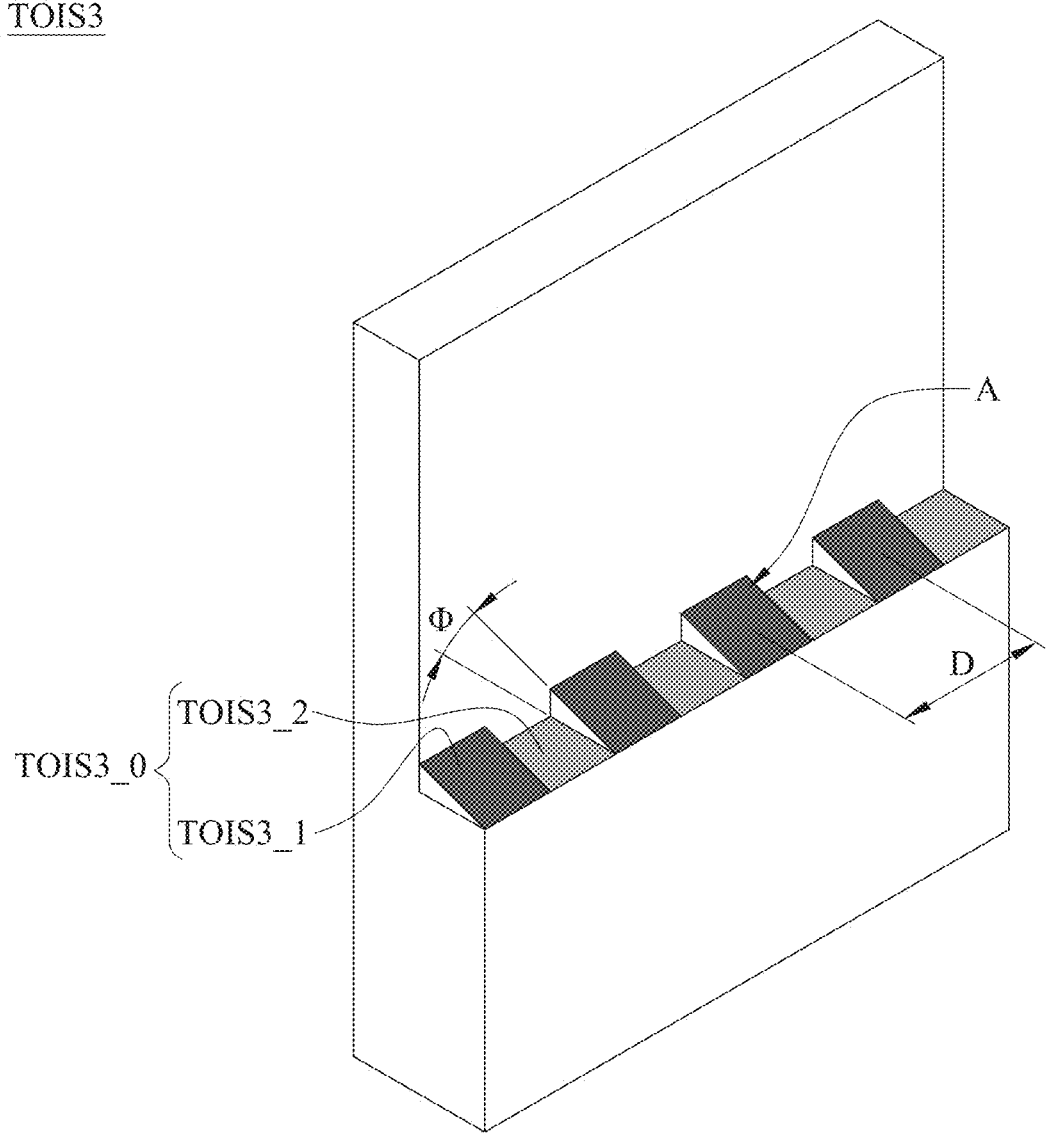
FIG. 32 is a perspective view of a three-dimensional optical mark structure according to another embodiment of the present disclosure.

Please refer to FIG. 32, which is a perspective view of a three-dimensional optical mark structure according to another embodiment of the present disclosure. As shown in FIG. 32, a three-dimensional optical mark structure TOIS3 includes a plurality of optical mark units TOIS3_0. Each of the optical mark units TOIS3_0 includes a first optical mark surface TOIS3_1 and a second optical mark surface TOIS3_2. The first optical mark surfaces TOIS3_1 and the second optical mark surfaces TOIS3_2 are arranged side by side.

The first optical mark surfaces TOIS3_1 and the second optical mark surfaces TOIS3_2 can have different gloss values and the same roughness value in a direction.

When an area of each of the first optical mark surfaces TOIS3_1 is A, the following condition is satisfied: $A=1.0\times10E-2$ [mm$^2$].

When a distance between center points of adjacent two of the first optical mark surfaces TOIS3_1 is D, the following condition is satisfied: D=0.20 [mm].

When the area of each of the first optical mark surfaces TOIS3_1 is A, and the distance between center points of adjacent two of the first optical mark surfaces TOIS3_1 is D, the following condition is satisfied: $\sqrt{(A)}/D=0.5$.

When an angle between the first optical mark surface TOIS3_1 and the second optical mark surface TOIS3_2 of each of the optical mark units TOIS3_0 is ϕ, the following condition is satisfied: ϕ=20 [deg.].

Figure 33:
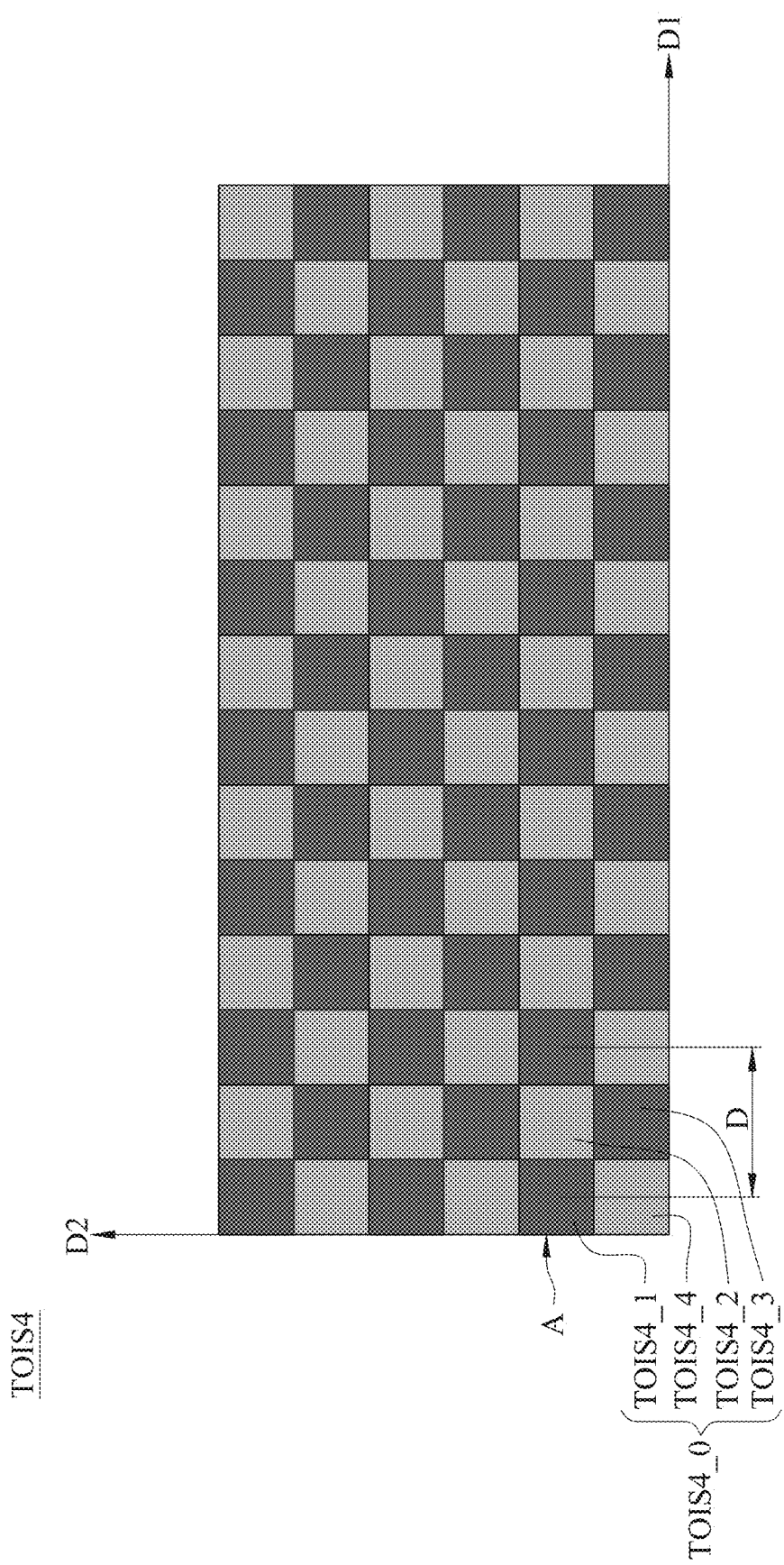
FIG. 33 is a perspective view of a two-dimensional optical mark structure according to another embodiment of the present disclosure.

Please refer to FIG. 33, which is a perspective view of a two-dimensional optical mark structure according to another embodiment of the present disclosure. As shown in FIG. 33, a two-dimensional optical mark structure TOIS4 includes a plurality of optical mark units TOIS4_0. Each of the optical mark units TOIS4_0 includes a first optical mark surface TOIS4_1, a second optical mark surface TOIS4_2, a third optical mark surface TOIS4_3 and a fourth optical mark surface TOIS4_4. The first optical mark surfaces TOIS4_1 and the second optical mark surfaces TOIS4_2 are arranged side by side in a first direction D1. The third optical mark surface TOIS4_3 and the fourth optical mark surface TOIS4_4 are arranged side by side in the first direction D1 and are arranged side by side with the first optical mark surfaces TOIS4_1 and the second optical mark surfaces TOIS4_2 in a second direction D2 that is perpendicular to the first direction D1. That is, in each optical mark unit TOIS4_0, the first optical mark surface TOIS4_1, the second optical mark surface TOIS4_2, the third optical mark surface TOIS4_3 and the fourth optical mark surface TOIS4_4 can be regarded as a 2×2 matrix. The optical mark units TOIS4_0 are arranged side by side along the first direction D1 and the second direction D2, such that the optical mark structure TOIS4 forms a mesh pattern.

The first optical mark surfaces TOIS4_1 and the second optical mark surfaces TOIS4_2 have different gloss values in a direction, the first optical mark surfaces TOIS4_1 and the third optical mark surfaces TOIS4_3 have the same gloss value in a direction, and the second optical mark surfaces TOIS4_2 and the fourth optical mark surfaces TOIS4_4 have the same gloss value in a direction.

When an area of each of the first optical mark surfaces TOIS4_1 is A, the following condition is satisfied: $A=1.21\times 10E-2$ [mm$^2$].

When a distance between center points of adjacent two of the first optical mark surfaces TOIS4_1 is D, the following condition is satisfied: D=0.22 [mm].

When the area of each of the first optical mark surfaces TOIS4_1 is A, and the distance between center points of adjacent two of the first optical mark surfaces TOIS4_1 is D, the following condition is satisfied: $\sqrt{(A)}/D=0.5$.

Figure 34:
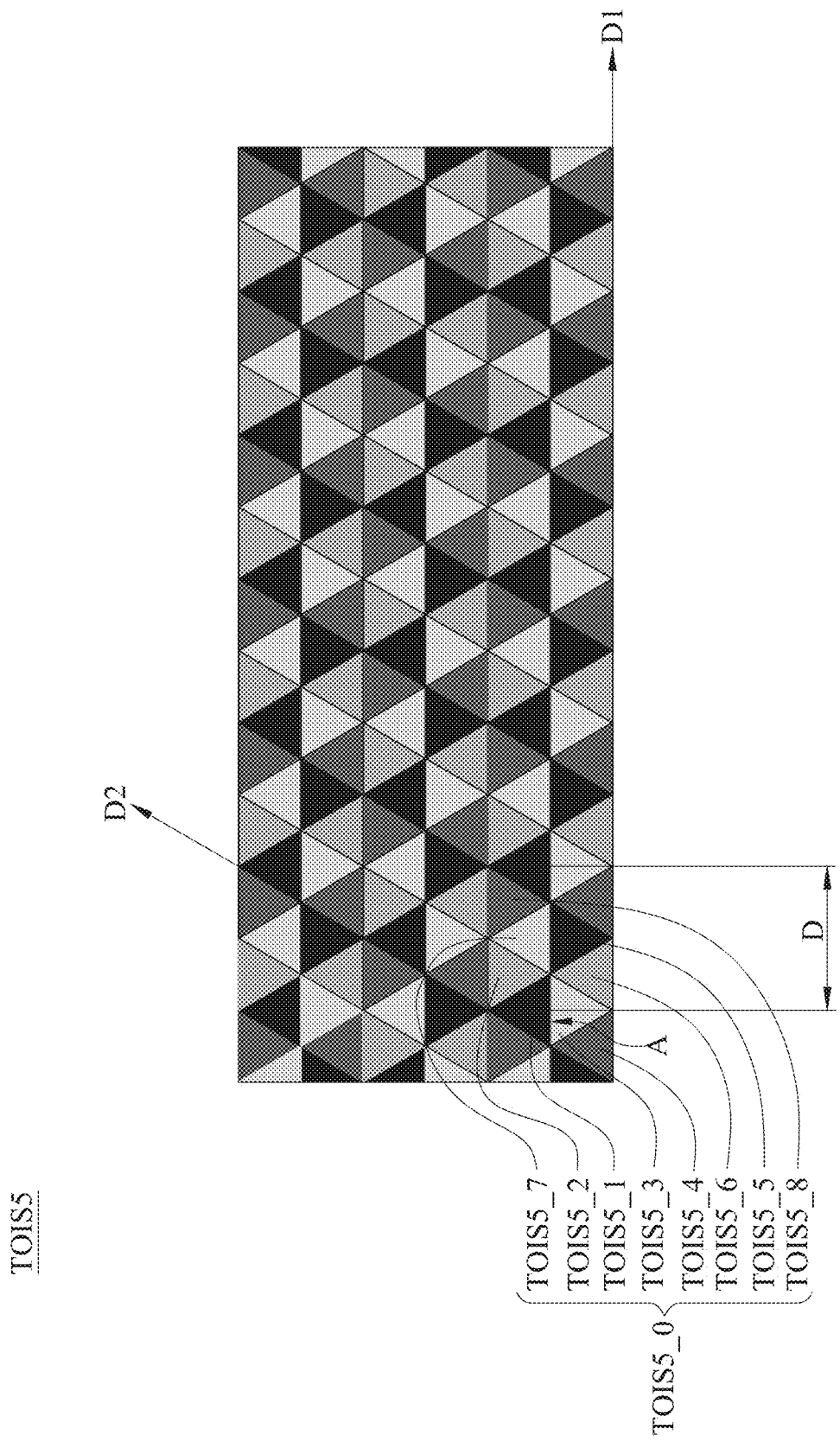
FIG. 34 is a perspective view of a two-dimensional optical mark structure according to another embodiment of the present disclosure.

Please refer to FIG. 34, which is a perspective view of a two-dimensional optical mark structure according to another embodiment of the present disclosure. As shown in FIG. 34, a two-dimensional optical mark structure TOIS5 includes a plurality of optical mark units TOIS5_0. Each of the optical mark units TOIS5_0 includes a first optical mark surface TOIS5_1, a second optical mark surface TOIS5_2, a third optical mark surface TOIS5_3, a fourth optical mark surface TOIS5_4, a fifth optical mark surface TOIS5_5, a sixth optical mark surface TOIS5_6, a seventh optical mark surface TOIS5_7 and an eighth optical mark surface TOIS5_8. The first optical mark surfaces TOIS5_1, the second optical mark surfaces TOIS5_2, the seventh optical mark surface TOIS5_7 and the eighth optical mark surface TOIS5_8 are sequentially arranged side by side in a first direction D1. The fourth optical mark surface TOIS5_4, the third optical mark surface TOIS5_3, the sixth optical mark surface TOIS5_6 and the fifth optical mark surface TOIS5_5 are sequentially arranged side by side in the first direction D1 and are located side by side with the first optical mark surfaces TOIS5_1, the second optical mark surfaces TOIS5_2, the seventh optical mark surface TOIS5_7 and the eighth optical mark surface TOIS5_8 in a second direction D2 that is at an angle of 60 degrees with respect to the first direction D1. As shown in FIG. 34, in each optical mark unit TOIS5_0, the first optical mark surface TOIS5_1, the second optical mark surface TOIS5_2, the third optical mark surface TOIS5_3, the fourth optical mark surface TOIS5_4, the fifth optical mark surface TOIS5_5, the sixth optical mark surface TOIS5_6, the seventh optical mark surface TOIS5_7 and the eighth optical mark surface TOIS5_8 can be regarded as a trapezoid pattern formed by eight triangles. The optical mark units TOIS5_0 are arranged side by side along the first direction D1 and the second direction D2, such that the optical mark structure TOIS5 forms a mesh pattern. In addition, as shown in FIG. 34, the optical mark structure TOIS5 further includes a plurality of ½ optical mark units (not numbered) located at the side rim positions, and each ½ optical mark unit has an area approximately half of the area of the optical mark unit TOIS5_0. Accordingly, the optical mark structure TOIS5 can form a rectangular pattern as shown in FIG. 34.

The first optical mark surfaces TOIS5_1, the second optical mark surfaces TOIS5_2, the third optical mark surfaces TOIS5_3 and the fourth optical mark surfaces TOIS5_4 have different gloss values in a direction, the first optical mark surfaces TOIS5_1 and the fifth optical mark surfaces TOIS5_5 have the same gloss value in a direction, the second optical mark surfaces TOIS5_2 and the sixth optical mark surfaces TOIS5_6 have the same gloss value in a direction, the third optical mark surfaces TOIS5_3 and the seventh optical mark surfaces TOIS5_7 have the same gloss value in a direction, and the fourth optical mark surfaces TOIS5_4 and the eighth optical mark surfaces TOIS5_8 have the same gloss value in a direction.

When an area of each of the first optical mark surfaces TOIS5_1 is A, the following condition is satisfied: $A=5.2\times 10E-3$ [mm$^2$]. In addition, an area of a ½ first optical mark surface (not numbered) of one of the ½ optical mark units is 2.6×10E-3 square millimeters.

When a distance between center points of adjacent two of the first optical mark surfaces TOIS5_1 is D, the following condition is satisfied: D=0.22 [mm].

When the area of each of the first optical mark surfaces TOIS5_1 is A, and the distance between center points of adjacent two of the first optical mark surfaces TOIS5_1 is D, the following condition is satisfied: $\sqrt{(A)}/D=0.328$.

Figure 35:
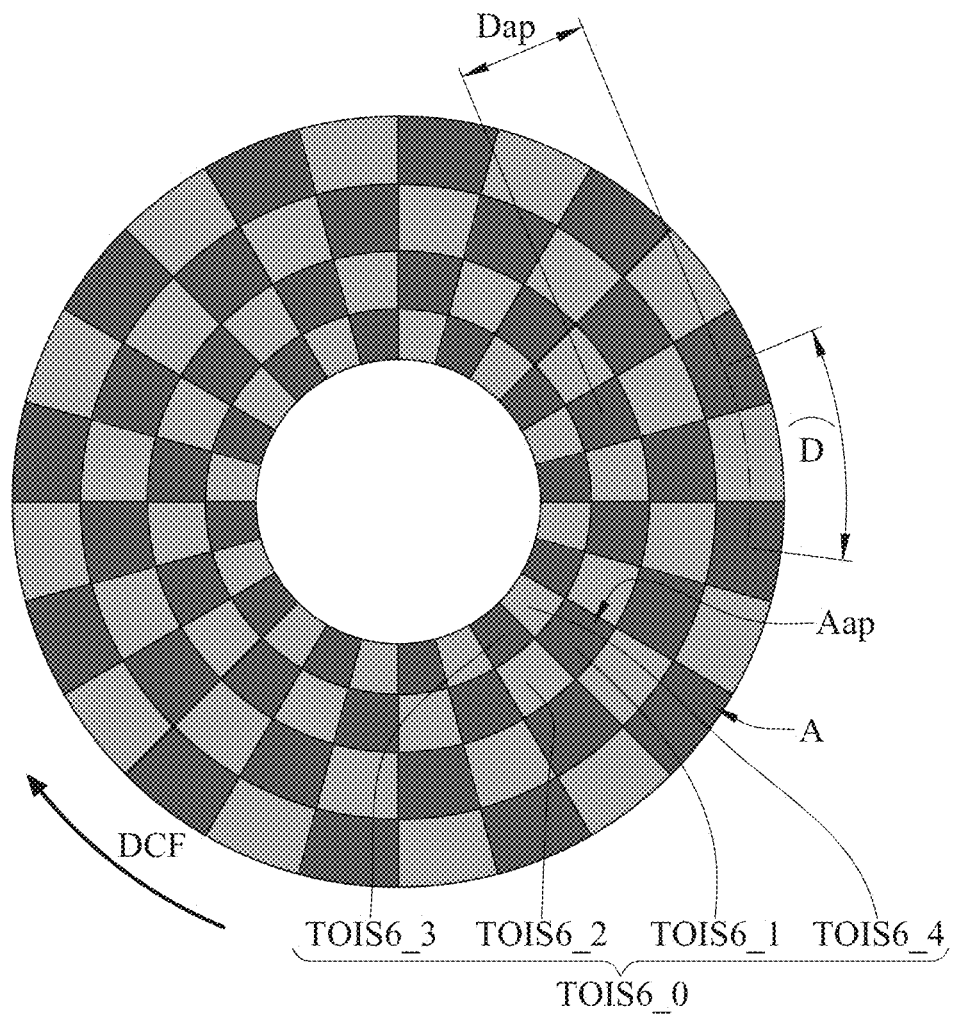
FIG. 35 is a perspective view of a two-dimensional optical mark structure according to another embodiment of the present disclosure.

Please refer to FIG. 35, which is a perspective view of a two-dimensional optical mark structure according to another embodiment of the present disclosure. As shown in FIG. 35, a two-dimensional optical mark structure TOIS6 includes a plurality of optical mark units TOIS6_0. Each of the optical mark units TOIS6_0 includes a first optical mark surface TOIS6_1, a second optical mark surface TOIS6_2, a third optical mark surface TOIS6_3 and a fourth optical mark surface TOIS6_4. The first optical mark surfaces TOIS6_1 and the second optical mark surfaces TOIS6_2 are arranged side by side in a circumference direction DCF. The third optical mark surface TOIS6_3 and the fourth optical mark surface TOIS6_4 are arranged side by side in the circumference direction DCF and are located closer to the center of the circle than the first optical mark surfaces TOIS6_1 and the second optical mark surfaces TOIS6_2. That is, in each optical mark unit TOIS6_0, the first optical mark surface TOIS6_1, the second optical mark surface TOIS6_2, the third optical mark surface TOIS6_3 and the fourth optical mark surface TOIS6_4 can be regarded as a 2×2 matrix with an arc shape. The optical mark units TOIS6_0 are arranged side by side along the circumference direction DCF and a direction away from the center of the circle, such that the optical mark structure TOIS6 forms a mesh pattern.

The first optical mark surfaces TOIS6_1 and the second optical mark surfaces TOIS6_2 have different gloss values in a direction, the first optical mark surfaces TOIS6_1 and the third optical mark surfaces TOIS6_3 have the same gloss value in a direction, and the second optical mark surfaces TOIS6_2 and the fourth optical mark surfaces TOIS6_4 have the same gloss value in a direction.

When an area of one of the first optical mark surfaces TOIS6_1 farthest away from the center of the circle is A, the following condition is satisfied: A=3.03×10E-2 [mm$^2$].

When an area of one of the first optical mark surfaces TOIS6_1 closest to the center of the circle is Aap, the following condition is satisfied: Aap=1.64×10E-2 [mm$^2$].

When a distance along the circumference direction DCF between center points of adjacent two of the first optical mark surfaces TOIS6_1 farthest away from the center of the circle is D, the following condition is satisfied: D=0.406 [mm].

When a distance between center points of one of the first optical mark surfaces TOIS6_1 farthest away from the center of the circle and one of the first optical mark surfaces TOIS6_1 closest to the center of the circle is Dap, the following condition is satisfied: Dap=0.286 [mm].

When the area of one of the first optical mark surfaces TOIS6_1 farthest away from the center of the circle is A, and the distance along the circumference direction DCF between center points of adjacent two of the first optical mark surfaces TOIS6_1 farthest away from the center of the circle is D, the following condition is satisfied: $\sqrt{(A)}/D$=0.429.

4th Embodiment

Figure 21:
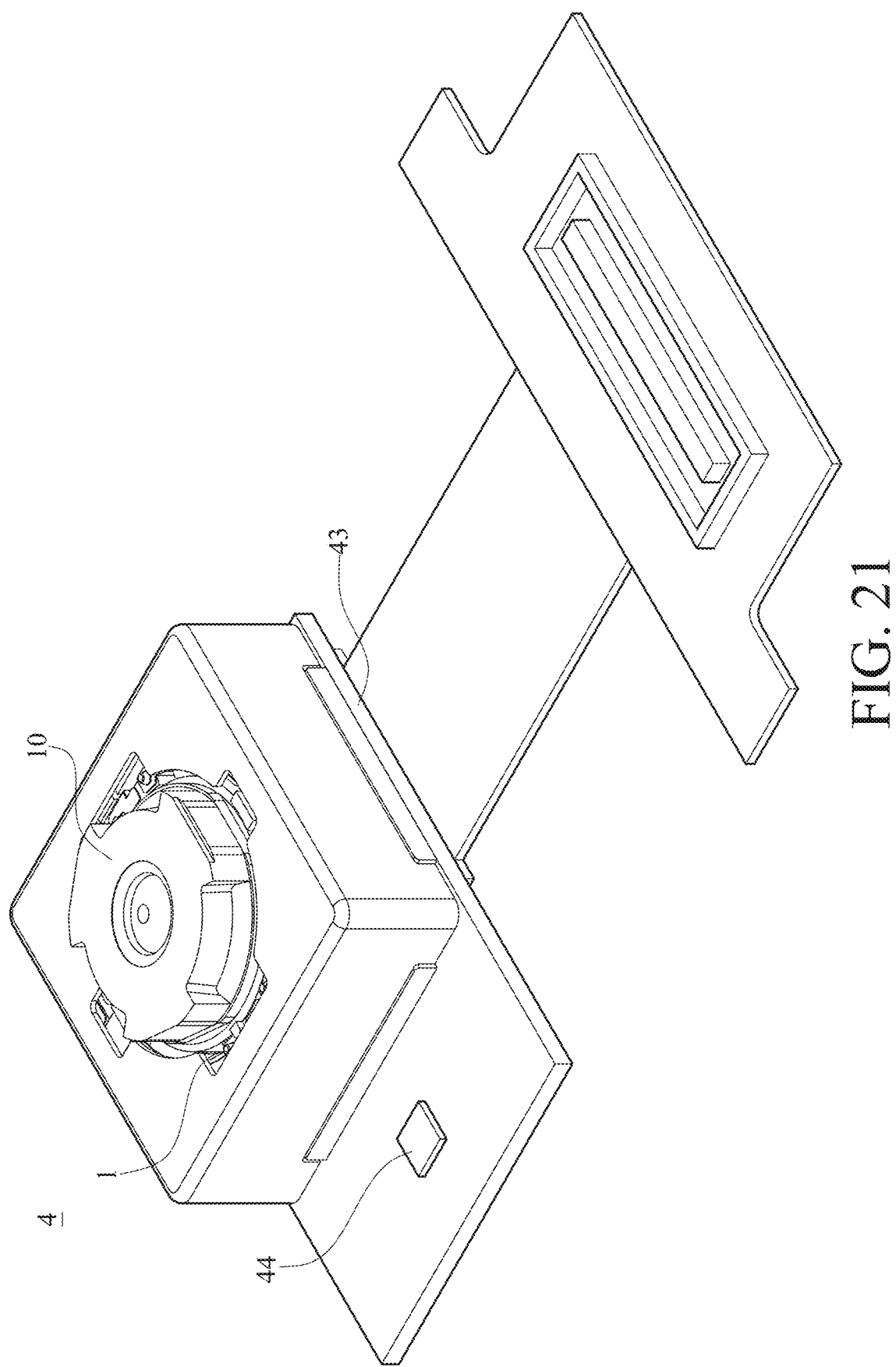
FIG. 21 is a perspective view of an image capturing unit according to the 4th embodiment of the present disclosure.

Please refer to FIG. 21, which is a perspective view of an image capturing unit according to the 4th embodiment of the present disclosure. In this embodiment, an image capturing unit 4 is a camera module including the imaging lens system 10 and the actuator 1 disclosed in the 1st embodiment, an image sensor 43 and an image stabilizer 44. However, the image capturing unit 4 may alternatively be provided with the imaging lens system and the actuator disclosed in other above-mentioned embodiments, and the present disclosure is not limited thereto. The imaging light converges in the imaging lens system 10 of the image capturing unit 4 to generate an image with the actuator 1 utilized for image focusing on the image sensor 43, and the generated image is then digitally transmitted to other electronic component for further processing.

The actuator 1 can have auto focusing functionality, and different driving configurations can be obtained through the usages of voice coil motors (VCM), micro electro-mechanical systems (MEMS), piezoelectric systems, or shape memory alloy materials. The actuator 1 is favorable for obtaining a better imaging position of the imaging lens system 10, so that a clear image of the imaged object can be captured by the imaging lens system 10 with different object distances. The image sensor 43 (for example, CCD or CMOS), which can feature high photosensitivity and low noise, is disposed on an image surface (not shown) of the imaging lens system 10 to provide higher image quality.

The image stabilizer 44, such as an accelerometer, a gyro sensor and a Hall Effect sensor, is configured to work with the actuator 1 to provide optical image stabilization (OIS). The actuator 1 working with the image stabilizer 44 is favorable for compensating for pan and tilt of the imaging lens system 10 to reduce blurring associated with motion during exposure. In some cases, the compensation can be provided by electronic image stabilization (EIS) with image processing software, thereby improving image quality while in motion or low-light conditions.

5th Embodiment

Figure 22:
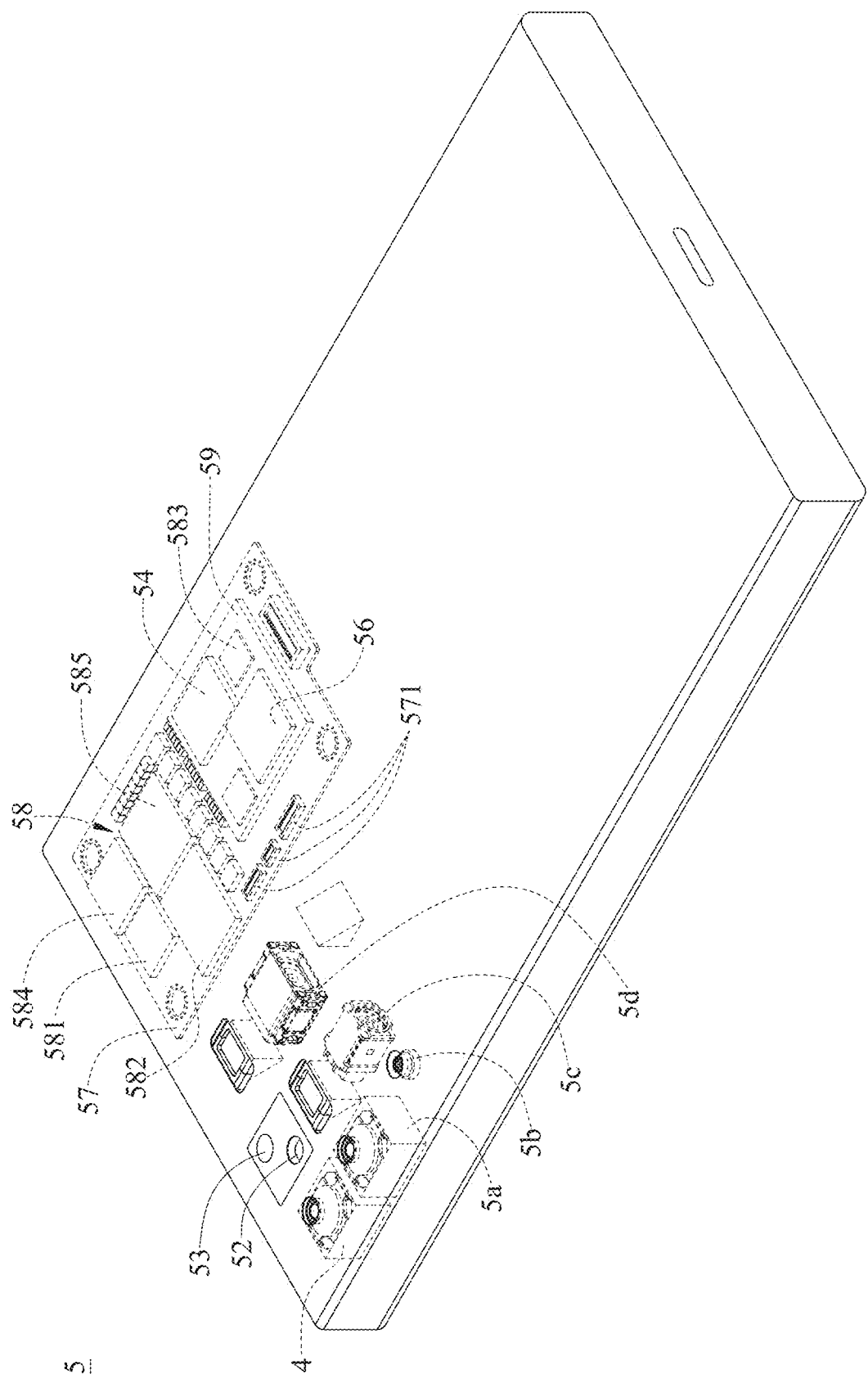
FIG. 22 is one perspective view of an electronic device according to the 5th embodiment of the present disclosure.
Figure 23:
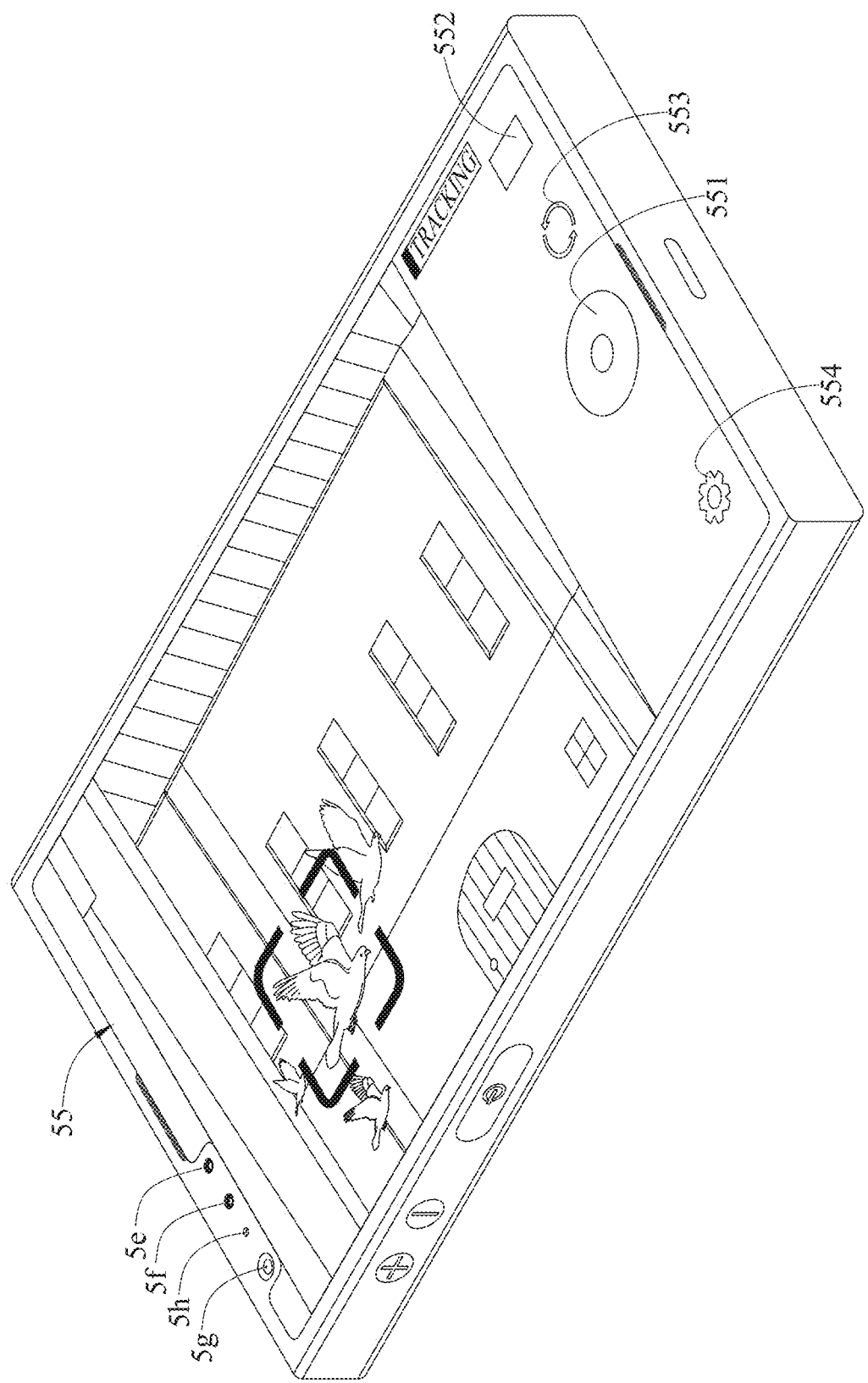
FIG. 23 is another perspective view of the electronic device of FIG. 22.
Figure 24:
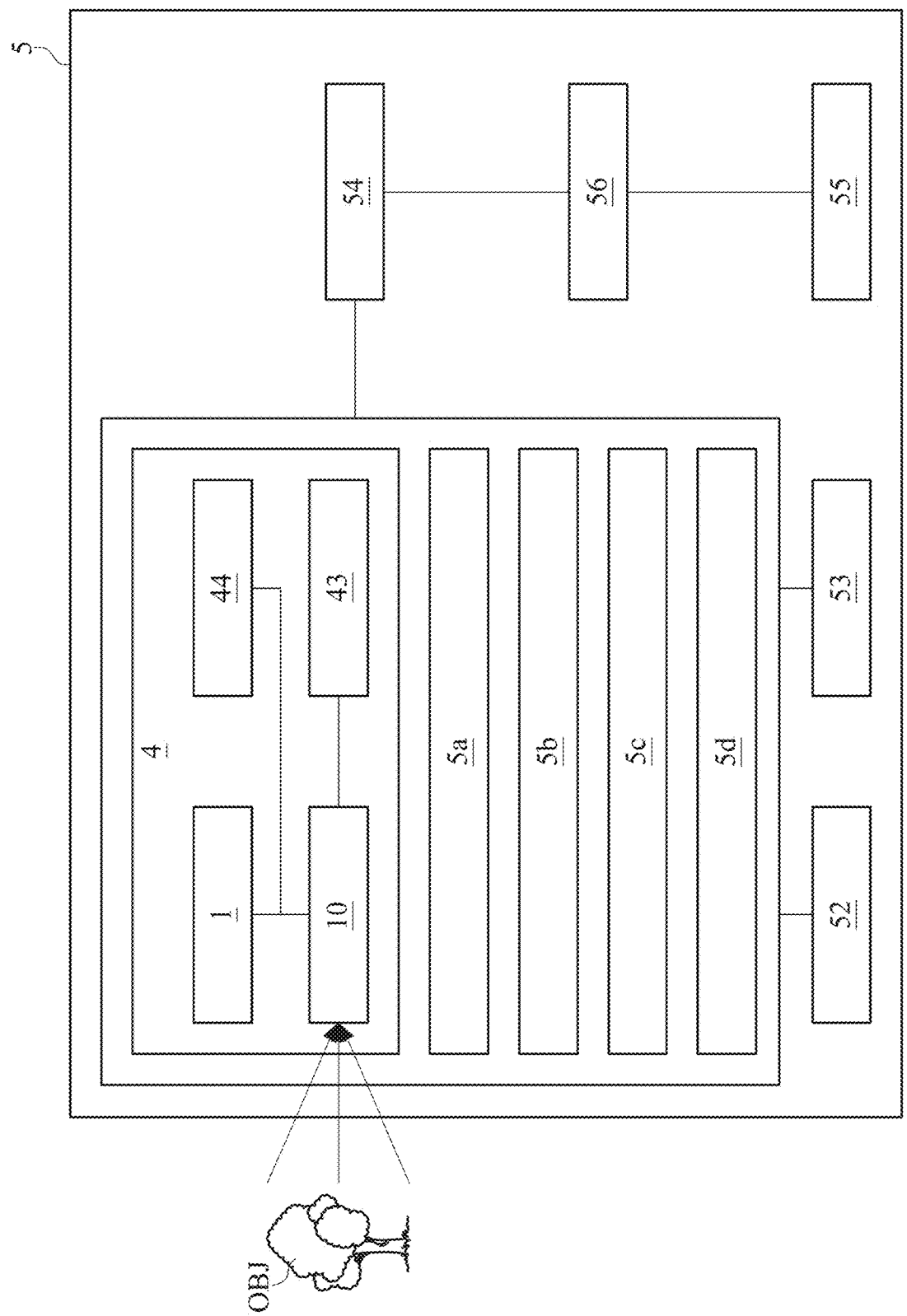
FIG. 24 is a block diagram of the electronic device of FIG. 22.

Please refer to FIG. 22 to FIG. 24, wherein FIG. 22 is one perspective view of an electronic device according to the 5th embodiment of the present disclosure, FIG. 23 is another perspective view of the electronic device of FIG. 22, and FIG. 24 is a block diagram of the electronic device of FIG. 22.

In this embodiment, an electronic device 5 is a mobile device such as a computer, a smartphone, a smart wearable device, a camera drone, a driving recorder and displayer, etc., and the present disclosure is not limited thereto. The electronic device 5 including an image capturing unit 4, an image capturing unit 5a, an image capturing unit 5b, an image capturing unit 5c, an image capturing unit 5d, an image capturing unit 5e, an image capturing unit 5f, an image capturing unit 5g, a flash module 52, a focus assist module 53, an image signal processor 54, a user interface 55 and an image software processor 56.

The image capturing unit 4, the image capturing unit 5a, the image capturing unit 5b, the image capturing unit 5c and the image capturing unit 5d are disposed on the same side of the electronic device 5. The image capturing unit 5e, the image capturing unit 5f, the image capturing unit 5g and the user interface 55 are disposed on the opposite side of the electronic device 5. The user interface 55 is a display unit, such that the image capturing units 5e, 5f can be front-facing cameras of the electronic device 5 for taking selfies, but the present disclosure is not limited thereto.

Each of the image capturing units 5a, 5b, 5c, 5d, 5e, 5f and 5g can include the actuator of the present disclosure and can have a configuration similar to that of the image capturing unit 4. In detail, each of the image capturing units 5a, 5b, 5c, 5d, 5e, 5f and 5g can include an imaging lens system, an actuator, an image sensor and an image stabilizer, and each of the imaging lens systems of the image capturing units 5a, 5b, 5c, 5d, 5e, 5f and 5g can include an optical lens assembly, a barrel and a holder member for holding the optical lens assembly.

Figure 25:
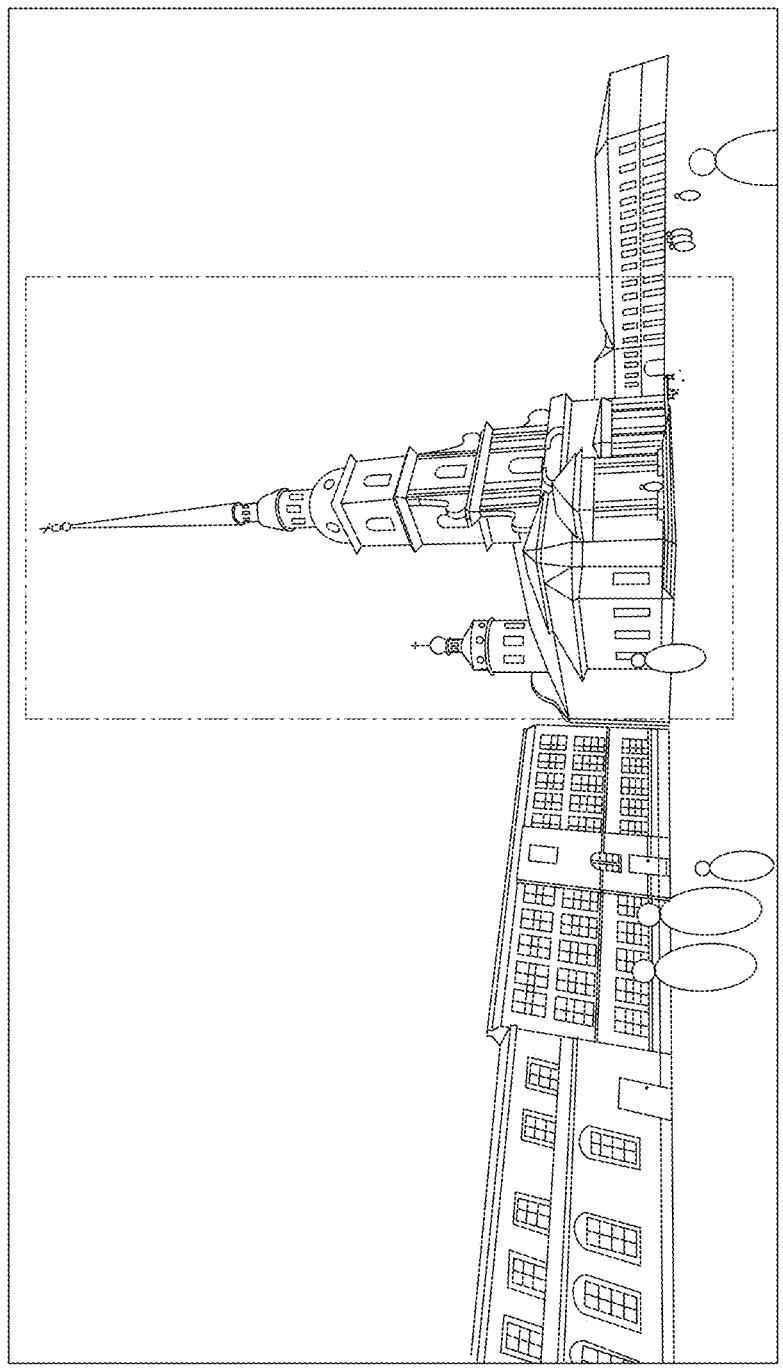
FIG. 25 shows an image captured by the electronic device of FIG. 22 with an equivalent focal length ranging between 11 mm and 14 mm.
Figure 26:
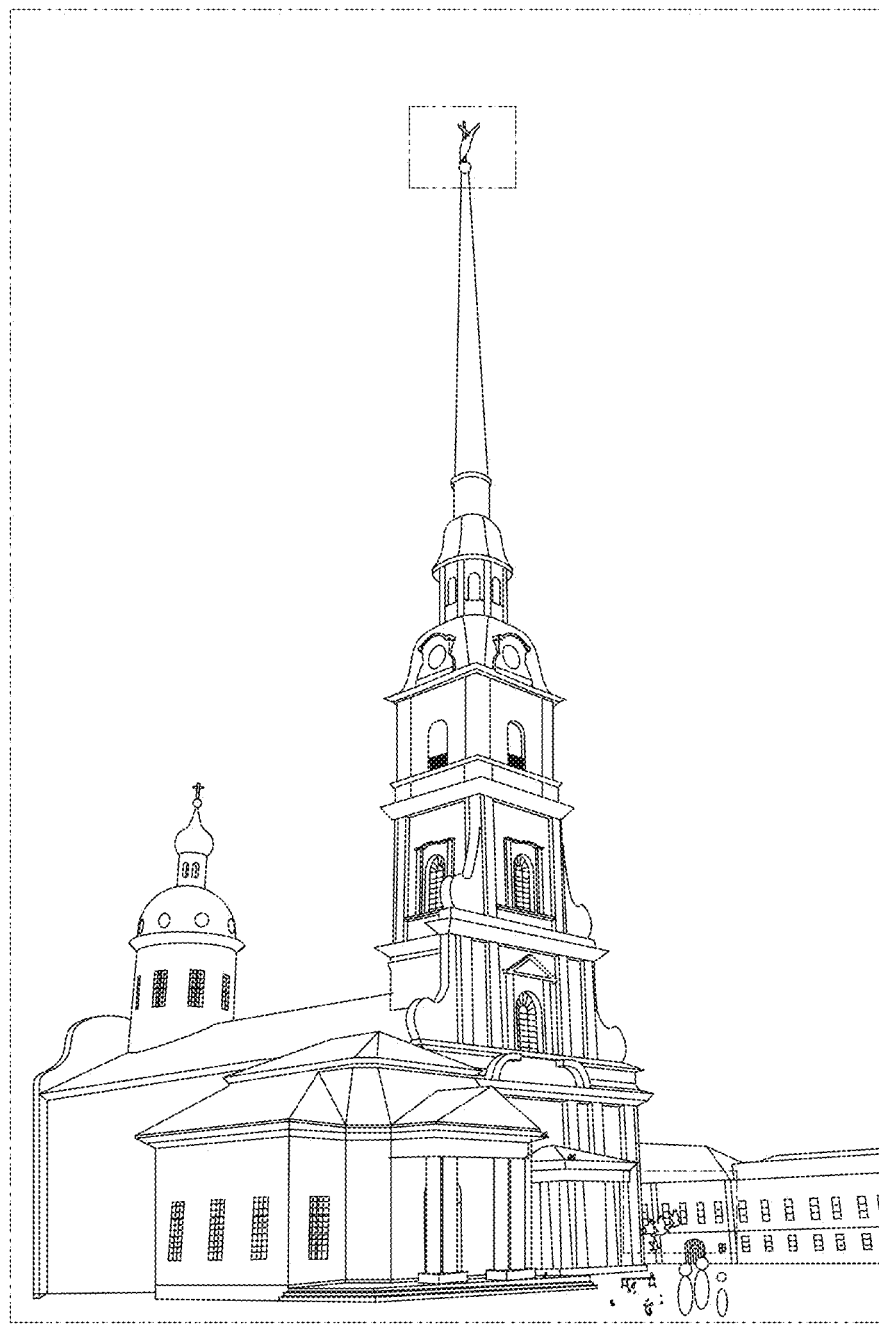
FIG. 26 shows an image captured by the electronic device of FIG. 22 with an equivalent focal length ranging between 22 mm and 30 mm.
Figure 27:
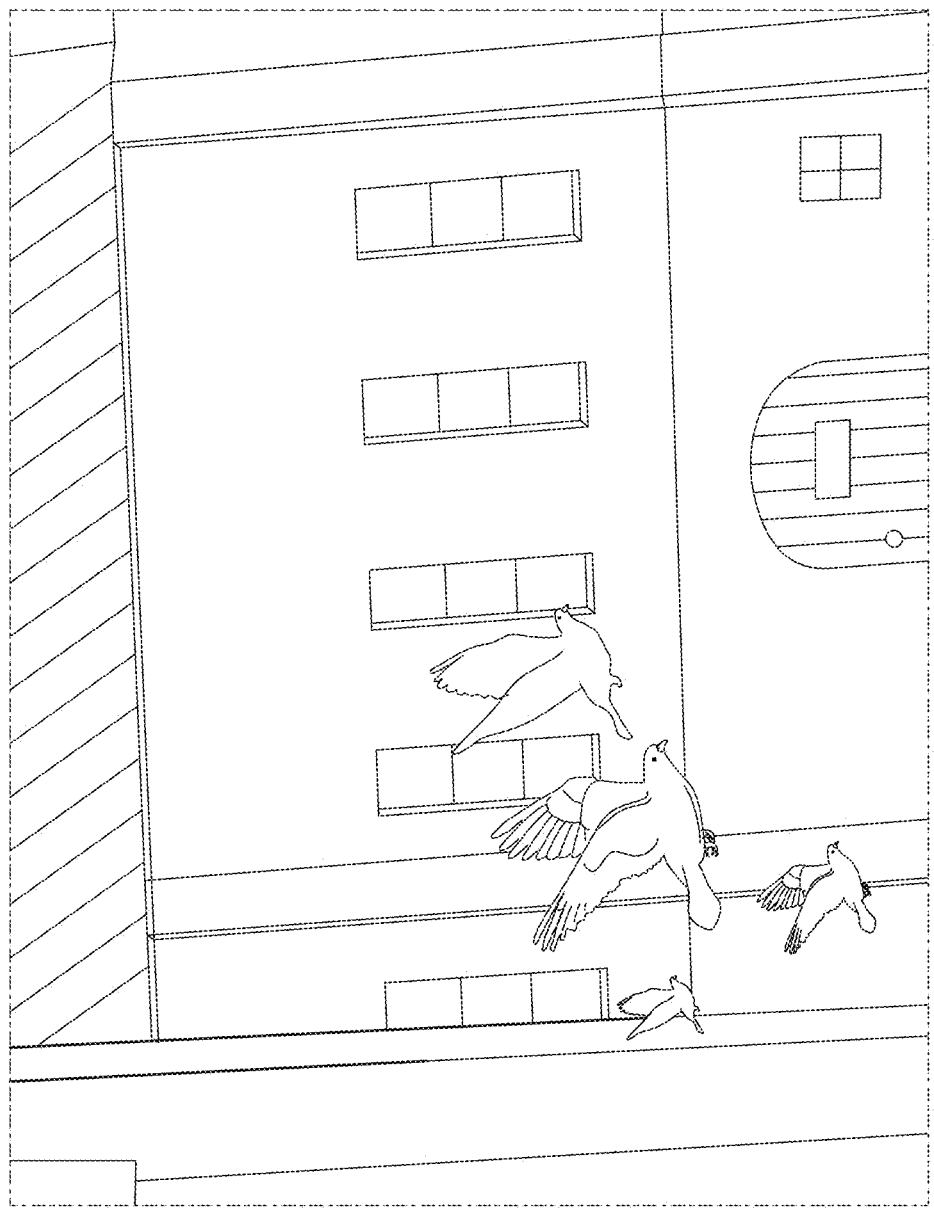
FIG. 27 shows an image captured by the electronic device of FIG. 22 with an equivalent focal length ranging between 100 mm and 150 mm.
Figure 28:
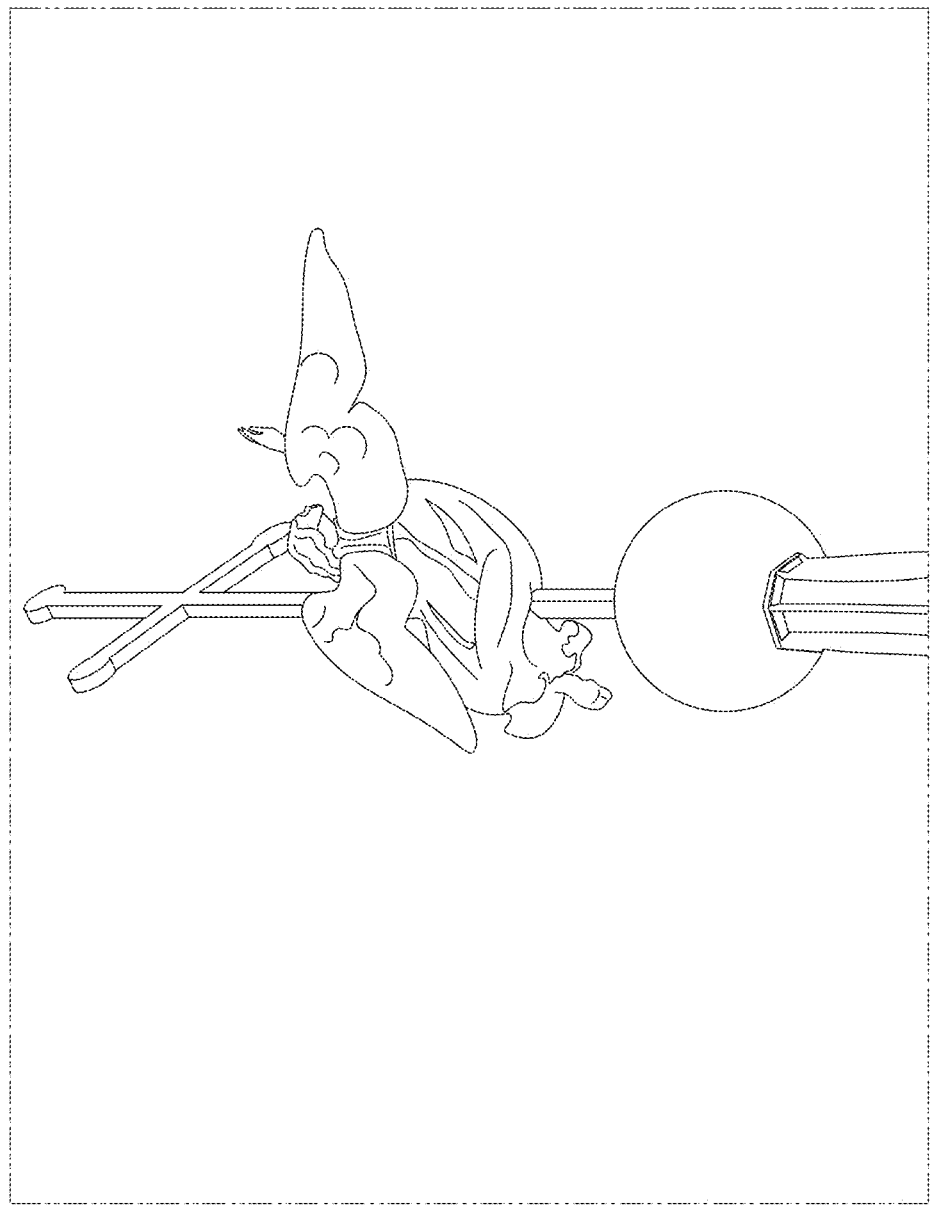
FIG. 28 shows an image captured by the electronic device of FIG. 22 with an equivalent focal length ranging between 400 mm and 600 mm.

The image capturing unit 4 is a wide-angle image capturing unit, the image capturing unit 5a is an ultra-wide-angle image capturing unit, the image capturing unit 5b is a macro-photo image capturing unit, the image capturing unit 5c is a telephoto image capturing unit, the image capturing unit 5d is an ultra-telephoto image capturing unit, the image capturing unit 5e is an ultra-wide-angle image capturing unit, the image capturing unit 5f is a wide-angle image capturing unit and the image capturing unit 5g is a ToF (time of flight) image capturing unit. In this embodiment, the image capturing units 4, 5a, 5b, 5c and 5d have different fields of view, such that the electronic device 5 can have various magnification ratios so as to meet the requirement of optical zoom functionality. For example, the ultra-wide-angle image capturing unit 5a or 5e with the maximum field of view ranging between 105 degrees and 125 degrees can achieve an image with an equivalent focal length between 11 mm and 14 mm, and the ultra-wide-angle image capturing unit 5a or 5e can be regarded as able to provide 0.5× magnification. In this case, the image captured by the ultra-wide-angle image capturing unit 5a or 5e can refer to FIG. 25, which shows an image captured by the electronic device 5 with an equivalent focal length ranging between 11 mm and 14 mm, and the captured image as shown in FIG. 25 includes the whole cathedral, surrounding buildings and people on the square. The captured image as shown in FIG. 25 has a relatively large field of view and depth of view, but it often has a relatively large degree of distortion. The wide-angle image capturing unit 4 or 5f with the maximum field of view ranging between 70 degrees and 90 degrees can achieve an image with an equivalent focal length between 22 mm and 30 mm, and the wide-angle image capturing unit 4 or 5f can be regarded as able to provide 1× magnification. In this case, the image captured by the wide-angle image capturing unit 4 or 5f can refer to FIG. 26, which shows an image captured by the electronic device 5 with an equivalent focal length ranging between 22 mm and 30 mm, and the captured image as shown in FIG. 26 includes the whole cathedral and people in front of the cathedral. The telephoto image capturing unit 5c with the maximum field of view ranging between 15 degrees and 30 degrees can achieve an image with an equivalent focal length between 100 mm and 150 mm, and the telephoto image capturing unit 5c can be regarded as able to provide 5× magnification. In this case, the image captured by the telephoto image capturing unit 5c can refer to FIG. 27, which shows an image captured by the electronic device 5 with an equivalent focal length ranging between 100 mm and 150 mm, and the captured image as shown in FIG. 27 includes the birds flying in front of the cathedral. The captured image as shown in FIG. 27 has a relatively small field of view and depth of view, and the telephoto image capturing unit 5c can be used for shooting moving targets. For this, the actuator can drive the imaging lens system thereof to quickly and continuously autofocus on the target, such that the captured image of the target would not be blurred due to long focusing distance. The ultra-telephoto image capturing unit 5d with the maximum field of view ranging between 4 degrees and 8 degrees can achieve an image with an equivalent focal length between 400 mm and 600 mm, and the ultra-telephoto image capturing unit 5d can be regarded as able to provide 20× magnification. In this case, the image captured by the ultra-telephoto image capturing unit 5d can refer to FIG. 28, which shows an image captured by the electronic device 5 with an equivalent focal length ranging between 400 mm and 600 mm, and the captured image as shown in FIG. 28 includes the angel-and-cross-topped spire of the cathedral. The captured image as shown in FIG. 28 has a smaller field of view and depth of view, and the ultra-telephoto image capturing unit 5d may be easier to capture an out of focus image due to slight camera shake. For this, the actuator can provide a feedback force to correct the shake so as to achieve optical image stabilization while providing a force to drive the imaging lens system of the ultra-telephoto image capturing unit 5d to focus on a target. In addition, the image capturing unit 5g can determine depth information of the imaged object. In this embodiment, the electronic device 5 includes multiple image capturing units 4, 5a, 5b, 5c, 5d, 5e, 5f and 5g, but the present disclosure is not limited to the number and arrangement of image capturing units.

When a user captures images of an object OBJ, light rays converge in the image capturing unit 4, the image capturing unit 5a, the image capturing unit 5b, the image capturing unit 5c or the image capturing unit 5d to generate images, and the flash module 52 is activated for light supplement. The focus assist module 53 detects the object distance of the imaged object OBJ to achieve fast auto focusing. The image signal processor 54 is configured to optimize the captured image to improve image quality. The light beam emitted from the focus assist module 53 can be either conventional infrared or laser.

In addition, the light rays may converge in the image capturing unit 5e, 5f or 5g to generate images. The electronic device 5 can include a reminder light 5h that can be illuminated to remind the user that the image capturing unit 5e, 5f or 5g of the electronic device 5 is working. The user interface 55 can be a touch screen or a physical button 551. The user is able to interact with the user interface 55 and the image software processor 56 having multiple functions to capture images and complete image processing. The image processed by the image software processor 56 can be displayed on the user interface 55. The user can replay the previously captured image through an image playback button 552 of the user interface 55, can choose a suitable image capturing unit for shooting through an image capturing units switching button 553 of the user interface 55, and can properly adjust shooting parameters according to current shooting situations through an integrated menu button 554 of the user interface 55.

Further, the electronic device 5 further includes a circuit board 57 and a plurality of electronic components 58 disposed on the circuit board 57. The image capturing units 4, 5a, 5b, 5c, 5d, 5e, 5f and 5g are electrically connected to the electronic components 58 via connectors 571 on the circuit board 57. The electronic components 58 can include a signal emitting module 581 and can transmit image(s) to other electronic device or a cloud storage via the signal emitting module 581, wherein the signal emitting module 581 can be a wireless fidelity (WiFi) module, a Bluetooth module, an infrared module, a network service module or an integrated module for transmitting various signals mentioned above, and the present disclosure is not limited thereto.

The electronic components 58 can also include a storage unit 582, a random access memory 583 for storing image information, a gyroscope 584, and a position locator 585 for facilitating the navigation or positioning of the electronic device 5. In this embodiment, the image signal processor 54, the image software processor 56 and the random access memory 583 are integrated into a single chip system 59, but the present disclosure is not limited thereto. In some other embodiments, the electronic components can also be integrated in the image capturing unit or can also be disposed on one of the circuit boards.

The mobile devices in these embodiments are only exemplary for showing the actuators 1-3 of the present disclosure installed in the electronic device 5, and the present disclosure is not limited thereto. The actuators 1-3 can be optionally applied to optical systems with a movable focus. Furthermore, the actuators 1-3 feature good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An actuator, configured to drive an imaging lens system, and the actuator comprising:
    a frame portion, configured to accommodate the imaging lens system;
    a supporting portion, disposed on the frame portion, wherein the supporting portion is configured to support the imaging lens system and give the imaging lens system at least one degree of freedom of movement with respect to the frame portion;
    a driving portion, configured to move the imaging lens system along a direction of the at least one degree of freedom;
    an optical mark structure, disposed on part of one of the frame portion, the supporting portion and the driving portion, wherein the optical mark structure comprises a plurality of optical mark units arranged side by side, and each of the plurality of optical mark units comprises a first optical mark surface; and
    an intermediate layer, disposed on the optical mark structure, wherein the intermediate layer is in physical contact with one of the imaging lens system, the frame portion, the supporting portion and the driving portion that is adjacent to the optical mark structure;
    wherein an area of each of the first optical mark surfaces is A, a distance between center points of adjacent two of the first optical mark surfaces is D, and the following conditions are satisfied:

$0.001[mm2] \leq A \leq 0.5[mm2]$; and $0.03[mm] \leq D \leq 1.0[mm]$.

2. The actuator according to claim 1, wherein the area of each of the first optical mark surfaces is A, and the following condition is satisfied:

$0.0015[mm2] \leq A \leq 0.1[mm2]$.

3. The actuator according to claim 2, wherein the area of each of the first optical mark surfaces is A, and the following condition is satisfied:

$0.002[mm2] \leq A \leq 0.042[mm2]$.

4. The actuator according to claim 1, wherein the area of each of the first optical mark surfaces is A, the distance between center points of adjacent two of the first optical mark surfaces is D, and the following condition is satisfied:

$0.05 \leftarrow \sqrt{(A)}/D \leq 1.5$.

5. The actuator according to claim 4, wherein the area of each of the first optical mark surfaces is A, the distance between center points of adjacent two of the first optical mark surfaces is D, and the following condition is satisfied:

$0.1 \leq \sqrt{(A)}/D \leq 1.0$.

6. The actuator according to claim 1, wherein each of the plurality of optical mark units further comprises a second optical mark surface, and the first optical mark surface and the second optical mark surface of each of the plurality of optical mark units are arranged side by side;
    wherein an angle between an observation direction and the optical mark structure is θ, a gloss value difference in the observation direction between the first optical mark surface and the second optical mark surface of each of the plurality of optical mark units is ΔG, and the following conditions are satisfied:

$50[deg.] \leq \theta \leq 90[deg.]$; and $15[GU] \leq \Delta G \leq 50[GU]$.

7. The actuator according to claim 6, wherein a roughness value difference in a direction between the first optical mark surface and the second optical mark surface of each of the plurality of optical mark units is ΔR, and the following condition is satisfied:

$0.01[\mu m] \leq \Delta R \leq 3.5[\mu m]$.

8. The actuator according to claim 6, wherein a height difference in a direction perpendicular to the first optical mark surface between the first optical mark surface and the second optical mark surface of each of the plurality of optical mark units is ΔH, and the following condition is satisfied:

$0.001[mm] \leq \Delta H \leq 0.1[mm]$.

9. The actuator according to claim 6, wherein an angle between the first optical mark surface and the second optical mark surface of each of the plurality of optical mark units is 1, and the following condition is satisfied:

$3[deg.] \leq \Phi \leq 75[deg.]$.

10. The actuator according to claim 1, wherein the frame portion has a mounting section, and the optical mark structure and the intermediate layer are disposed on the mounting section;
    wherein part of one of the imaging lens system, the frame portion, the supporting portion and the driving portion that is adjacent to the optical mark structure is disposed on the mounting section and faces the optical mark structure.

11. The actuator according to claim 10, wherein the driving portion comprises a coil and a magnet spatially disposed opposite to each other;
    wherein one of the coil and the magnet is disposed on the mounting section and is fixed to the frame portion via the intermediate layer.

12. The actuator according to claim 10, wherein the supporting portion comprises a supporting element in physical contact with the frame portion and the imaging lens system;
    wherein part of the supporting element is disposed on the mounting section and is fixed to the frame portion via the intermediate layer.

13. The actuator according to claim 10, wherein the frame portion comprises a positioning protrusion located on the mounting section, and one of the imaging lens system, the frame portion, the supporting portion and the driving portion that is adjacent to the optical mark structure has a positioning hole corresponding to the positioning protrusion.

14. An image capturing unit, comprising:
    the actuator of claim 1; and
    an imaging lens system of claim 1.

15. An electronic device, comprising:
    the image capturing unit of claim 14; and
    an image sensor disposed on an image surface of the imaging lens system.

16. An actuator, configured to drive an imaging lens system, and the actuator comprising:

a frame portion, configured to accommodate the imaging lens system;

a supporting portion, disposed on the frame portion, wherein the supporting portion is configured to support the imaging lens system and give the imaging lens system at least one degree of freedom of movement with respect to the frame portion;

a driving portion, configured to move the imaging lens system along a direction of the at least one degree of freedom;

an optical mark structure, configured to be disposed on the imaging lens system, wherein the optical mark structure faces part of at least one of the frame portion, the supporting portion and the driving portion, the optical mark structure comprises a plurality of optical mark units arranged side by side, and each of the plurality of optical mark units comprises a first optical mark surface; and an intermediate layer, disposed on the optical mark structure, wherein the intermediate layer is in physical contact with one of the frame portion, the supporting portion and the driving portion that is adjacent to the optical mark structure;

wherein an area of each of the first optical mark surfaces is A, a distance between center points of adjacent two of the first optical mark surfaces is D, and the following conditions are satisfied:

$0.001[mm2] \le A \le 0.5[mm2]$; and $0.03[mm] \le D \le 1.0[mm]$.

17. The actuator according to claim 16, wherein the area of each of the first optical mark surfaces is A, and the following condition is satisfied:

$0.0015[mm2] \le A \le 0.1[mm2]$.

18. The actuator according to claim 17, wherein the area of each of the first optical mark surfaces is A, and the following condition is satisfied:

$0.002[mm2] \le A \le 0.042[mm2]$.

19. The actuator according to claim 16, wherein the area of each of the first optical mark surfaces is A, the distance between center points of adjacent two of the first optical mark surfaces is D, and the following condition is satisfied:

$0.05 \le \sqrt{(A)}/D \le 1.5$.

20. The actuator according to claim 19, wherein the area of each of the first optical mark surfaces is A, the distance between center points of adjacent two of the first optical mark surfaces is D, and the following condition is satisfied:

$0.1 \le \sqrt{(A)}/D \le 1.0$.

21. The actuator according to claim 16, wherein each of the plurality of optical mark units further comprises a second optical mark surface, and the first optical mark surface and the second optical mark surface of each of the plurality of optical mark units are arranged side by side;

wherein an angle between an observation direction and the optical mark structure is θ, a gloss value difference in the observation direction between the first optical mark surface and the second optical mark surface of each of the plurality of optical mark units is ΔG, and the following conditions are satisfied:

$50[deg.] \le \theta \le 90[deg.]$; and $15[GU] \le \Delta G \le 50[GU]$.

22. The actuator according to claim 21, wherein a roughness value difference in a direction between the first optical mark surface and the second optical mark surface of each of the plurality of optical mark units is ΔR, and the following condition is satisfied:

$0.01[\mu m] \le \Delta R \le 3.5[\mu m]$.

23. The actuator according to claim 21, wherein a height difference in a direction perpendicular to the first optical mark surface between the first optical mark surface and the second optical mark surface of each of the plurality of optical mark units is ΔH, and the following condition is satisfied:

$0.001[mm] \le \Delta H \le 0.1[mm]$.

24. The actuator according to claim 21, wherein an angle between the first optical mark surface and the second optical mark surface of each of the plurality of optical mark units is Φ, and the following condition is satisfied:

$3[deg.] \le \Phi \le 75[deg.]$.

25. The actuator according to claim 16, wherein the imaging lens system has a mounting section, and the optical mark structure and the intermediate layer are disposed on the mounting section;

wherein part of one of the frame portion, the supporting portion and the driving portion that is adjacent to the optical mark structure is disposed on the mounting section and faces the optical mark structure.

26. The actuator according to claim 25, wherein the driving portion comprises a coil and a magnet spatially disposed opposite to each other;

wherein one of the coil and the magnet is disposed on the mounting section and is fixed to the imaging lens system via the intermediate layer.

27. The actuator according to claim 25, wherein the supporting portion comprises a supporting element in physical contact with the frame portion and the imaging lens system;

wherein part of the supporting element is disposed on the mounting section and is fixed to the imaging lens system via the intermediate layer.

28. The actuator according to claim 25, wherein the imaging lens system comprises a positioning protrusion located on the mounting section, and one of the frame portion, the supporting portion and the driving portion that is adjacent to the optical mark structure has a positioning hole corresponding to the positioning protrusion.

29. An image capturing unit, comprising:
the actuator of claim 16; and
an imaging lens system of claim 16.

30. An electronic device, comprising:
the image capturing unit of claim 29; and
an image sensor disposed on an image surface of the imaging lens system.

* * * * *